(12) United States Patent
Friedman et al.

(10) Patent No.: US 12,560,846 B2
(45) Date of Patent: Feb. 24, 2026

(54) ADHESIVE BUS BARS IN ELECTROCHROMIC WINDOWS

(71) Applicant: View, Inc., Milpitas, CA (US)

(72) Inventors: Robin Friedman, Sunnyvale, CA (US); Anshu A. Pradhan, Collierville, TN (US); Imran Khan, Milpitas, CA (US); Illayathambi Kunadian, San Jose, CA (US); Robert T. Rozbicki, Saratoga, CA (US); Zoran Topalovic, Milpitas, CA (US); Robert Michael Martinson, Palo Alto, CA (US)

(73) Assignee: View Operating Corporation, San Jose, CA (US)

( * ) Notice: Subject to any disclaimer, the term of this patent is extended or adjusted under 35 U.S.C. 154(b) by 822 days.

(21) Appl. No.: 17/309,332

(22) PCT Filed: Nov. 26, 2019

(86) PCT No.: PCT/US2019/063453
§ 371 (c)(1),
(2) Date: May 21, 2021

(87) PCT Pub. No.: WO2020/112907
PCT Pub. Date: Jun. 4, 2020

(65) Prior Publication Data

US 2022/0019114 A1 Jan. 20, 2022
US 2022/0137472 A9 May 5, 2022

Related U.S. Application Data

(60) Continuation-in-part of application No. 16/453,891, filed on Jun. 26, 2019, now Pat. No. 11,698,566, and
(Continued)

(51) Int. Cl.
*G02F 1/157* (2006.01)
*B32B 5/02* (2006.01)
(Continued)

(52) U.S. Cl.
CPC .............. *G02F 1/155* (2013.01); *B32B 5/024* (2013.01); *B32B 7/12* (2013.01); *B32B 17/061* (2013.01);
(Continued)

(58) Field of Classification Search
CPC .......... G02F 1/155; G02F 1/0316; G02F 3/16; G02F 1/163; G02F 1/1523; G02F 1/1525;
(Continued)

(56) References Cited

U.S. PATENT DOCUMENTS 5,066,112 A 11/1991 Lynam et al.
5,302,414 A 4/1994 Alkhimov et al.
(Continued)

FOREIGN PATENT DOCUMENTS

CN 102203370 A 9/2011
CN 202111111 U 1/2012
(Continued)

OTHER PUBLICATIONS

US Preliminary Amendment dated Dec. 28, 2016 in U.S. Appl. No. 15/038,727.
(Continued)

*Primary Examiner* — Dawayne Pinkney
(74) *Attorney, Agent, or Firm* — Cha & Reiter, LLC.

(57) ABSTRACT

Embodiments described include adhesive bus bars for electrochromic or other optical state changing devices. The bus bars are configured to color match and/or provide minimal optical contrast with their surrounding environment in the optical device, provide better adhesion than ink based bus bars, as well as obviate the need to mitigate defects in underlaying layers.

46 Claims, 22 Drawing Sheets

Related U.S. Application Data a continuation-in-part of application No. 15/780,606, filed on May 31, 2018, now Pat. No. 10,884,311, application No. 17/309,332 is a continuation-in-part of application No. 16/523,852, filed on Jul. 26, 2019, now Pat. No. 11,065,845, which is a continuation of application No. 15/934,854, filed on Mar. 23, 2018, now Pat. No. 10,409,130, which is a division of application No. 15/364,162, filed on Nov. 29, 2016, now Pat. No. 9,995,985, which is a division of application No. 14/512,297, filed on Oct. 10, 2014, now Pat. No. 9,703,167, which is a division of application No. 13/456,056, filed on Apr. 25, 2012, now Pat. No. 9,958,750, which is a continuation-in-part of application No. 13/431,729, filed on Mar. 27, 2012, now Pat. No. 9,102,124, which is a continuation of application No. 12/941,882, filed on Nov. 8, 2010, now Pat. No. 8,164,818, said application No. 13/456,056 is a continuation-in-part of application No. 13/312,057, filed on Dec. 6, 2011, now Pat. No. 8,711,465.

(60) Provisional application No. 62/771,516, filed on Nov. 26, 2018, provisional application No. 61/435,914, filed on Jan. 25, 2011, provisional application No. 61/421,154, filed on Dec. 8, 2010.

(51) Int. Cl.

| | |
|---|---|
| ***B32B 7/12*** | (2006.01) |
| ***B32B 17/06*** | (2006.01) |
| ***B32B 37/12*** | (2006.01) |
| ***E06B 3/67*** | (2006.01) |
| ***E06B 3/673*** | (2006.01) |
| ***E06B 9/24*** | (2006.01) |
| ***F21V 14/00*** | (2018.01) |
| ***G02F 1/1333*** | (2006.01) |
| ***G02F 1/15*** | (2019.01) |
| ***G02F 1/155*** | (2006.01) |
| ***G02F 1/161*** | (2006.01) |
| ***G09G 3/19*** | (2006.01) |

(52) U.S. Cl.

CPC ............ *B32B 17/067* (2013.01); *B32B 37/12* (2013.01); *E06B 3/6722* (2013.01); *E06B 3/67321* (2013.01); *E06B 9/24* (2013.01); *G02F 1/133302* (2021.01); *G02F 1/161* (2013.01); *B32B 2262/103* (2013.01); *B32B 2262/106* (2013.01); *B32B 2307/202* (2013.01); *B32B 2307/402* (2013.01); *B32B 2307/732* (2013.01); *E06B 2009/2464* (2013.01); *G02F 2202/28* (2013.01)

(58) Field of Classification Search

CPC ...... G02F 1/1521; G02F 1/1533; G02F 1/033; B60R 1/088; C09K 9/02; H04N 9/3137; H04N 9/22

USPC ................ 359/265–275, 277, 245–247, 242; 345/49, 105, 107; 250/70; 348/814, 817; 438/929

See application file for complete search history.

(56) References Cited

U.S. PATENT DOCUMENTS

| | | | | |
|---|---|---|---|---|
| 5,786,664 | A * | 7/1998 | Liu | H05B 33/04 428/917 |
| 6,118,573 | A | 9/2000 | Kubo et al. | |
| 6,317,248 | B1 | 11/2001 | Agrawal et al. | |
| 6,471,360 | B2 | 10/2002 | Rukavina et al. | |
| 6,924,919 | B2 | 8/2005 | Hunia et al. | |
| 6,961,168 | B2 | 11/2005 | Agrawal et al. | |
| 7,133,181 | B2 | 11/2006 | Greer | |
| 7,586,664 | B2 | 9/2009 | O'Shaughnessy et al. | |
| 7,649,668 | B2 | 1/2010 | Fanton et al. | |
| 7,719,751 | B2 | 5/2010 | Egerton et al. | |
| 8,164,818 | B2 | 4/2012 | Collins et al. | |
| 8,213,074 | B1 | 7/2012 | Shrivastava et al. | |
| 8,493,646 | B2 | 7/2013 | Burdis | |
| 8,643,933 | B2 | 2/2014 | Brown | |
| 8,711,465 | B2 | 4/2014 | Bhatnagar et al. | |
| 9,081,247 | B1 | 7/2015 | Pradhan et al. | |
| 9,128,346 | B2 | 9/2015 | Shrivastava et al. | |
| 9,158,172 | B2 | 10/2015 | Sbar et al. | |
| 9,158,173 | B2 | 10/2015 | Bhatnagar et al. | |
| 9,442,339 | B2 | 9/2016 | Parker et al. | |
| 9,454,053 | B2 | 9/2016 | Strong et al. | |
| 9,482,922 | B2 | 11/2016 | Brown et al. | |
| 9,939,704 | B2 | 4/2018 | Patterson et al. | |
| 9,952,481 | B2 | 4/2018 | Rozbicki et al. | |
| 9,958,750 | B2 | 5/2018 | Parker et al. | |
| 10,884,311 | B2 | 1/2021 | Rozbicki et al. | |
| 10,969,644 | B2 | 4/2021 | Rozbicki et al. | |
| 11,500,259 | B2 | 11/2022 | Rozbicki et al. | |
| 11,906,868 | B2 | 2/2024 | Rozbicki et al. | |
| 11,966,141 | B2 | 4/2024 | Rozbicki et al. | |
| 2002/0135881 | A1* | 9/2002 | Rukavina | B64C 1/1492 359/603 |
| 2002/0149829 | A1 | 10/2002 | Mochizuka et al. | |
| 2003/0227663 | A1* | 12/2003 | Agrawal | G02F 1/157 359/265 |
| 2004/0032638 | A1 | 2/2004 | Tonar et al. | |
| 2006/0285190 | A1 | 12/2006 | Agrawal et al. | |
| 2007/0047058 | A1 | 3/2007 | Lim | |
| 2007/0133078 | A1 | 6/2007 | Fanton et al. | |
| 2008/0141936 | A1 | 6/2008 | Pui et al. | |
| 2008/0259262 | A1 | 10/2008 | Jones et al. | |
| 2008/0315270 | A1 | 12/2008 | Marsh et al. | |
| 2009/0321728 | A1 | 12/2009 | Seo | |
| 2009/0322070 | A1 | 12/2009 | Reichelsheimer et al. | |
| 2010/0067090 | A1 | 3/2010 | Egerton et al. | |
| 2010/0200549 | A1 | 8/2010 | Blankenship et al. | |
| 2010/0245044 | A1 | 9/2010 | Dietemann | |
| 2010/0245973 | A1* | 9/2010 | Wang | C23C 14/185 427/126.6 |
| 2011/0075244 | A1 | 3/2011 | Millett et al. | |
| 2011/0100709 | A1 | 5/2011 | Wang et al. | |
| 2011/0143045 | A1 | 6/2011 | Veerasamy | |
| 2011/0211246 | A1* | 9/2011 | Agrawal | G02F 1/161 977/932 |
| 2011/0255141 | A1 | 10/2011 | Agrawal et al. | |
| 2012/0147449 | A1 | 6/2012 | Bhatnagar et al. | |
| 2012/0300280 | A1 | 11/2012 | Murphy et al. | |
| 2012/0327499 | A1 | 12/2012 | Parker et al. | |
| 2013/0258436 | A1 | 10/2013 | Podbelski et al. | |
| 2013/0278988 | A1 | 10/2013 | Jack et al. | |
| 2014/0133005 | A1 | 5/2014 | Sbar et al. | |
| 2014/0192393 | A1 | 7/2014 | Bhatnagar et al. | |
| 2015/0098169 | A1 | 4/2015 | Karlen et al. | |
| 2016/0377948 | A1 | 12/2016 | Rozbicki et al. | |
| 2018/0210307 | A1 | 7/2018 | Parker et al. | |
| 2018/0231859 | A1 | 8/2018 | Rozbicki et al. | |
| 2018/0364539 | A1 | 12/2018 | Rozbicki et al. | |
| 2019/0079365 | A1 | 3/2019 | Sarrach et al. | |
| 2019/0094643 | A1 | 3/2019 | Friedman et al. | |
| 2020/0110321 | A1 | 4/2020 | Heintzelman | |
| 2021/0191216 | A1 | 6/2021 | Rozbicki et al. | |
| 2021/0200053 | A1 | 7/2021 | Rozbicki et al. | |
| 2022/0121076 | A1 | 4/2022 | Neander et al. | |
| 2023/0080293 | A1 | 3/2023 | Rozbicki et al. | |

(56) References Cited

U.S. PATENT DOCUMENTS

| | | | |
|---|---|---|---|
| 2024/0248364 | A1 | 7/2024 | Rozbicki et al. |
| 2024/0264505 | A1 | 8/2024 | Rozbicki et al. |

FOREIGN PATENT DOCUMENTS

| | | | |
|---|---|---|---|
| CN | 102998872 | A | 3/2013 |
| CN | 103261960 | A | 8/2013 |
| CN | 103370649 | A | 10/2013 |
| CN | 103562788 | A | 2/2014 |
| CN | 103643871 | A | 3/2014 |
| CN | 104364707 | A | 2/2015 |
| CN | 104859408 | A | 8/2015 |
| CN | 104950473 | A | 9/2015 |
| JP | 2005509549 | A | 4/2005 |
| KR | 20150089384 | A | 8/2015 |
| TW | 200501144 | A | 1/2005 |
| TW | 201809842 | A | 3/2018 |
| WO | WO1996/024882 | A1 | 8/1996 |
| WO | WO-9949447 | A1 | 9/1999 |
| WO | WO2009/020804 | A1 | 2/2009 |
| WO | WO-2009158510 | A2 | 12/2009 |
| WO | WO-2013090209 | A1 | 6/2013 |
| WO | WO2013/138535 | A1 | 9/2013 |
| WO | WO2013/163107 | | 10/2013 |
| WO | WO-2014137378 | A1 | 9/2014 |
| WO | WO2015/089663 | A1 | 6/2015 |
| WO | WO2015/100419 | A1 | 7/2015 |
| WO | WO2017/011268 | | 1/2017 |
| WO | WO2017/112685 | | 6/2017 |
| WO | WO2020/112907 | | 6/2020 |

OTHER PUBLICATIONS

Preliminary Amendment dated May 24, 2021 for U.S. Appl. No. 17/178,242.
US Notice of Allowance dated Aug. 25, 2017 in U.S. Appl. No. 15/038,727.
US Notice of Allowance dated Dec. 18, 2017 in U.S. Appl. No. 15/038,727.
US Office Action dated Nov. 4, 2019 in U.S. Appl. No. 15/924,099.
US Final Office Action dated Apr. 20, 2020 in U.S. Appl. No. 15/924,099.
US Notice of Allowance dated Oct. 8, 2020 in U.S. Appl. No. 15/924,099.
US Office Action dated Nov. 15, 2019 in U.S. Appl. No. 15/780,606.
US Office Action dated May 29, 2020 in U.S. Appl. No. 15/780,606.
US Notice of Allowance dated Oct. 15, 2020 in U.S. Appl. No. 15/780,606.
International Search Report and Written Opinion dated Apr. 1, 2015 from PCT/US2014/072362.
International Preliminary Report on Patentability dated Jul. 7, 2016 from PCT/US2014/072362.
CA Office Action dated Feb. 9, 2021 in CA Application No. 2,934,277.
CA Office Action dated Aug. 4, 2021 in CA Application No. 2,934,277.
CN Office Action dated May 19, 2017 in CN Application No. 201480067950.4.
CN Office Action dated Apr. 4, 2018 in CN Application No. 201480067950.4.
CN Office Action dated Oct. 15, 2018 in CN Application No. 201480067950.4.
CN Office Action dated May 8, 2021 in CN Application No. 201910142797.1.
EP Extended Search Report dated Aug. 17, 2017 in EP Application No. 14873490.8.
EP Office Action dated Mar. 29, 2019 in EP Application No. 14873490.8.
CN Office Action dated Nov. 2, 2020 in CN Application No. 201680078643.5, with English translation.
EP Extended Search Report dated May 29, 2019 in EP Application No. 16879981.5.
EP Office Action dated Jun. 12, 2020 in EP Application No. 16879981.5.
EP Office Action dated May 26, 2021 in EP Application No. 16879981.5.
International Search Report and Written Opinion dated Apr. 10, 2017 from PCT/US2016/067813.
International Preliminary Report on Patentability dated Jun. 26, 2018 in PCT/US2016/067813.
International Search Report and Written Opinion (ISA/KR) dated May 24, 2017 from PCT/US2017/021408.
International Preliminary Report on Patentability dated Sep. 20, 2018 from PCT/US2017/021408.
Invitation to Pay Additional Fees dated Mar. 11, 2020 in PCT Application No. PCT/US2019/063453.
International Search Report and Written Opinion dated Jul. 5, 2020 in PCT Application No. PCT/US2019/063453.
International Preliminary Report of Patentability dated May 25, 2021 in PCT Application No. PCT/US2019/063453.
Tseng, C-Y et al., "Improved performance mechanism of III-V compound triple-junction solar cell using hybrid electrode structure," Solar Energy, vol. 89, Jan. 19, 2013, pp. 17-22.
CA Office Action dated Jan. 17, 2023 in Application No. CA3009470.
CA Office Action dated Nov. 15, 2023 in CA Application No. 3009470.
CA Office Action dated Sep. 23, 2022, in Application No. CA2934277.
Chowdhury, M. et al., "Application of Thermochromic Colorants on Textiles: Temperature Dependence of Colorimetric Properties", Coloration Technology, 2013, vol. 129, pp. 232-237.
CN Office Action dated May 10, 2022, in Application No. CN201680078643.5 With English Translation.
CN Office Action dated Aug. 16, 2021, in CN Application No. 201680078643.5 with English translation.
CN Office Action dated Dec. 15, 2021, in Application No. CN201910142797.1 with English translation.
CN Office Action dated Feb. 8, 2022, in Application No. CN201680078643.5 with English Translation.
CN Office Action dated Jul. 1, 2022 in Application No. CN201910142797.1 with English translation.
CN Office Action dated Jun. 2, 2024 in CN Application No. 201980084984.7 with English translation.
CN Office Action dated Oct. 19, 2022, in Application No. CN201680078643.5, with English Translation.
CN Office Action dated Sep. 29, 2023 in CN Application No. 201980084984.7 with English translation.
EP Extended European Search Report mailed on Sep. 23, 2021, in application No. EP21162654.4.
EP Office Action dated Jan. 8, 2024 in EP Application No. 21162654.4.
EP Office Action dated May 20, 2022, in Application No. EP20160879981.5.
European Office Action dated Mar. 29, 2023 in Application No. EP19829721.
"Product Sheet; IGU," SageGlass Saint-Gobain, pp. 1-7.
U.S. Corrected Notice of Allowance dated Aug. 10, 2022 in U.S. Appl. No. 17/100,731.
U.S. Corrected Notice of Allowance dated Mar. 22, 2024 in U.S. Appl. No. 17/178,242.
U.S. Corrected Notice of Allowance dated Oct. 6, 2022 in U.S. Appl. No. 17/100,731.
U.S. Corrected Notice of Allowance dated Oct. 13, 2023, in U.S. Appl. No. 17/900,886.
U.S. Final Office Action dated May 17, 2023 in U.S. Appl. No. 17/178,242.
U.S. Non-Final Office Action dated Aug. 29, 2024 in U.S. Appl. No. 18/404,667.
U.S. Non-Final office Action dated Jan. 20, 2023 in U.S. Appl. No. 17/178,242.
U.S. Notice of Allowance dated Jun. 29, 2022 in U.S. Appl. No. 17/100,731.
U.S. Notice of Allowance dated Jan. 19, 2024 in U.S. Appl. No. 17/900,886.

(56) References Cited

OTHER PUBLICATIONS

U.S. Notice of Allowance dated Sep. 7, 2023, in U.S. Appl. No. 17/178,242.
U.S. Notice of Allowance dated Sep. 29, 2023 in U.S. Appl. No. 17/900,886.
U.S. Restriction Requirement dated Nov. 9, 2022 in U.S. Appl. No. 17/178,242.
Zhengao Z., "The Development of Chromic Materials," China Personal Protective Equipment, 2013, Phase 5, 04 pages.

* cited by examiner

ADHESIVE BUS BARS IN ELECTROCHROMIC WINDOWS

CROSS REFERENCE TO RELATED APPLICATIONS

This application claims benefit of and priority to U.S. Provisional Patent Application No. 62/771,516, filed on Nov. 26, 2018 and titled "ADHESIVE BUS BARS IN ELECTROCHROMIC GLASS STRUCTURES;" this application is also a continuation-in-part of U.S. patent application Ser. No. 15/780,606, filed on May 31, 2018 and titled "OBSCURING BUS BARS IN ELECTROCHROMIC GLASS STRUCTURES," which is a national stage application under 35 U.S.C § 371 to International Application PCT/US16/67813 (designating the United States), filed on Dec. 20, 2016 and titled "OBSCURING BUS BARS IN ELECTROCHROMIC GLASS STRUCTURES," which claims benefit of and priority to U.S. Provisional Patent Application 62/270,461, titled "OBSCURING BUS BARS IN ELECTROCHROMIC GLASS STRUCTURES" and filed on Dec. 21, 2015; International Application PCT/US16/67813 is a continuation-in-part of U.S. patent application Ser. No. 15/038,727 (now U.S. Pat. No. 9,952,481), titled "OBSCURING BUS BARS IN ELECTROCHROMIC GLASS STRUCTURES," and filed on May 23, 2016, which is a national stage application under 35 U.S.C. § 371 to International Application PCT/US14/72362 (designating the United States), filed on Dec. 24, 2014 and titled "OBSCURING BUS BARS IN ELECTROCHROMIC GLASS STRUCTURES," which claims benefit of and priority to U.S. Provisional Patent Application No. 61/920,684, titled "OBSCURING BUS BARS IN ELECTROCHROMIC GLASS STRUCTURES" and filed on Dec. 24, 2013; this application is also a continuation-in-part of U.S. patent application Ser. No. 16/453,891, filed on Jun. 26, 2019, titled "MITIGATING DEFECTS IN AN ELECTROCHROMIC DEVICE UNDER A BUS BAR," which is a continuation of U.S. patent application Ser. No. 16/249,822, filed on Jan. 16, 2019, titled "MITIGATING DEFECTS IN AN ELECTROCHROMIC DEVICE UNDER A BUS BAR," which is a continuation of U.S. patent application Ser. No. 15/537,370, filed on Jun. 16, 2017 and titled "MITIGATING DEFECTS IN AN ELECTROCHROMIC DEVICE UNDER A BUS BAR," which is a national stage application under 35 U.S.C § 371 to International Application PCT/US15/65910 (designating the United States), filed on Dec. 15, 2015 and titled "MITIGATING DEFECTS IN AN ELECTROCHROMIC DEVICE UNDER A BUS BAR," which claims benefit of and priority to U.S. Provisional Patent Application 62/094,862, titled "MITIGATING DEFECTS IN AN ELECTROCHROMIC DEVICE UNDER A BUS BAR" and filed on Dec. 19, 2014; all of these applications are hereby incorporated by reference in their entireties and for all purposes.

FIELD

The embodiments disclosed herein relate generally to apparatus and techniques for providing bus bars and other features within an electrochromic (electrochromic) glass structure assembly having, for example, one or more insulated glass units (insulated glass units).

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide. Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electrically. A small voltage applied to an electrochromic device of the window will cause them to darken; reversing the voltage causes them to lighten. This capability allows control of the amount of light that passes through the windows and presents an opportunity for electrochromic windows to be used as energy-saving devices.

While electrochromism was discovered in the 1960s, electrochromic devices, and particularly electrochromic windows, still unfortunately suffer various problems and have not begun to realize their full commercial potential despite many recent advances in electrochromic technology, apparatus and related methods of making and/or using electrochromic devices.

SUMMARY

Certain aspects pertain to an electrochromic insulated glass unit comprising a first transparent substrate, a second transparent substrate, a spacer sandwiched between the first and second transparent substrates, an electrochromic device coating disposed on the first transparent substrate, and a first adhesive bus bar on the first transparent conductive layer. The electrochromic device coating comprises a first transparent conductive layer, a second transparent conductive layer, and an electrochromic device stack disposed between the first and second transparent conductive layers. The first adhesive bus bar is between the spacer and the first transparent substrate at least along the longest dimension. In one aspect, the first adhesive bus bar comprises an electrically conductive adhesive and an electrically conductive backing comprising e.g., at least one of a metal, a metallized plastic, a metallized woven fabric, a carbon fiber, an alloy, and a metallized carbon fiber. In one aspect, the first adhesive bus bar comprises a metal foil. In one aspect, the electrically conductive adhesive comprises an adhesive and a conductive filler. In one aspect, the adhesive bus bar comprises the same or similar color as the spacer and/or a primary sealant between the spacer and the first transparent substrate.

Certain aspects pertain to a method of fabricating an electrochromic device. The method comprises (a) applying an electrically conductive adhesive to a transparent conductive layer of the electrochromic device, (b) applying an electrically conductive backing to the electrically conductive adhesive, and (c) applying a pressure and/or heat to the electrically conductive backing. The electrically conductive adhesive is sandwiched between the transparent conductive layer and the electrically conductive backing. In one aspect, (c) comprises the pressure and the heat to flow the electrically conductive adhesive and/or initiate cross-linking of polymer precursors of the electrically conductive adhesive. In another aspect, the pressure is applied using a press or a roller. In another aspect, the electrically conductive adhesive comprises a two-part epoxy. In another aspect, the electrically conductive adhesive comprises an a-stage adhesive. In another aspect, the method is performed in the order (a), then (b), and then (c) or performed in the order (b), then (a), and then (c). In another aspect, the electrically conductive adhesive comprises a b-stage adhesive. In another aspect, (c) further comprises applying an ultraviolet light to the electrically conductive adhesive. In another aspect, the heat is applied using at least one of an oven, a heat lamp, a laser, a hot roller and a hot press. In other aspects, applying the heat comprises heating to: (i) between about 80° C. and about 400° C.; (ii) between about 100° C. and about 350° C.; (iii) between about 150° C. and about 250° C.; (iv) between about 150° C. and about 200° C.; or (v) between about 160° C. and about 180° C. In other aspects, applying the heat comprises heating for (i) between about 1 minute and about 60 minutes; (ii) between about 5 minutes and about 30 minutes; and (iii) for between about 10 minutes and 20 minutes; or (iv) between about 150° C. and about 200° C., for between about 10 minutes and about 20 minutes. In other aspects, applying the pressure comprises applying pressure at between (i) about 5 psi and about 100 psi; (ii) about 10 psi and about 50 psi; and (iii) about 10 psi and about 25 psi. In another aspect, (c) comprises applying a first pressure and the heat to melt the electrically conductive adhesive, followed by a cure without pressure, at the same or different temperature as applied during the first pressure application.

Certain aspects pertain to an electrochromic insulated glass unit comprising (a) a transparent substrate comprising an electrochromic device coating thereon, (b) a spacer sandwiched between the transparent substrate and another substrate, and (c) a first bus bar, and (d) a second bus bar. The first bus bar comprises a first leg and a second leg. The first leg includes a first portion and a second portion. The first portion of the first bus bar is between the transparent substrate and the spacer and spans along substantially the entire length of a first side of the spacer. The second portion of the first bus bar emanates from between the transparent substrate and the spacer and extends to a vertex outside the spacer's outer perimeter at a second side of the spacer. The second leg extends from the vertex and ends at an area on and proximate a corner of the transparent substrate. The second bus bar includes a first portion and second portion. The first portion of the second bus bar is between the transparent substrate, spanning along substantially the entire length of a third side, opposite the first side of the spacer. The second emanates from between the transparent substrate and the spacer and terminates at the area. The transparent substrate and the spacer are rectangular Certain aspects pertain to an electrochromic insulated glass unit comprising (a) a transparent substrate comprising an electrochromic device coating thereon, (b) a spacer sandwiched between the transparent substrate and another substrate, and (c) a first bus bar, and (d) a second bus bar. The first bus bar comprises a first leg, a second leg, and third leg. The first leg is between the transparent substrate and the spacer. The first leg spans along substantially the entire length of a first side of the spacer and extends to a first vertex between the transparent substrate and the spacer. The second leg extends from the first vertex between the transparent substrate and the spacer and extends along a second side of the spacer to a second vertex between the transparent substrate and the spacer. The third leg extends from the second vertex. The third leg includes a first portion emanating from between the transparent substrate and the spacer on the second side and outside the spacer's outer perimeter and extends to an area proximate a corner of the transparent substrate. The second bus bar includes a first portion that is between the transparent substrate and the spacer and that spans along substantially the entire length of a third side of the spacer, opposite the first side. The second portion of the second bus bar emanates from between the transparent substrate and the spacer and terminates at the area. The transparent substrate and the spacer are rectangular.

Certain aspects pertain to an electrochromic insulated glass unit comprising (a) a transparent substrate comprising an electrochromic device coating thereon, (b) a spacer sandwiched between the transparent substrate and another substrate, and (c) a first bus bar, and (d) a second bus bar. The first bus bar comprises a first leg and a second leg. The first leg is between the transparent substrate and the spacer and spans along substantially the entire length of a first side of the spacer and extends to a first vertex between the transparent substrate and the spacer. The second leg extends from the first vertex, between the transparent substrate and the spacer, and along a second side of the spacer. The second leg includes a portion emanating from between the transparent substrate and the spacer on a third side of the spacer opposite the first side and extending to an area on and proximate a corner of the transparent substrate outside the spacer's outer perimeter. The second bus bar comprises a first arm and a second arm. The first arm is between the transparent substrate and the spacer. The first arm spans along substantially the entire length of the third side of the spacer and extends to a first corner between the transparent substrate and the spacer. The second arm extends from the first corner and includes a portion that emanates from between the transparent substrate and the spacer on the third side of the spacer and that terminates at the area. The transparent substrate and the spacer are rectangular.

Certain aspects pertain to an electrochromic insulated glass unit comprising (a) a transparent substrate comprising an electrochromic device coating thereon, (b) a spacer sandwiched between the transparent substrate and another substrate, and (c) a first bus bar and a second bus bar, each comprising a first leg, a second leg, and a third leg. The first leg is between the transparent substrate and the spacer. The first leg spans along substantially the entire length of a first side and a second side of the spacer, respectively. The first and second sides of the spacer are opposite and parallel to each other. The first leg extends to a first vertex between the transparent substrate and the spacer. The second leg is between the transparent substrate and the spacer, and extends from the first vertex along a third side of the spacer, between the first and second sides, and extends to a second vertex between the transparent substrate and the spacer. The third leg extends from the second vertex and includes a portion, emanating from between the transparent substrate and the spacer, and extending to an area on the transparent substrate outside the spacer's outer perimeter on the third side of the spacer. The transparent substrate and the spacer are rectangular.

Certain aspects pertain to an electrochromic insulated glass unit comprising (a) a transparent substrate comprising an electrochromic device coating thereon, (b) a spacer sandwiched between the transparent substrate and another substrate, and (c) a first bus bar and a second bus bar, each comprising a first leg and a second leg. The first leg is between the transparent substrate and the spacer. The first leg spans along substantially the entire length of a first side and a second side of the spacer, respectively. The first and second sides of the spacer are opposite and parallel to each other. The first leg extends to a vertex between the transparent substrate and the spacer. The second leg extends from the vertex between the transparent substrate and the spacer and along a third side and a fourth side of the spacer, respectively. The third and fourth sides of the spacer are between the first and second sides of the spacer and opposite and parallel to each other. The second leg includes a portion emanating from between the transparent substrate and the spacer to outside the spacer's outer perimeter on the third and fourth sides of the spacer, respectively. The portion extends to a first area and a second area of the transparent substrate, respectively, on and proximate a first corner and a second corner, diagonally opposed to each other. The transparent substrate and the spacer are rectangular.

Certain aspects pertain to an electrochromic insulated glass unit comprising (a) a transparent substrate comprising an electrochromic device coating thereon, (b) a spacer sandwiched between the transparent substrate and another substrate, and (c) a first bus bar and a second bus bar, each comprising a first leg, a second leg, and a vertex. The first leg spans along substantially the entire length of a first side and a second side of the spacer, respectively. The first and second sides of the spacer are opposite and parallel to each other. The first leg includes a portion emanating from between the transparent substrate and the spacer to outside the spacer's outer perimeter on a third side and a fourth side of the spacer, respectively. The third and fourth sides are between the first and second sides of the spacer and opposite and parallel to each other. The portion extends to a first area and a second area of the transparent substrate, respectively. The first area is proximate a first corner and the second area is proximate a second corner diagonally opposed to the first corner. The second leg is between the transparent substrate and the spacer, and along the third and fourth sides of the spacer, respectively. The vertex is between the transparent substrate and the spacer, the vertex formed by an intersection of the first leg and the second leg. The transparent substrate and the spacer are rectangular.

Certain aspects pertain to an electrochromic insulated glass unit comprising (a) a transparent substrate comprising an electrochromic device coating thereon, (b) a spacer sandwiched between the transparent substrate and another substrate, and (c) a first bus bar and a second bus bar, each comprising a first leg, a second leg, and a vertex. The first leg is between the transparent substrate and the spacer. The first leg spans along substantially the entire length of a first side and a second side of the spacer, respectively. The first and second sides of the spacer are opposite and parallel to each other. The second leg including a portion emanating from between the transparent substrate and the spacer on the first and second sides of the spacer, respectively. The portion extends to a first area and a second area, respectively, of the transparent substrate outside the spacer's outer perimeter. The vertex is between the transparent substrate and the spacer. The vertex is formed by intersection of the first leg and the second leg. The transparent substrate and the spacer are rectangular.

Certain aspects pertain to an electrochromic insulated glass unit comprising (a) a transparent substrate comprising an electrochromic device coating thereon, (b) a spacer sandwiched between the transparent substrate and another substrate, and (c) a first bus bar and a second bus bar, each comprising a linear span between the transparent substrate and the spacer along substantially the entire length of a first side and a second side of the spacer, respectively. The first and second sides of the spacer are opposite and parallel to each other. At least one end of the linear span emanates from between the transparent substrate and the spacer and extends to a first area and a second area, respectively, on the transparent substrate outside the spacer's outer perimeter. The transparent substrate and the spacer are rectangular.

Certain aspects pertain to an adhesive bus bar comprising: (a) an electrically conductive adhesive; and an electrically conductive backing comprising at least one of a metal, a metallized plastic, a metallized woven fabric, a carbon fiber, an alloy, and a metallized carbon fiber.

Certain aspects pertain to an electrochromic insulated glass unit comprising (a) a transparent substrate comprising an electrochromic device coating thereon, (b) a spacer sandwiched between the transparent substrate and another substrate, and (c) a first bus bar and a second bus bar, each comprising a first leg, a second leg, and a third leg. The first leg is between the transparent substrate and the spacer. The first leg spans along substantially the entire length of a first side and a second side of the spacer, respectively. The first and second sides of the spacer are opposite and parallel to each other. The first leg extends to a first vertex between the transparent substrate and the spacer. The second leg is between the transparent substrate and the spacer, and extends from the first vertex and along a third side and a fourth side of the spacer, respectively. The third and fourth sides of the spacer are between the first and second sides of the spacer and are opposite and parallel to each other. The third leg emanates from between the transparent substrate and spacer, on the first and second sides of the spacer, respectively, and extends to a first and a second area, respectively, on the transparent substrate outside the spacer's outer perimeter. A second vertex between the transparent substrate and the spacer is formed by an intersection of the third leg with the first leg and the second leg, respectively. The third leg is configured such that there is approximately equal length of bus bar on either side of the second vertex. The transparent substrate and the spacer are rectangular.

These and other features and embodiments will be described in more detail below with reference to the drawings.

DETAILED DESCRIPTION

Figure 1A:
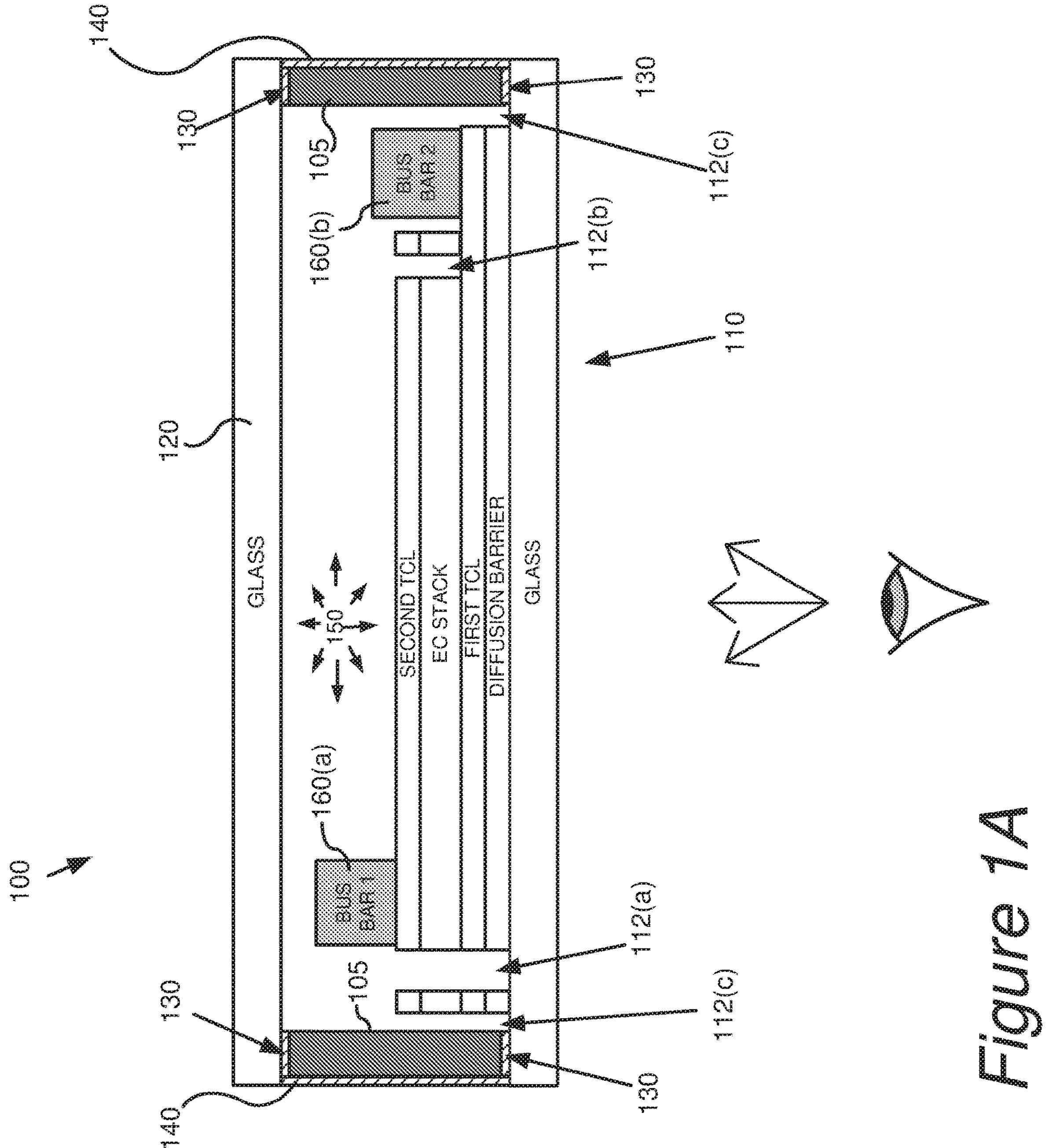
FIG. 1A is a schematic drawing of a cross section of an insulated glass unit (insulated glass unit) of an electrochromic window assembly.

In the following description, numerous specific details are set forth in order to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiments. Reference numbers in the figures may be reused across various figures to denote the same or analogous structures. For example, an adhesive bus bar is denoted "370" in various figures, and any instance of "370" is meant to include adhesive bus bars as described herein and any particular adhesive bus bar described herein. Thus, if a figure has two such reference numbers "370" embodiments include where each of the referenced adhesive bus bars are the same or different adhesive bus bars.

An "electrochromic window" can refer to a window including one or more electrochromic panes (also referred to herein as electrochromic lites) such as, for example, an insulated glass unit (IGU) having one or more electrochromic panes or an electrochromic pane laminated to another pane (an "electrochromic laminate"), the other pane being electrochromic or not. An "electrochromic window assembly" is an assembly comprising one or more electrochromic windows. Each pane or lite of an electrochromic insulated glass unit may be alone or laminated to another pane, electrochromic or not. An electrochromic pane (or lite) comprises a substantially transparent substrate (for example, glass substrate) and an electrochromic device fabricated on the substrate. Methods of fabricating electrochromic panes, laminates and insulated glass units can be found in U.S. patent application Ser. No. 13/456,056 titled "ELECTROCHROMIC WINDOW FABRICATION METHODS," filed on Apr. 25, 2012, which is hereby incorporated by reference in its entirety. In these fabrication methods, electrochromic panes with electrochromic devices are fabricated, and then insulated glass units are manufactured using one or more of the electrochromic panes. Typically, an insulated glass unit is formed by placing a spacer, for example made of polymer or metal, for example PVB (polyvinyl butyral), silicone, aluminum, stainless steel or other suitable material), between two glass panes, and sealed with an appropriate adhesive, such as polyisobutylene (PIB) to make a hermetic seal. After the panes are sealed to the spacer, a secondary seal is provided around the outer perimeter of the spacer, for example a polymeric material, for example a silicone-based material that adds structural support to the assembly (sometimes referred to as "structural silicone"). In some cases, a desiccant may be included in the insulated glass unit frame or spacer during assembly to absorb any moisture. Typically, but not necessarily, the insulated glass unit is filled with inert gas such as argon. The completed insulated glass unit can be installed in, for example, a frame or wall and connected to a power source (or wirelessly powered) and a controller to control power to transition the optical states of the electrochromic device(s). Examples of bus bars and spacers can be found in U.S. patent application Ser. No. 13/312,057 titled "SPACERS FOR INSULATED GLASS UNITS" and filed on Dec. 6, 2011 and U.S. patent application Ser. No. 13/452,032 titled "ANGLED BUS BAR" and filed on Apr. 20, 2012, which are hereby incorporated by reference in their entirety.

In a conventional electrochromic glass window, especially on larger size substrates, manufacturers use a bus bar and/or scribe lines in the viewable area of the insulated glass unit, for example due to engineering or a perceived need to do so. The viewable area or "vision area" is the area of the window that light passes through. For an insulated glass unit, not installed in a frame, the viewable area is the area within the inner perimeter of the spacer. Once an insulated glass unit is installed in a framing system, the viewable area is defined by the inner perimeter of the window frame. Bus bars and scribe lines are aesthetically unpleasing due to the contrast between the electrochromic device and the scribe line and/or bus bar in the viewable area. Certain manufacturers use obscuration materials, for example paint or frit, to hide these features from view, which further reduces the viewable area of the window.

FIG. 1A is a schematic drawing of a cross section of an electrochromic window in the form of an insulated glass unit, 100. In FIG. 1A, a spacer, 105, is used to separate a first electrochromic pane 110 from a second pane 220. The first electrochromic pane includes an electrochromic device fabricated on a substantially transparent substrate such as a glass substrate. The second pane 220 in this example is a non-electrochromic pane. In other examples, second pane 220 can have an electrochromic device thereon and/or one or more coatings such as low-E coatings and the like. Between spacer 105 and, in this example, the substrate of first electrochromic pane 110 is a primary seal, 130. This primary seal 130 is also between spacer 105 and the second non-electrochromic pane 220. Around the perimeter of spacer 105 is a secondary seal, 140 (bus bar wiring may traverse the primary seal for connection to controller). These seals aid in keeping moisture out of the interior space, 150, of insulated glass unit 100.

An observer viewing the insulated glass unit 100 (as depicted with the stylized eye) will see both bus bars and other features when the electrochromic coating is darkened or in the clear state. This is described in more detail below.

In FIG. 1A, areas 112(*a*) and 112 (*b*) represent where the electrochromic device stack has been removed (for example, by laser scribing), in this example, at a perimeter region. In this example, the area 112(*a*) passes through the second transparent conductive layer (TCL), the electrochromic stack and the first TCL, and may be able to isolate the operable electrochromic device from other portions of the electrochromic device that were potentially damaged during edge deletion. In certain cases, the electrochromic stack comprises an electrochromic layer, a counter electrode (CE) layer, and an optional discrete ion conducting (IC) layer. Area 112(*b*) also passes through the second TCL and the device stack, but not the bottom first TCL, as this serves as the lower conductor in electrical communication with bus bar 2. Regardless, areas 112(*a*) and 112 (*b*) allow light to pass through the glass, even though the electrochromic device layers may be darkened. In this example, the electrochromic stack, the first TCL and the diffusion barrier were removed in the edge deletion areas, and the outer perimeter of the electrochromic device does not pass under the spacer into the primary seal, thus areas 112(*c*) will also allow light to pass through even when the electrochromic device is darkened, because they have no electrochromic coating.

Figure 1B:
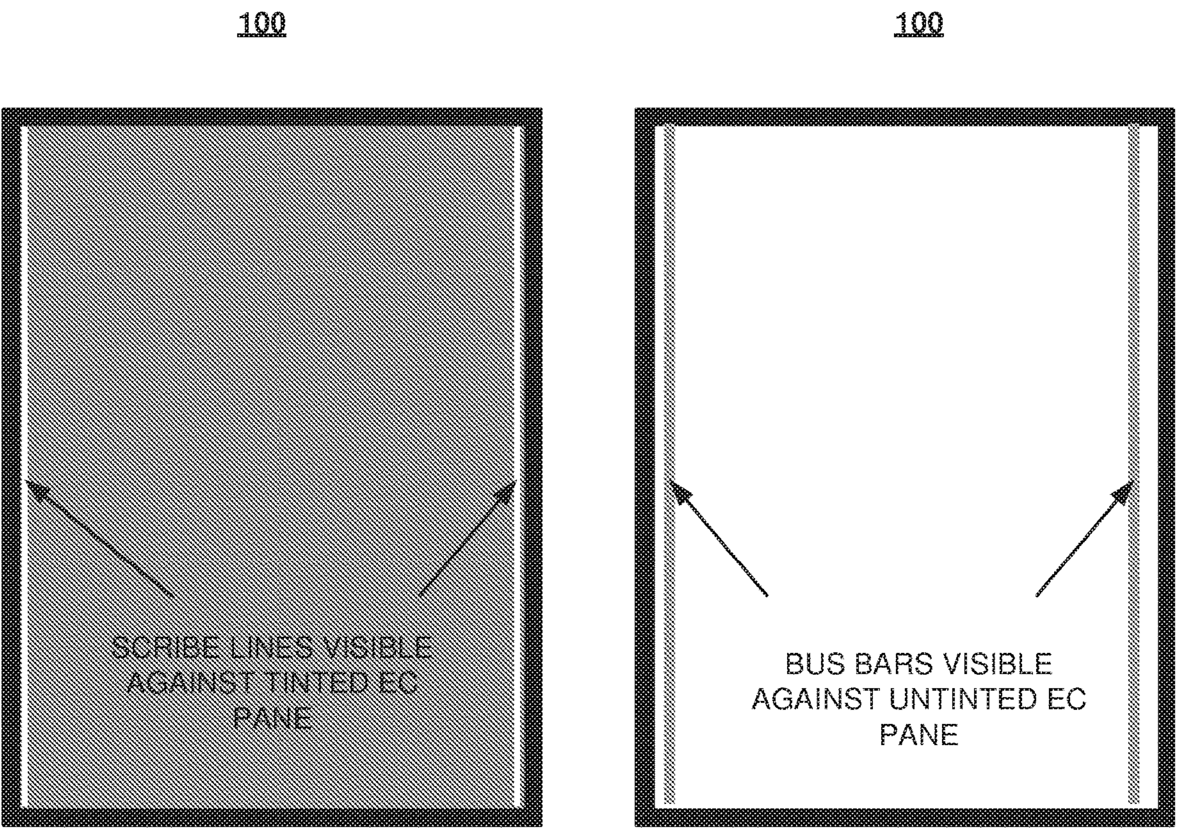
FIG. 1B is a schematic drawing of plan views of the insulated glass unit in an un-tinted state and a tinted state.

In FIG. 1A, bus bar 1 160(*a*) is fabricated on the second TCL of the electrochromic stack and bus bar 2 160(*b*) is fabricated on the first TCL. The illustrated eye shows the perspective of an observer viewing the insulated glass unit 100 from the outside. FIG. 1B shows plan views of insulated glass unit 100 in an un-tinted state (left hand side illustration) and a tinted state (right hand side illustration) from the perspective of the observer shown by the illustrated eye in FIG. 1A. As depicted, unless the techniques for obscuring of certain embodiments are used, the bus bars and/or the scribe lines in insulated glass unit 100 are visible in contrast with its background of the electrochromic device (tinted and untinted). In the tinted state, the scribe lines are visible against the first electrochromic pane 110 in the tinted state. Although not shown, the bus bar bus bar 1 160(*a*) and bus bar 2 160(*b*) may also be partially visible in the tinted state. In the untinted state, bus bar bus bar 1 160(*a*) and bus bar 2 160(*b*) are visible. The issues related to visibility of bus bars and scribe lines in relation to conventional insulated glass units are addressed by, for example, not putting scribe lines in the viewable area, or otherwise obscuring them. Similarly, bus bars in the viewable area may be obscured by using transparent conductive materials for the bus bars. These concepts are described in U.S. patent application Ser. No. 15/780,606, filed on May 31, 2018 and titled “OBSCURING BUS BARS IN ELECTROCHROMIC GLASS STRUCTURES” and U.S. patent application Ser. No. 15/038,727 (now U.S. Pat. No. 9,952,481), titled “OBSCURING BUS BARS IN ELECTROCHROMIC GLASS STRUCTURES,” and filed on May 23, 2016; both of which are incorporated by reference herein.

Figure 2A:
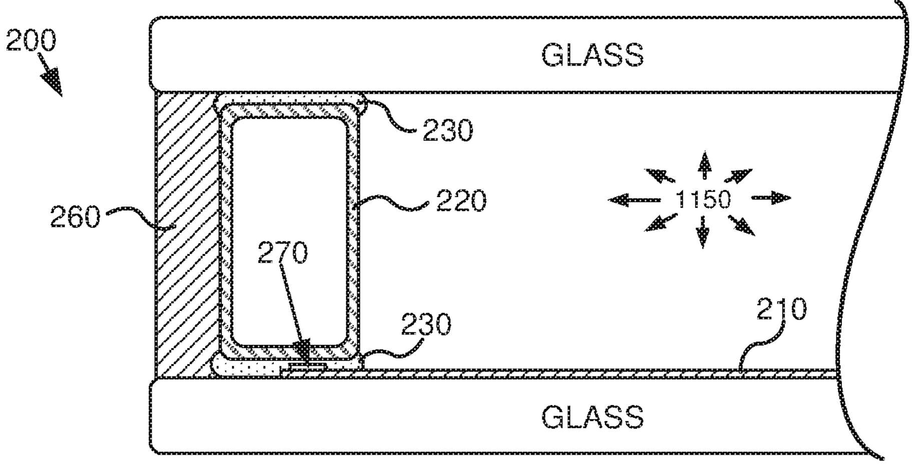
FIG. 2A depicts an electrochromic insulated glass unit configuration.

Improved insulated glass units, for example, as described in U.S. Pat. No. 9,958,750, which is hereby incorporated by reference in its entirety, are configured with bus bars under the spacer, i.e. in the primary seal, of the insulated glass unit. This is illustrated in FIG. 2A. In FIG. 2A, a partial cross-section of an electrochromic insulated glass unit 200, bus bar 270 is embedded in the primary seal 230 of the insulated glass unit 200; that is, the bus bar is sandwiched between the glass substrate and the spacer 220. Though there should be insulating primary sealant 230 between the bus bar and the spacer, in order to avoid electrical shorting between the bus bar and spacer, an electrically insulated spacer, for example polymeric (for example foam) or metal coated with an insulating material (for example color matched to the sealant, for example gray or black insulating material), is used.

Figure 2B:
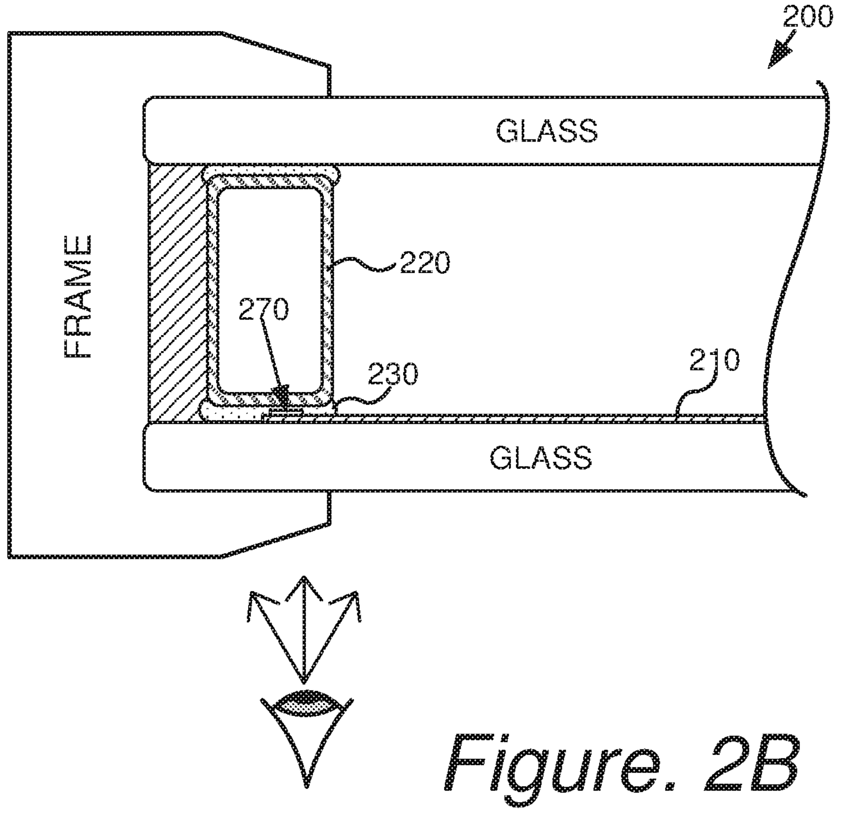
FIG. 2B depicts an electrochromic insulated glass unit configuration.

In the illustrated example, bus bar 270 is lying on the electrochromic device 210 disposed on a substrate. Thus when such insulated glass units are installed in a frame, there are no bus bars visible to the end user, because they are not in the viewable area, see FIG. 2B; i.e. the frame blocks a line of sight to the bus bars. Still, if such insulated glass units are glazed using a butt joint without flashing or other material covering the periphery of the insulated glass unit as a frame would otherwise do, an observer viewing the assembly from the outside will see bus bar 270 or other uncoated regions within the assembly through the glass as in the primary seal 230 or secondary seal 260, since the intervening electrochromic coating is transparent. Since bus bars are typically fabricated from a metallic material such as silver ink, they usually have a metallic color such as silver. These metallic-colored bus bars can be visible when seen in contrast with the rest of the assembly. Typical primary sealants are gray or black, so the metallic color has a high contrast against this dark or dull background. It is undesirable from an aesthetic standpoint to be able to see these bus bars and other uncoated regions (for example, scribe lines) within the assembly.

Figure 3:
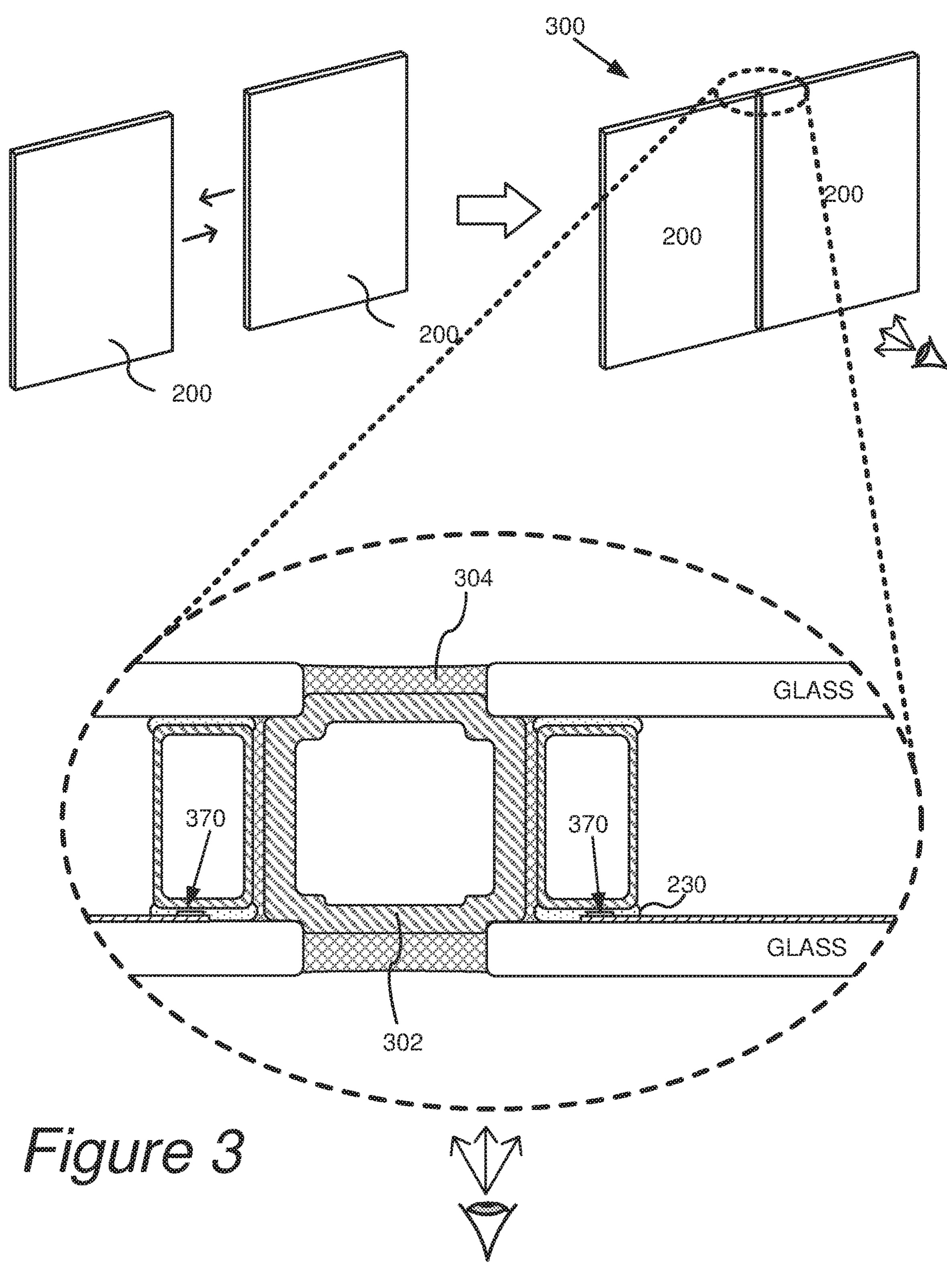
FIG. 3 is a schematic illustration of an electrochromic window assembly depicting a butt joint.

For example, an observer viewing a butt joint between adjacent insulated glass units of an electrochromic window assembly might be able to view conventional metallic bus bars within the assembly. FIG. 3 is a schematic drawing of an electrochromic window assembly 300 having a butt joint between two (2) insulated glass units 200 butted together. The dotted oval indicates a top view cross-section of the butt joint detail. Butt joints are used in window assemblies to increase the visible area by combining electrochromic glass windows (for example, insulated glass units) with little or no extra framing added. Electrochromic window assemblies that have a butt joint generally have one or more structural member between the electrochromic glass windows butted together that provide support at the joint. In the case of butted insulated glass units, for example, a structural member 302 may provide support between the panes of the butted insulated glass units, at least partially in the secondary seal area of each insulated glass unit. A secondary sealant, 304, such as structural silicone, covers structural member 302 and provides some rigidity. In such configurations, the bus bars, 370, but for embodiments described herein would be visible from the outside looking in (because the electrochromic pane is typically mounted on the outer pane of an insulated glass unit). If the adhesive bus bar 370 is configured to blend in with its background, in this example primary sealant 230, then the aforementioned aesthetically offending high contrast is overcome.

The inventors have discovered that adhesive bus bars with particular materials and properties are useful to blend in with their background, for example primary sealants, spacers and coatings on spacers. Some embodiments relate to methods of applying adhesive bus bars and also configurations for electrochromic windows comprising adhesive bus bars described herein.

I. Camouflaging Techniques

In certain embodiments, camouflaging techniques may be used to make the bus bar in an electrochromic window the same or similar color as the “background.” “Background” can refer to the element or elements of the electrochromic window that are visible from outside of the window from the viewpoint of the observer. In many cases, the “background” to a bus bar is the spacer or sealant in a primary seal of an insulated glass unit.

Contrast can refer to the difference in color (hue) and/or brightness (luminance) between the foreground feature being camouflaged and its background. One metric of the differences in brightness is a luminance contrast ratio between the measured luminance of the background and measured luminance of the feature being camouflaged. Examples of different luminance contrast ratios that can be used include Weber contrast ($C_w=(L_f-L_b)/L_b$), Michelson contrast ($C_{mich}=(L_{max}-L_{min})/(L_{max}+L_{min})$), Luminance ratio ($CR=L_f/L_b$), and RMS contrast, where $L_f$ is the measured luminance of the feature and $L_b$ is the measured luminance of the background. One metric of a difference in color contrast is the Delta E (or ΔE) developed by the International Commission on Illumination (CIE). Other measurements of color contrast may also be used such as CIE76, CIE94, CIEDE2000, etc.

In one embodiment, the adhesive bus bar backing comprises a color that approximates the color of the spacer and/or the primary sealant. In certain embodiments, a tinting agent can be added to the ECA used to fabricate the bus bar to mask its color and brightness and camouflage it with its background. Since black is a common background color, carbon black, or graphite may be used as a tinting agent in some cases; thus the tinting agent also is an electrical conductor. Focusing the tinting agent function, in certain cases, the tinting agent and/or the amount of tinting agent is selected based on measured luminance contrast ratio and measured color contrast (for example, measured Delta E) between the final color of the bus bar and the background. In one case, the tinting agent and/or amount of tinting agent is selected to be within a range of acceptable contrast values. In certain embodiments, the adhesive on a foil bus bar (collectively an "adhesive bus bar") comprises a carbon material, for example carbon black, carbon nanotubes, fullerenes, graphite and the like, and thus the adhesive approximates the color of its background, for example the primary sealant and/or spacer, coated or not. Certain embodiments include methods of color matching bus bar adhesive with the bus bar's background.

In some embodiments, bus bars may be fabricated from non-conventional bus bar materials that have the same color or similar color to the background and are also electrically conductive such as, for example, certain carbon-based materials. Some examples of suitable carbon-based materials include materials having carbon black, graphite, graphite-based materials, graphene, graphene-based materials, carbon nanotubes, fullerenes, etc. These materials have been shown to have excellent electrical conductivity and may be processed to fabricate conductive strips or similar structures suitable for bus bars.

In certain aspects, adhesive bus bars of electrochromic windows described herein reside almost entirely under the spacer or at least along their longest dimension. In these cases, the bus bar does not pass beyond the inner perimeter of the spacer, or an edge bead of primary sealant formed when the spacer and glass are pressed together to form the primary seal. For example, refer to FIG. 3. This configuration avoids creating a leak path in the seal that could potentially allow moisture into the sealed volume of the insulated glass and/or let gas in the unit to leak out. Since these bus bars reside under the spacer (sometimes referred to as "in the primary seal"), the spacer itself blocks the bus bars from being viewed from one side. In this case, only a single direction of view of the bus bars from the other side must be obscured by the frame or camouflaged. In this direction, the bus bars have the primary seal of the spacer in the background. Since only the view outside of the inner perimeter of the spacer needs to be blocked from view, much of the area within the inner perimeter of the spacer is available as viewable area.

Figure 7A:
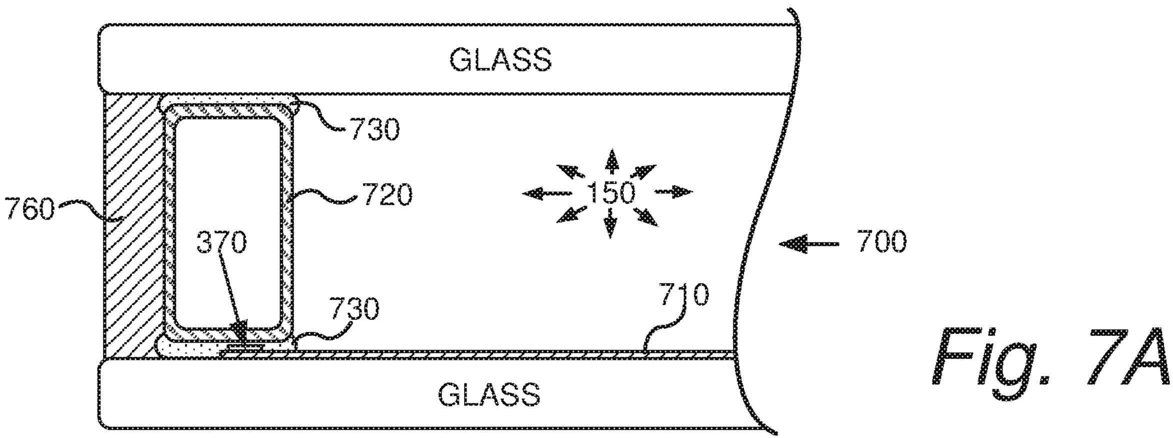
FIG. 7A is a drawing of a cross-sectional view of an adhesive bus bar configuration in an insulated glass unit.

Examples of bus bars residing under spacers can be found in U.S. Pat. No. 9,158,173 titled "SPACERS FOR INSULATED GLASS UNITS," and filed on Jan. 10, 2014, which is hereby incorporated by reference in its entirety. FIG. 7A shows an example in larger detail of a cross section, 700, of an edge region of an insulated glass unit where the spacer 720 of the insulated glass unit and an adhesive bus bar 370 reside. In the illustration, the bus bar 370 resides under spacer 720. In this context, "under" is used for convenience, bus bar 370 is between spacer 720 and one of the glass substrates of the insulated glass unit. As illustrated, spacer, 720, is sandwiched between two sheets of glass near the edge of the insulated glass unit. In a typical design, the glass interfaces directly with a primary seal material, 730, (for example, a thin elastomeric layer, such as PIB or PVB), which is in direct contact with spacer 720. In some embodiments, spacer 720 may be metal spacer, such as a steel spacer, aluminum or a stainless steel spacer, for example. Spacer 720 may be a foam or polymeric spacer, such as a silicone foam impregnated with desiccant, which is sealed with a primary sealant as a metal spacer would be. This three-part interface (i.e., glass/primary seal material/spacer) exists on both a top piece of glass and a bottom piece of glass. Spacer 720 may have a hollow structure, as depicted in FIG. 7A.

In some embodiments, the spacer may have a substantially rectangular cross section. In some embodiments the spacer and primary seal are a single structure, for example Ködispace 4SG is a reactive thermoplastic material that is extruded and used both as a spacer and a primary sealing element, commercially available from H. B. Fuller, of St. Paul Minn., U.S.A. One embodiment is an electrochromic insulated glass unit as described herein comprising a thermoplastic spacer. One embodiment is an electrochromic insulated glass unit as described herein comprising a 4SG spacer. Without wishing to be bound by theory, it is believed that placement of an adhesive busbar as described herein under a thermoplastic spacer, for example a 4SG spacer, provides mechanical rigidity for sustaining physical contact of the electrically conductive adhesive to the transparent conductive layer(s) and thus maintains low contact resistance during operation of the electrochromic device. During fabrication of the electrochromic insulated glass unit, the extrusion is at elevated temperature and thus the thermoplastic conforms around the adhesive busbar creating an overlapping bond. In one embodiment, thermoplastic spacer is applied, for example extruded, onto a transparent substrate comprising an adhesive bus bar on a transparent conductive layer, for example the adhesive bus bar configured on the transparent substrate as described herein, to form a spacer. In one embodiment, the extrusion temperature is between about 115° C. to about 150° C., in one embodiment between about 120° C. to about 140° C., in one embodiment between about 125° C. to about 135° C., in one embodiment between about 125° C. to about 130° C., in one embodiment about 128° C. The hot thermoplastic is pressed between the transparent substrate comprising the electrochromic device with adhesive bus bar(s) and a second transparent substrate. In one embodiment, the pressure applied is characterized by deformation from initial contact/sealing between each of the transparent substrates and the thermoplastic extrusion in the form of a spacer. The electrochromic insulated glass unit is formed by pressure on the transparent substrates toward each other. In one embodiment, the transparent substrates are compressed from an initial distance between them to a new distance that is between about 0.2 mm to about 5 mm shorter than the initial distance, in another embodiment between about 0.3 mm to about 4 mm shorter than the initial distance, in another embodiment between about 0.5 mm to about 3 mm shorter than the initial distance, in another embodiment between about 1 mm to about 2 mm shorter than the initial distance. In one embodiment, the thermoplastic spacer is between about 3 mm and about 10 mm in width (in this context, "width" of a spacer refers to the dimension of the spacer body orthogonal to the substrate edge and in the plane of the substrate, in the window industry this is sometimes referred to as "height"). In one embodiment, the thermoplastic spacer is between about 5 mm and about 10 mm in width, in one embodiment, the thermoplastic spacer is between about 7 mm and about 10 mm in width. In one embodiment, the electrochromic insulated glass unit further comprises a structural silicone secondary seal.

Figure 7B:
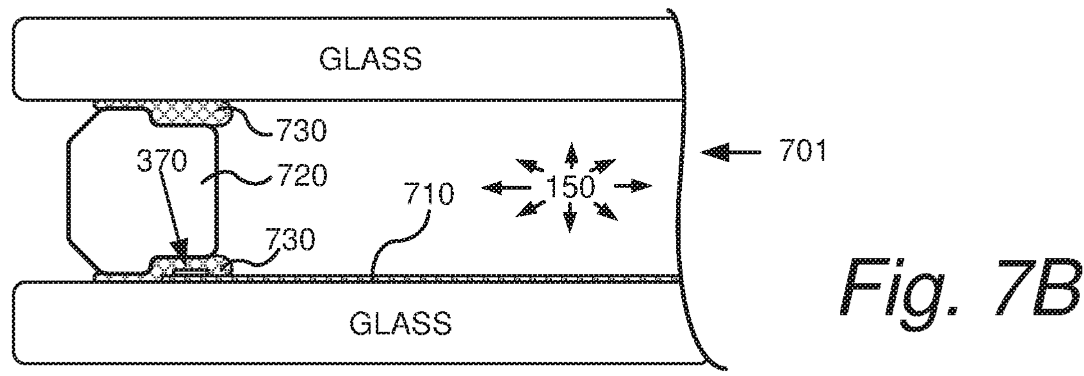
FIG. 7B is a drawing of a cross-sectional view of an adhesive bus bar configuration in an insulated glass unit.

At a minimum, spacers described herein have at least two surfaces, each substantially parallel to the lites of the insulated glass unit in which they are to be incorporated. The remaining cross section, for example, surfaces of the spacer that face the interior space of the insulated glass unit and the exterior, secondary seal area, space may have any number of contours, i.e., they need not be flat, but may be. In some embodiments, the top and bottom outer corners of the spacer are beveled and/or rounded to produce a shallower angle in these areas. Rounding, beveling, or smoothing may be included to ensure there are no sharp edges that might enhance electrical shorting. An example is depicted in FIG. 7B. Bus bar, 720, is located on electrochromic device stack 710 in order to make electrical contact with one of the electrodes of the device. In this example, bus bar 720 is between spacer 720 and the lower glass lite. Due to the cantilever shape of spacer 720 in this example, there is more room for sealant 730 and for bus bar 370. The cantilever shape essentially forms a channel for the bus bar and primary sealant, between the glass and the cantilevered overhang portion of the spacer.

Such spacers for example as shown in FIG. 7B, accommodate added vertical thickness of adhesive bus bars 370, as well as wiring that may be needed to deliver power to the bus bar. This additional volume for bus bar and sealant is provided on both sealing faces of the spacer, in some embodiments, such a spacer is used for an insulated glass unit containing two electrochromic panes. When using a spacer with two such channels in an insulated glass unit containing one electrochromic lite, there is no need for special placement of a single channel toward the electrochromic lite.

Figure 7C:
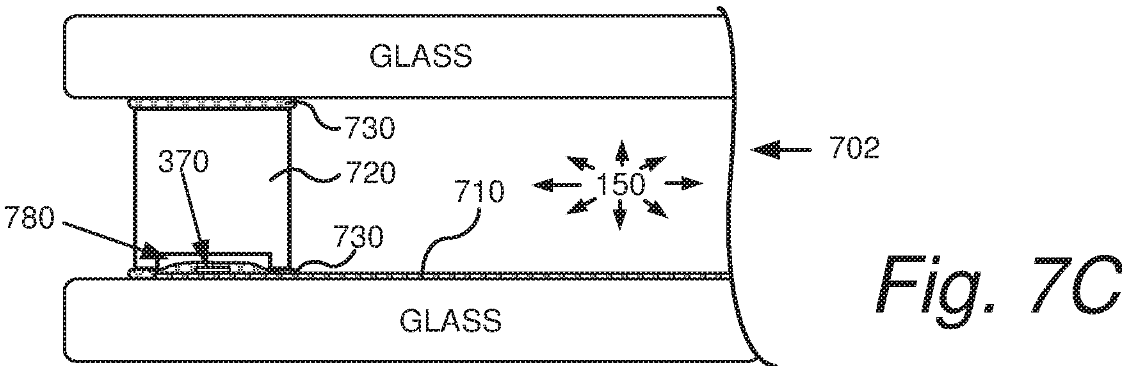
FIG. 7C is a drawing of a cross-sectional view of an adhesive bus bar configuration in an insulated glass unit.

FIG. 7C shows an example of a cross-sectional illustration of a spacer which has a notch on the bottom to accommodate an adhesive bus bar. As shown in FIG. 7C, a spacer, 720 has a channel, 780, that accommodates the length of bus bar 370. As in FIG. 7C, this channel provides more vertical space for adhesive bus bar 370 and sealant 730. Such space may be desirable, for example in embodiments where a thicker adhesive bus bar is used, for example a foil backing and/or conductive adhesive may be thicker than in other embodiments and require more room. Channel 780 in spacer 720 resides in the middle of the underside of spacer 720. The dimensions of channel 780 are suitable to accommodate bus bar 780. In some embodiments, the channel width is about 2 millimeters to about 5 millimeters, and the channel height is about 0.1 millimeters to 1 millimeter. In some embodiments, the channel width is about 3 millimeters to 4 millimeters, and the channel height is about 0.1 millimeter to about 0.5 millimeters.

In some embodiments, the bus bar includes a channel (sometimes referred to as a "mouse hole") at some angle to the length of the bus bar, for example orthogonal, for a bus bar lead (a wire or other conductor that establishes electrical communication between the bus bar and a power source). A mouse hole need only penetrate part way under the spacer because the bus bar resides underneath the spacer, and thus the lead to need not traverse the entire width of the spacer to reach the bus bar and make electrical connection. In some embodiments, the bus bar lead channel resides on an outside edge of the spacer or on an outside edge of a corner of the spacer.

In some embodiments, the electrochromic device stack 710 when in a colored state may color all the way under the spacer such that electrochromic device stack 710 is substantially uniformly colored in the entire viewable area. Further, the bus bar is not visible from one side of the insulated glass unit, by virtue of being under (behind) the spacer, and substantially not visually discernable from the opposite side of the insulated glass unit by virtue of the ECA's color substantially matching the primary sealant and/or the spacer.

Certain electrochromic insulated glass units or electrochromic IGUs, that include a first transparent substrate, a second transparent substrate, a spacer sandwiched between the first and second substrate, and an electrochromic device coating on the first transparent substrate. The electrochromic device coating includes a first transparent conductive layer, a second transparent conductive layer, and an electrochromic device stack disposed between the first and second transparent conductive layers. These electrochromic IGUs also include a first adhesive bus bar disposed on the first transparent conductive layer where the first adhesive bus bar is between the spacer and the first transparent substrate and lies at least along 90% of the longest dimension. For example, the first adhesive bus bar may lie along at least the side of a rectangular substrate having the longest dimension. In one embodiment, the first adhesive bus bar can be between the spacer and a transparent substrate entirely along its longest dimension, or, may have a portion that emanates from between the substrate and the spacer. For example, in one embodiment the first adhesive bus bar comprises a first leg including a first portion, between the transparent substrate and the spacer, spanning along substantially the entire length of a side of the spacer, and including a second portion emanating from between the transparent substrate and the spacer and extending to a secondary seal area on the transparent substrate.

The first adhesive bus bar may include an electrically conductive adhesive (ECA) and an electrically conductive backing. In one embodiment, an electrochromic IGU also includes a second adhesive bus bar disposed on the second transparent conductive layer. The first and second adhesive bus bars may have the same composition. In one embodiment, the first adhesive bus bars bar has the same or similar color as the spacer and/or a primary sealant between the spacer and the first transparent substrate. For example, the electrically conductive backing may have a color that approximates the color of the spacer and/or a primary sealant. As another example, the electrically conductive adhesive may have a tinting agent so that the electrically conductive adhesive approximates the color of the spacer and/or the primary sealant. In one aspect, the tinting agent includes at least one of carbon black, graphite, carbon nanotubes and fullerenes.

The adhesive bus bar electrically conductive backing can comprise any metal described herein, metallized plastics, conductive scrim (metallized woven fabric), carbon fiber, metallized carbon fiber and the like. In one aspect, the electrically conductive backing includes at least one of a metal, a metallized plastic, a metallized woven fabric, a carbon fiber, an alloy, and a metallized carbon fiber. In another aspect, the electrically conductive backing is a metal foil, e.g., a metal foil including at least one of silver, aluminum, titanium, tin, zinc, gold, nickel, copper, and any alloys thereof. The metal foil may be a laminated metal, for example, a metal foil including tin-plated copper. Alternatively, the metal foil may be a doped metal, for example, silver doped with palladium. Without wishing to be bound by theory, it is believed that doping silver with palladium inhibits electromigration of silver. In one embodiment, the metal foil backing is between about 5 μm and about 100 μm thick, in another embodiment between about 5 μm and about 50 μm thick, in another embodiment between about 5 μm and about 40 μm thick, in another embodiment between about 5 μm and about 20 μm thick. Thinner metal foil can be advantageous as it is flexible, though thicker foils can have higher electrical conductivities. A more flexible backing can be desirable because of its ability to easily conform to contours. In yet another aspect, the electrically conductive backing includes an adhesive and a conductive filler. In one embodiment, the conductive filler is selected from the group consisting of silver, gold, nickel, copper, carbon black, carbon fiber, metalized carbon fiber, carbon nanotubes, fullerenes, graphite, metal-coated glass beads, metal-coated glass flakes, metal-coated glass fibers, and meta-coated nickel particles. In another embodiment, the conductive filler includes metal-coated particles, where a metal coating on the metal-coated particles is selected from the group consisting of tin, silver, gold, copper and nickel. In another embodiment, the conductive filler comprises particles having shapes selected from the group consisting of spheres, rods, flakes, and irregular shapes. In another embodiment, the conductive filler particles comprise a maximum dimension that does not exceed 25 μm or a minimum dimension that is not less than about 0.5 μm.

II. Adhesive Bus Bars

The inventors have found that when conductive silver ink based bus bars are applied, the silver may penetrate or migrate into any defects to cause them to become optically visible via electrical shorting. This problem, as well as examples of methods to mitigate the effects of such visible defects, can be found in U.S. patent application Ser. No. 15/537,370, titled "MITIGATING DEFECTS IN AN ELECTROCHROMIC DEVICE UNDER A BUS BAR," and filed on Dec. 15, 2015, which is hereby incorporated by reference in its entirety. Embodiments herein disclose implementations of methods and devices that avoid the aforementioned silver problem and may camouflage bus bars from view as described herein.

An "adhesive bus bar" refers to a bus bar with an electrically conductive backing and a conductive adhesive used to both adhere the bus bar to a transparent conductive layer of an electrochromic device and also establish electrical communication between the electrically conductive backing and the transparent conductive layer. An electrically conductive adhesive ("ECA") may be, for example an adhesive that is otherwise non-electrically conductive but includes electrically conductive particles. An ECA may also be entirely adhesive that is electrically conductive, for example an organic polymer matrix that has charge-carrying groups, for example ionic head groups, quaternary amine salts, carboxylic acid salts, phosphate salts, mixtures thereof, and the like. In one embodiment, an ECA that entirely adhesive comprises a polymeric adhesive with charge-carrying agents that are not part of the polymer chain, such as metal ions, quaternary amine salts, carboxylic acid salts, phosphate salts, mixtures thereof and the like. A typical, but non-limiting example of an adhesive bus bar is a metal foil backing with an electrically conductive adhesive on at least one side of the metal foil backing.

The adhesive bus bar electrically conductive backing can comprise any metal described herein, metallized plastics, conductive scrim (metallized woven fabric), carbon fiber, metallized carbon fiber and the like. In one embodiment, the adhesive bus bar backing is a metal foil. In one embodiment, the metal foil comprises at least one of silver, aluminum, titanium, tin, zinc, gold, nickel, copper and alloys thereof. The metal foil may be laminated metals, for example, tin-plated copper. The metal foil may be a doped metal, for example, silver doped with palladium. Without wishing to be bound by theory, it is believed that doping silver with palladium inhibits electromigration of silver. In one embodiment, the metal foil backing is between about 5 μm and about 100 μm thick, in one embodiment between about 5 μm and about 50 μm thick, in another embodiment between about 5 μm and about 40 μm thick, in another embodiment between about 5 μm and about 20 μm thick. Thinner metal foil can be advantageous as it is flexible, though thicker foils can have higher electrical conductivities. A more flexible backing is desirable because it can conform to contours on a TCL.

Adhesive bus bars preferably are stable to visible, UV light, heat and thermal cycling, and maintain good adhesion when exposed to same, although heat and/or light may be used to cure the ECA. In one embodiment, an ECA comprises one or more additives for stability under exposure to the solar spectrum. Also, by using ECA formulations, for example epoxy, a rigid framework is provided for the conductive filler, providing low contact resistance and bulk conductivity.

Figure 4:
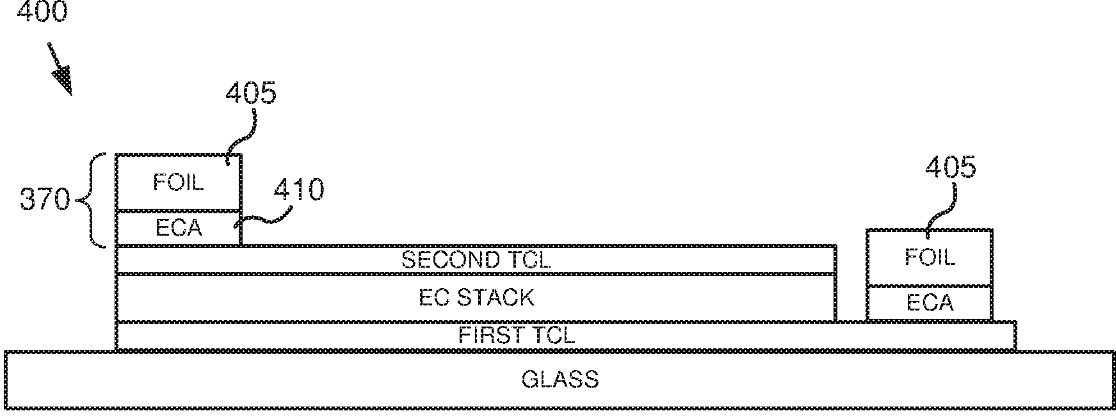
FIG. 4 is a drawing of a cross-sectional view of adhesive bus bars disposed on transparent conductive layers of an electrochromic device.
Figure 4:
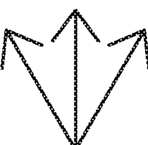
Figure 4:
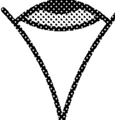

Referring to FIG. 4, a schematic cross-section representation of an adhesive bus bar, 370, on a transparent conductive layer (TCL) of an electrochromic device, 400, according to one embodiment. In the illustrated example, an electrochromic device 400 comprises a glass substrate, a first and a second TCL, and therebetween an electrochromic stack. The electrochromic stack includes an electrochromic layer (not shown) and may also include an ion conducting (electrically resistive) layer (IC) (not shown). The electrochromic stack may also include an opposing counter electrode layer (not shown) also known as an ion storage layer. This counter electrode layer may or may not be electrochromic. Such electrochromic devices may be constructed so that the electrochromic layer is cathodically coloring and the counter electrode layer is anodically coloring. Though this is not limiting, it has the advantage that the coloring layers are complimentary, i.e. they color or bleach concurrently and thus deeper coloration and more neutral coloration can be achieved.

The first and second TCL may include transparent conductive materials, such as metal layers, metal oxides, alloy oxides, and doped versions thereof. Conductive layers of electrochromic devices are sometimes referred to as "TCLs" or "TCOs" because they are made from transparent conductive oxides such as transparent metal oxides. The term "TCL" is generally used to refer to a wide range of transparent conductive materials that can be formed as conductive layers used to deliver potential across the face of an electrochromic device to drive or hold an optical transition. While such material layers are sometimes referred to as "TCLs" in this disclosure, the term encompasses layers with non-oxides as well as oxides that are transparent and electrically conductive such as certain very thin metals and certain non-metallic materials. Transparent conductive material typically has an electronic conductivity significantly greater than that of the electrochromic material or the counter electrode material. For example, the transparent conductive material may have a resistivity of at least about 100 microohm-cm (also referred to as "μχ-cm") to about 600 microohm-cm. Further, the transparent conductive material may have a sheet resistance of at most about 10 ohms/square to about 20 Ohms/square. In certain embodiments, the transparent conductive material has a sheet resistance of less than 10 ohms/square, or less than 5 Ohms/square. Examples of transparent conductive materials include indium tin oxide (ITO), fluorinated tin oxide (FTO), and aluminum zinc oxide (AZO). In certain aspects, TCLs as described herein include multi-layer structures. For example, a TCL may include a first ITO layer, a metal layer, and a second ITO layer, with the metal layer between the two ITO layers. In one aspect, a TCL is a multi-layer structure having one or more layers of transparent conductive materials. Some TCLs may also include a metallic top and/or bottom conductive layer. In general, however, the transparent conductive layers of an electrochromic device can be made of any transparent, electrically conductive material that is compatible with the electrochromic device stack. The electrochromic device may include an ion diffusion blocking barrier layer or layers between the first TCL and the glass substrate, for example when soda lime glass is the substrate, to prevent sodium ions from poisoning the device (for example a device that uses lithium ions for switching).

A. Electrically Conductive Adhesives (ECAs)

Referring to FIG. 4 adhesive bus bars, 370, comprise an electrically conductive foil backing, 405, and an electrically conductive adhesive ("ECA"), 410. In certain embodiments, the ECA is a pressure sensitive adhesive ("PSA"). Generally speaking a PSA refers to an adhesive that requires pressure to adhere to a surface, such as a silicone, polyvinylbutyral, polyvinyl alcohol based adhesives. An epoxy, for example, is generally not thought of as a PSA. In certain embodiments, pressure is applied to adhere an adhesive bus bar to a TCL, therefore, ECA and PSA may be used interchangeably herein, but it is to be understood that not all ECAs require pressure for adhesion. For example, in some embodiments, an ECA is applied to a TCL alone, and then a foil backing is applied, this may or may not require pressure applied to the foil backing. Typically, at least minimal pressure is applied in many embodiments, so the term PSA is often used to describe an ECA. In one embodiment, only heat is used to adhere an adhesive bus bar to a TCL. In another embodiment, only pressure is used to adhere an adhesive bus bar to a TCL. In certain embodiments, heat and pressure are used to adhere an adhesive bus bar to a TCL.

Without being held to any particular theory of operation, it is believed that when an adhesive bus bar is coupled a TCL layer using an ECA made up of conductive fillers selected to have a particular dimensional properties, or avoiding conductive fillers with electromigration issues, for example silver, the penetration and migration of the ECA into and through any defects that may be present in the TCL layers can be substantially or completely eliminated. This enables an electrochromic device, to be manufactured while avoiding any need to deactivate areas under the bus bars (to obviate shorting issues). Though, in one embodiment silver particles are used, as ECA adhesive compositions can avoid the aforementioned silver problem, for example, epoxy-based ECAs appear to avoid this issue.

Generally, an ECA should not outgas post cure and should be highly impermeable to water and gas transport (for example argon). In one embodiment, the ECA has a moisture permeability of <0.1 g $H_2O/m^2$/day at 25° C. at 100% relative humidity. An ECA preferably is compatible with primary sealants such as PIB and spacer materials such as silicone, stainless steel, aluminum and the like, for example such materials do not compromise cure, strength, or adhesion of the ECA.

In some embodiments, an ECA comprises a formulation that is curable with heat, but that can provide sufficient adhesion of an adhesive bus bar to an underlying TCL without necessarily requiring that the ECA be cured. In some embodiments, bus bars 370 can be coupled to electrochromic device 400 during manufacture of the device in a sputter coating apparatus, where, as desired or needed and while in the sputter coating apparatus. In these embodiments, the ESA may or may not be cured with heat from sputtering operation(s). In some embodiments, adhesive bus bars 370 may be coupled to electrochromic device 400 after heat-reliant TCL and electrochromic deposition manufacturing steps are completed in a sputter coating apparatus, and as desired or needed, after exiting the sputter coating apparatus, the ECA formulation may or may not be cured.

The ECA formulations described herein are intended to provide bonding strength between a foil backing and an underlying TCL layer such that there is little risk that the bus bars will move or become unstuck during use or fabrication steps, even if the bus bars are subjected to significant handling and/or manipulation. In some embodiments, an ECA exhibits good peel strength, but remains soft and tough enough to withstand thermal cycling and other harsh environmental conditions that may occur over long periods of time. In embodiments, in addition to its formulation, an ECA is formed with a thickness capable of accommodating particular sized conductive particles and a desired amount of conductivity/contact resistance, for example, to prevent Argon loss in an insulated glass unit through the adhesive, as well so as to provide sufficient peel strength. In one embodiment, an ECA comprises a thickness that is less than 300 μm, in one embodiment a thickness that is less than 100 μm, in one embodiment a thickness that is less than 50 μm, in one embodiment a thickness that is less than 50 μm, in one embodiment a thickness that is between about 10 μm and about 50 μm, in yet another embodiment between about 15 μm and about 40 μm, in yet another embodiment between about 20 μm and about 35 μm. In one embodiment, for a 300 mm long adhesive bus bar, contact resistance is about 0.0675 ohms. In one embodiment, an ECA formulation has a pre-cure glass transition temperature ($T_g$) in the range of about −50° C. to about −10° C., in another embodiment in the range of about −10° C. to about 0° C., in another embodiment in the range of about 0° C. to about 20° C. Since in certain implementations ECAs are exposed to heat, in one embodiment the post-cure $T_g$ is above 80° C., in another embodiment above 90° C., in another embodiment above 100° C. In some embodiments, the ECA provides a peel strength of at least 25 oz/inch width (about 2.7 N/cm width), typically greater than about 40 oz/inch width (about 4.3 N/cm width). In a one embodiment, an ECA provides a minimum peel strength of at least 50 N/mm per unit width.

In some embodiments, an ECA comprises one or more polymers and is curable, either by itself or in the presence of one or more crosslinking components. Alternatively, an ECA may include a non-reactive polymer blended with one or more crosslinking components (for example a multifunctional monomer, oligomer, or polymer) to form a curable ECA formulation. Blends of such reactive and non-reactive polymers may also be used in other cases. Exemplary reactive polymers that may be used as the base polymer of the adhesive formulation include acrylic copolymers that incorporate epoxy, carboxylic acid, amine, mercaptan, amide, isocyanate, cyanate ester, allyl, maleimide, acrylate, oxetane, silicone hydride, alkoxysilane, or other reactive groups pendant to the polymer backbone or within the polymer backbone. Exemplary reactive monomers used for acrylic ECA polymers include a glycidyl methacrylate, a hydroxyethyl acrylate, an allyl methacrylate, an isocyanatopropyl acrylate, an N-vinylpyrollidone, and an acrylic acid. Other functional acrylate monomers may also be used. Exemplary non-reactive polymers include polymers formed from acrylates such as a butyl acrylate, a methyl acrylate, an ethylhexyl acrylate, an isooctyl acrylate, and a methyl methacrylate.

In some embodiments, ECA formulations can also include non-acrylic polymers as the base polymer alone or in combination with acrylic polymers. Both reactive and non-reactive non-acrylic polymers may be used in the formulation. Suitable non-acrylic polymers for use in accordance with exemplary embodiments include, without limitation, phenolic resins, aliphatic polyesters, aromatic polyesters, polyether polyols, polyester polyols, amine-functional acrylonitrilebutadiene copolymers, carboxylic acid-functional acrylonitrilebutadiene copolymers, polyurethanes, polyamides, rubberized epoxy prepolymers such as carboxyl-terminated liquid butadiene acrylonitrile (CTBN)-epoxy adducts, and hydroxyl-functional acrylonitrilebutadiene polymers.

Reactive or non-reactive base polymers may be synthesized and some are of the synthesized polymers are commercially available. For example, acrylic reactive polymers may be synthesized by free-radical polymerization of monomers in the presence of a solvent. In such cases, any suitable free radical initiator may be used; exemplary initiators include, but are not limited to, peroxy and/or azo compounds. Polyester, polyurethane, CTBN-epoxy adducts, olefinic and rubber polymers, rubber block copolymer, and other base polymers can similarly be synthesized by known methods and some are commercially available.

Crosslinking components can be blended with non-reactive base polymers to provide a reactive adhesive formulation, although crosslinking components may also be used in combination with reactive base polymers to provide a curable formulation. Typical crosslinking components are those which include epoxy, acrylate, oxetane, maleimide, alcohol, mercaptan, isocyanate, cyanate ester, alkoxysilane, silicon-hydride, allyl, and benzoxazine functionalities. The crosslinking components containing such reactive groups may be present as monomers, multifunctional resins, oligomers, or polymers.

One suitable class of crosslinking components includes oligomers such as aliphatic and aromatic urethane acrylates. Another suitable class includes aliphatic and aromatic epoxy resins. In some cases, epoxy resins which are not soluble in the base polymer, and thus exhibit improved latency, may be used. Other reactive components for use as crosslinking components include, but are not limited to, multifunctional alcohols, multifunctional acrylate resins, and multifunctional isocyanates (sometimes in the form of a chemically blocked isocyanate). While the selection of crosslinking components is not limited to specific cure chemistries, exemplary embodiments specifically contemplate formulations that can be cured by a radical cure, hydroxyl-blocked isocyanate cure, epoxy-latent amine cure, and an insoluble epoxy-amine cure, by way of example.

The amount of crosslinking component may be between about 0.1% by weight to about 70% by weight of the organic solids content of the formulation (i.e., excluding solvent and fillers), depending on the level of cure sought to be achieved and whether or not the crosslinking component is used in combination with an already reactive polymer or with a non-reactive polymer. More typically, the crosslinking component is about 0.5% by weight to about 20% by weight of the organic solids content of the formulation.

Reactive or non-reactive polymer(s) and/or the crosslinking component(s) for use with a particular formulation in accordance with exemplary embodiments may depend upon whether curing or no curing will be employed. As discussed, a cure profile may be configured to correspond to that of a fabrication process and/or a particular step within that fabrication process. In some cases, there may be multiple instances during, for example, device fabrication that employs a thermal profile that could, or not, result in curing, depending on the curing characteristics of the ECA formulation used to make adhesive bus bars. For example, the formulation may be selected such that cure occurs in conjunction with a particular thermal profile that will be employed at a particular point during the fabrication of the electrochromic device. One such example is the thermal profile already used to cure cell encapsulation materials such as ethyl vinyl acetate (EVA) or polyvinyl butyral (PVB) during cell fabrication, which typically includes a thermal cure profile of 10-15 minutes at 150-170 ° C., which is within the range of temperatures sputter coaters are capable of applying. In another example, adhesive bus bars are cured during a thermal anneal of the electrochromic device. In yet another example, the adhesive bus bars are cured after the electrochromic device is annealed.

Conductive Particles in ECA

Figure 5:
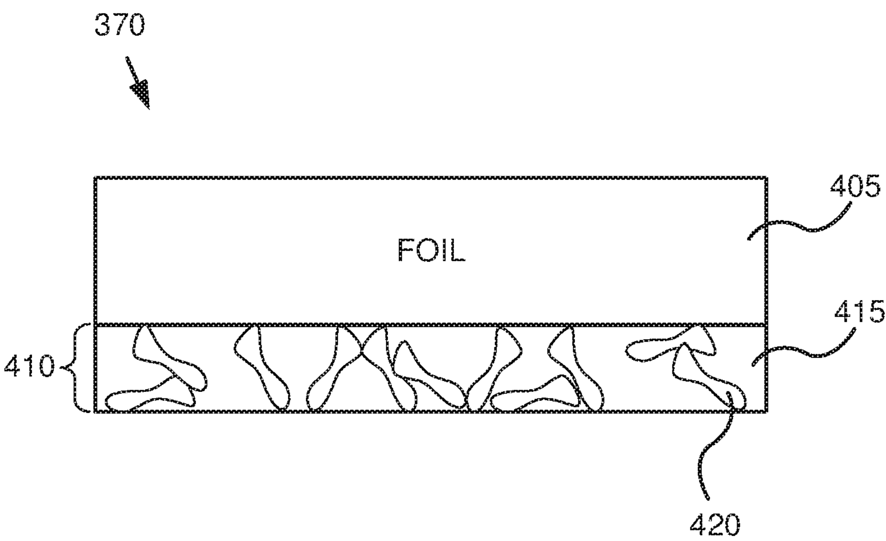
FIG. 5 is a drawing of a cross-sectional view of an adhesive bus bar.

In one embodiment, an ECA formulation, including any crosslinking components, is mixed thoroughly with a conductive filler, optionally using a solvent that facilitates mixing, to form a resulting reactive conductive adhesive formulation that is used to couple, both mechanically and electrically, a conductive metal substrate, for example a foil, to a TCL. FIG. 5 depicts a cross section of an adhesive bus bar, 370, comprising an electrically conductive backing ("ECB"), such as a foil backing, 405, and an ECA, 410, on one face of foil backing 405. The ECA 410 comprises an adhesive, 415, for example as described herein, and in this example, conductive particles or filler, 420. Conductive filler 420 may be present at about 0.1% by weight to about 90% by weight solids of the total adhesive formulation (i.e. excluding the mass of any optional solvents). Conductive fillers may include metals such as silver, titanium, tin, zinc, gold, nickel, copper, alloys thereof, carbon black, carbon fiber, carbon nanotubes, fullerenes, graphite, metalized carbon fiber, as well as metal-coated glass beads, metal-coated glass flakes/fibers, and metal-coated nickel particles, all by way of example. In embodiments, metal coating can be any conductive metallic material such as tin, silver, nickel, gold, copper, etc. In some embodiments, conductive filler is defined by one or more shapes that include, but is not limited to, spheres, balls, rods, flakes, and elongated and irregular shapes. In some embodiments, conductive filler particles may also be defined by one or more dimension that is less than a thickness of the ECA and/or a dimension large enough to span the entire thickness of the ECA. In some cases, conductive fillers particles comprise a width or diameter that does not exceed about 25 um or that is not less than about 0.5 μm.

It will be appreciated that conventional additives used with other known ECA formulations for various purposes may also be employed. If a solvent is used, it may be a common solvent in some cases. If desired for processing purposes, the viscosity of the ECA formulation can be adjusted by adding or removing solvent. Solvents that may be used include ethyl acetate, toluene, hydrocarbons such as heptane or hexane, alcohols, and combinations thereof, all by way of example only. In certain embodiments, an ECA may be applied to a foil backing with a solvent and the solvent removed. The foil is then cut into adhesive bus bar strips. The strips are applied to the TCL with applied pressure and optionally heat to flow the ECA and/or initiate cross-linking of polymer precursors of the ECA.

In some embodiments with an adhesive bus bar, an ECA is coated onto a electrically-conductive substrate such as a conductive metal for example, tin-coated copper foil. Other suitable conductive substrates include aluminum foil, silver foil, copper foil, metalized plastics and conductive scrim, all by way of example only. In one example, an ECA formulation includes a base polymer, any crosslinking components, conductive filler(s), any other fillers, and optional solvent that can be coated onto a conductive substrate. In some cases, a conductive substrate is in the form of a conductive tape, metal foil or organic conductive polymer. An adhesive bus bar can have an aluminum or silver foil backing, though these metals are prone to electromigration, because the metal foil is separated from the TCL by the ECA. It is helpful if the ECA itself does not have electromigration prone metal particles, such as silver and aluminum; however adhesive formulations can be used to mitigate problems with such metals particles, in certain embodiments, as well as doping silver with electromigration inhibitors such as palladium and/or having larger grain boundaries in the silver. In one embodiment, an ECA includes silver particles doped with palladium.

In one embodiment, a release liner, such as a silicone release liner, can be laminated over the ECA that is applied to the conductive substrate until the adhesive bus bar is ready to be coupled to the TCL layer. At this point, the release liner can be removed to expose the ECA prior to coupling to the TCL layer. In other embodiments it may be desirable to apply an ECA solution to a release liner first, followed by drying to remove excess solvent, and thereafter laminating the adhesive/liner combination to a conductive substrate, for example metal foil, of the adhesive bus bar using a roller or similar device.

As described previously, for example when metal-based bus bars are used with an electrochromic device that has its layers deposited on interior-facing surface, and when the glass is viewed from the face proximate the bus bar, the metallic color of the bus bars may visually contrast with the rest of device. It is undesirable from an aesthetic standpoint to have such bus bars. As described herein, for example when the ECA formulation is mixed with carbon black by itself or in combination with other conductive fillers, the ECA and thus the bus bars can be made to be less visually discernable. Other benefits and advantages derive from using adhesive bus bars described herein. For example, adhesive bus bars can be fabricated to have more uniform dimensions and improved processing yields as compared to ink based bus bars whose variations in whose dimensions are more difficult to detect. In one embodiment, adhesive bus bars comprise a width between about 1 mm and 5 mm and a thickness of between 35 μm and 3.5 μm. Compared to ink-based bus bars, adhesive bus bars in the form of tape can be manufactured with a width that varies less along its length, which leads to improved product performance variation and reduced reliability risk. A substantially constant width as can be provided by adhesive bus bars also enables more constant electrical conductivity along their length and as a result enables more uniform voltage across TCL layers, which in turn translates to more uniform coloration of the electrochromic window.

Also, compared to use of silver ink based bus bars, adhesive bus bars eliminate busbar pooling and residue that can happen with a silver ink bus bar. Such pooling can also limit product yields. Further, use and cost of semi-precious metals like silver can be eliminated if desired via the use of common metals such as tin and copper in adhesive bus bars. Because in some embodiments adhesive bus bars can be used without curing, additional ovens may not be needed. Further, in an embodiment where a tin metal surface is applied over an underlying metal foil, adhesive bus bars can be made to be more resistant to environmental degradation such as moisture corrosion and UV exposure, and can be made to be more thermally and mechanically robust by being inherently resilient to cohesive failure, flaking, or cracking that can occur in an ink based system. Also, when conductive metal foil is used, subsequent electrical connections thereto can be made more easily via soldering, which soldering to ink based bus bars can sometimes cause ink delamination or ink melting. As an example, a tin plating can also aid in soldering electrical connections to the adhesive bus bar. In one embodiment, a solder joint is made to an adhesive bus bar without substantially changing the electrical conductivity between the TCL and the ECA at the solder joint.

One embodiment pertains to an adhesive bus bar including an electrically conductive adhesive (ECA) as described herein and an electrically conductive backing as described herein.

Certain embodiments pertain to adhesive bus bars that include an electrically conductive adhesive (ECA) and an electrically conductive backing having at least one of a metal, a metallized plastic, a metallized woven fabric, a carbon fiber, an alloy, and a metallized carbon fiber. In one embodiment, the electrically conductive adhesive is between about 10 μm and about 50 μm thick. In another embodiment, the electrically conductive adhesive has a post-cure $T_g$ is above 80° C. In another embodiment, the electrically conductive adhesive has a peel strength of at least about 2.7 N/cm width. In another embodiment, the electrically conductive adhesive includes a tinting agent, e.g., at least one of carbon black, graphite, carbon nanotubes and fullerenes.

In some embodiments pertaining to adhesive bus bars, the electrically conductive backing includes a metal foil. The metal foil may include at least one of silver, aluminum, titanium, tin, zinc, gold, nickel, copper and alloys thereof. The metal foil may be a laminated metal, for example, tin-plated copper. The metal foil may be a doped metal or a doped alloy. For example, the metal foil may be silver doped with palladium. In one embodiment, the metal foil is between about 5 μm and about 50 μm thick.

In some embodiments of adhesive bus bars, the electrically conductive adhesive includes an adhesive and a conductive filler. In one embodiment, the conductive filler is selected from the group consisting of silver, gold, nickel, copper, carbon black, carbon fiber, metalized carbon fiber, carbon nanotubes, fullerenes, graphite, metal-coated glass beads, metal-coated glass flakes, metal-coated glass fibers, and metal-coated nickel particles. In another embodiment, the conductive filler includes metal-coated particles where a metal coating on the metal-coated particles is selected from the group consisting of tin, silver, gold, copper and nickel. In another embodiment, the conductive filler includes particles having shapes selected from the group consisting of spheres, rods, flakes, and irregular shapes. In another embodiment, the conductive filler includes particles having a maximum dimension that does not exceed 25 μm or a minimum dimension that is not less than about 0.5 μm. In another embodiment, the conductive filler includes particles having at least one of silver, aluminum, titanium, tin, zinc, gold, nickel, copper and alloys thereof. In another embodiment, the conductive filler includes particles comprising a laminated metal. In another embodiment, the conductive filler includes particles comprising tin-plated copper. In another embodiment, the conductive filler includes particles comprising doped metal (e.g., silver doped with palladium) or doped alloy. For example, the dope metal may e silver doped with palladium. In another embodiment, the adhesive is an a-stage adhesive or a b-stage adhesive. In another example, the adhesive is an epoxy.

B. Application of Adhesive Bus Bar to TCL

Figure 6:
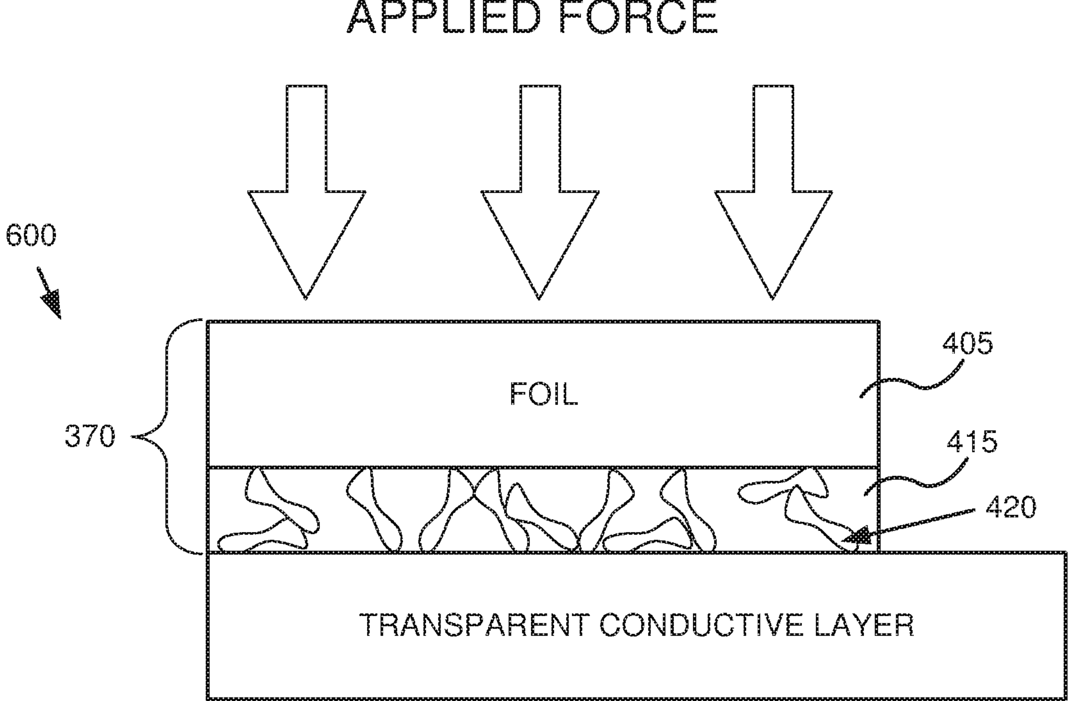
FIG. 6 is a drawing of a cross-sectional view of an adhesive bus bar on a transparent conductive layer.

In one embodiment, adhesive bus bars are applied to a TCL with applied pressure. In another embodiment, both pressure and heat are used to apply an adhesive bus bar to a TCL. The heat is used to flow the ECA and/or initiate cross-linking of polymer precursors of the ECA. FIG. 6 depicts a cross section of an assembly, 600, comprising an adhesive bus bar, 370, being adhered to a TCL. The TCL is part of an electrochromic device (not shown). Force is applied, for example, using a press, roller or similar device. Pressure alone may be sufficient to adhere adhesive bus bar 370 to the TCL, but in some embodiments heat is also used. Pressure may be required to make good electrical contact between the foil backing and the TCL, but in certain embodiments heat serves to flow the adhesive portion 415 sufficiently to make it tacky and adhere to the TCL. In one embodiment, heat is applied to initiate reaction between polymer precursors in the ECA. For example, as described herein, a two part epoxy-based ECA is used. When the pressure and heat are applied to the adhesive bus bar, the ECA flows and the precursors sufficiently mix to start a chemical chain reaction to polymerize the adhesive portion 415. Conductive particles (filler) 420 have dimensions and/or are of sufficient density in the ECA to make electrical connection between the foil and the TCL.

In one embodiment, the ECA comprises an a-stage or a b-stage adhesive. An "a-stage" adhesive is one that is cured in a single step or stage. A "b-stage" adhesive is one that is cured in two steps or stages, for example components of the adhesive are applied and partially cured and/or solvents removed "predried," followed by a full cure at a later stage. Thus, predrying can comprise simply removing solvents or other carriers to decrease viscosity and/or literally dry out polymer precursors or polymers, and/or partially cure polymer precursors. One example of an a- or b-stage adhesive is an epoxy-based adhesive. In one embodiment, the epoxy-based adhesive is an a-stage epoxy. In one embodiment the epoxy-based adhesive is a b-stage epoxy. A "b-stage epoxy" is a one component epoxy system, using a latent (low reactivity) curing agent. Thus, a b-stage epoxy can be partially cured (sometimes referred to as "pre-dried"), as an initial stage after being applied onto one substrate/surface, for example a foil backing as described herein. It can, for example at a later time, be completely cured under heat and pressure. This is significantly different from an "a-stage epoxy" that is provided in a one or two component format and, is cured in one step at ambient or elevated temperatures. An advantage of a-stage epoxy ECA's is that they do not require pressure to cure. Thus one embodiment is application of an adhesive bus bar to a TCL using only heat. Certain methods described herein use b-stage epoxy ECA, for example, to enable processing advantages. In one embodiment, the b-stage expoxy ECA is applied to a foil backing and partially cured (predried). One advantage of this approach is that a protective peel away cover does need to be applied to the ECA during storage, although in one embodiment it is applied. In one embodiment a b-stage epoxy ECA is applied to a foil backing and partially cured (predried) in one location, and its final cure in another location, upon application to the TCL. In one embodiment, a b-stage epoxy ECA is applied to the TCL, then predried, and thereafter a foil backing is applied to the ECA with heat and/or pressure to form an adhesive bus bar and adhere it to the TCL concurrently. The latter method has the advantage that an ECA can be applied to the TCL first, and the foil backing chosen at a later time, and for example, different foil backings can be applied to the same electrochromic window if desired. This adds flexibility to processing. In one embodiment, a a-stage epoxy ECA is applied to a TCL, followed by application of a foil backing and curing of the a-stage epoxy ECA. The application of foil to an ECA on a TCL and heating to cure the ECA can be concurrent or done serially. Ultraviolet light or other light energy (for example laser energy) may be applied to an ECA, through the TCL, with or without heat and applied pressure, to cure an ECA. Adhesive bus bar applications described herein can comprise using UV or other light energy alone or in combination with heat and/or pressure. Applied heat described herein may be supplied using and oven, a heat lamp, a laser, a hot roller, a hot press and the like.

When curing an ECA with heat, the heat should be compatible with the electrochromic device in question. For all solid state and inorganic electrochromic devices, for example sputtered metal oxide type, cure temperatures up to 350° C. may be compatible. In one embodiment an ECA is cured at between about 80° C. and about 400° C., in another embodiment between about 100° C. and about 350° C., in another embodiment between about 150° C. and about 250° C., in another embodiment between about 150° C. and about 200° C., in yet another embodiment between about 160° C. and about 180° C. In one embodiment, curing time is between about 1 minute and about 60 minutes, in another embodiment between about 5 minutes and about 30 minutes, in yet another embodiment, between about 10 minutes and 20 minutes, in yet another embodiment about 15 minutes. It is understood that the above temperature ranges and times may be combined in any combination, and each such combination is an embodiment. For example, in one embodiment an ECA is cured at a temperature of between about 150° C. and about 200° C., for between about 10 minutes and about 20 minutes.

Pressure, if applied during application of an adhesive bus bar to a TCL as described herein, can be between about 5 psi and about 100 psi. In one embodiment, pressure is applied to adhere an adhesive bus bar to a TCL, where the pressure is between about 5 psi and about 100 psi, in one embodiment between about 10 psi and about 50 psi, in one embodiment between about 10 psi and about 25 psi. In one embodiment, a b-stage epoxy ECA is used, where a first pressure and heat are applied to melt ("wet") the ECA, followed by a cure without pressure, at the same or different temperature as the melt stage Certain embodiments pertain to methods of fabricating an electrochromic device include: (a) applying an electrically conductive adhesive to a transparent conductive layer of the electrochromic device, (b) applying an electrically conductive backing to the electrically conductive adhesive, and (c) applying a pressure (e.g., applied using a press or a roller) and/or a heat (e.g., applied using at least one of an oven, a heat lamp, a laser, a hot roller and a hot press) to the electrically conductive backing where the electrically conductive adhesive is sandwiched between the transparent conductive layer and the electrically conductive backing. The operations may be performed in different orders. For example, the operations may be performed in the order (a), then (b), and then (c). As another example, the operations may be performed in the order (b), then (a), and then (c). The conductive adhesive may include a two-part epoxy, an a-stage adhesive such as a pressure sensitive adhesive, or a b-stage adhesive such as an epoxy. If the conductive adhesive includes an a-stage adhesive, in certain embodiments pressure may not be applied or heat may not be applied. If the conductive adhesive includes a b-stage adhesive, the b-stage adhesive may be predried either on the electrically conductive backing or on the transparent conductive layer, prior to (c), and fully cured during (c). If the b-stage adhesive is an epoxy, the epoxy may be applied to the electrically conductive backing and predried, prior to (c), or, the epoxy may be applied to the transparent conductive layer and predried, prior to (c). In one example where the-stage adhesive is an epoxy, the electrically conductive backing is a metal foil. In one embodiment, operation (c) also includes applying an ultraviolet light to the electrically conductive adhesive, e.g., applying the pressure and the ultraviolet light, but not the heat, to the electrically conductive adhesive. In another embodiment, operation (c) includes applying the pressure and the heat to flow the electrically conductive adhesive and/or initiate cross-linking of polymer precursors of the electrically conductive adhesive.

In some of these methods, operation (c) includes applying at least heat to the electrically conductive backing. In one embodiment, applying heat includes heating to between about 80° C. and about 400° C., in another embodiment, applying heat includes heating to between about 100° C. and about 350° C., in another embodiment, applying heat includes heating to between about 150° C. and about 250° C., and in another embodiment, applying heat includes heating to between about 160° C. and about 180° C. In one embodiment, applying heat includes heating for between about 1 minute and about 60 minutes, in another embodiment, applying heat includes heating for between about 5 minutes and about 30 minutes, in another embodiment, applying heat includes heating for between about 10 minutes and about 20 minutes. In one embodiment, applying heat includes heating to between about 150° C. and about 200° C., for between about 10 minutes and about 20 minutes. In some of these methods, operation (c) includes applying at least pressure to the electrically conductive backing. In one embodiment, applying the pressure includes applying pressure at between about 5 psi and about 100 psi, in another embodiment, applying the pressure includes applying pressure at between about 10 psi and about 50 psi, in another embodiment, applying the pressure includes applying pressure at between about 10 psi and about 25 psi. In one embodiment, a first pressure may be applied and heat is applied in order to melt the electrically conductive adhesive, followed by a cure without pressure at the same or different temperature as is applied during the first pressure application.

C. Adhesive Bus Bar Configurations

Various embodiments comprise adhesive bus bar configurations on electrochromic windows in the form of insulated glass units. Certain electrochromic insulated glass units, for example those manufactured by View, Inc. of Milpitas, Calif., U.S.A., maximize the viewable area of the electrochromic window. Besides making the largest electrochromic windows ever made, for example 6 feet×10 feet (1.8 m×3.0 m), the viewable area is maximized in any size electrochromic insulated glass unit by configuring the bus bars outside of the viewable area, for example within the primary seal, or "under the spacer" as it is sometimes termed. Advantages of this configuration also include protecting the bus bar from moisture that would be encountered in the secondary sealing volume of an insulated glass unit (for example structural silicone is not an efficient moisture barrier). Further details of such configurations are described, for example, in U.S. Pat. No. 9,958,750. As described herein, adhesive bus bars can be camouflaged to blend in with their background, the primary sealant and/or the spacer, by virtue of adjusting the color and other optical properties of the ECA. Further, there are application advantages as described herein, for example, as compared to silver ink bus bars, for example tighter control over application tolerances, process integration with electrochromic window fabrication, and the like.

Figure 8:
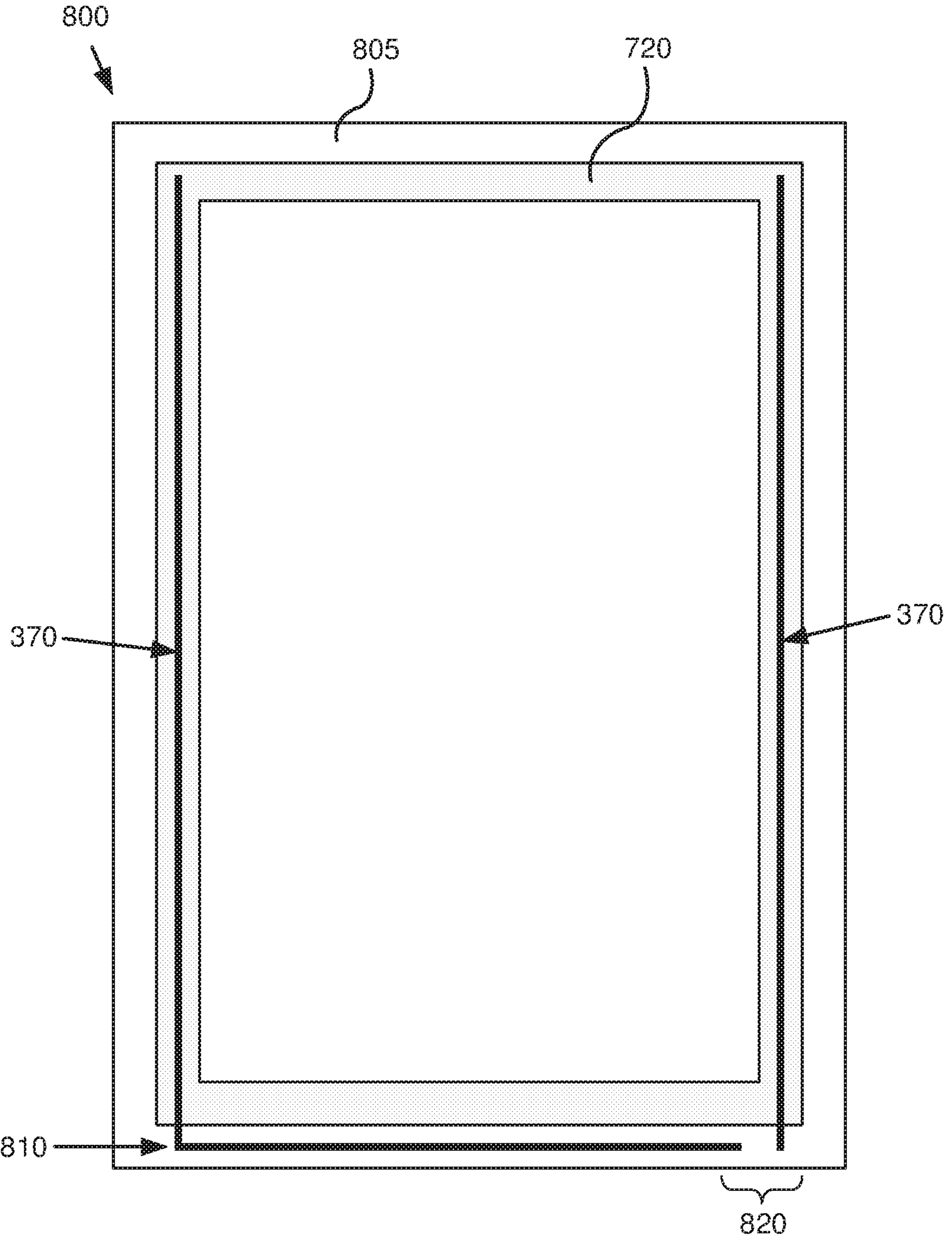
FIG. 8 depicts a plan view of an adhesive bus bar configuration.
Figure 9:
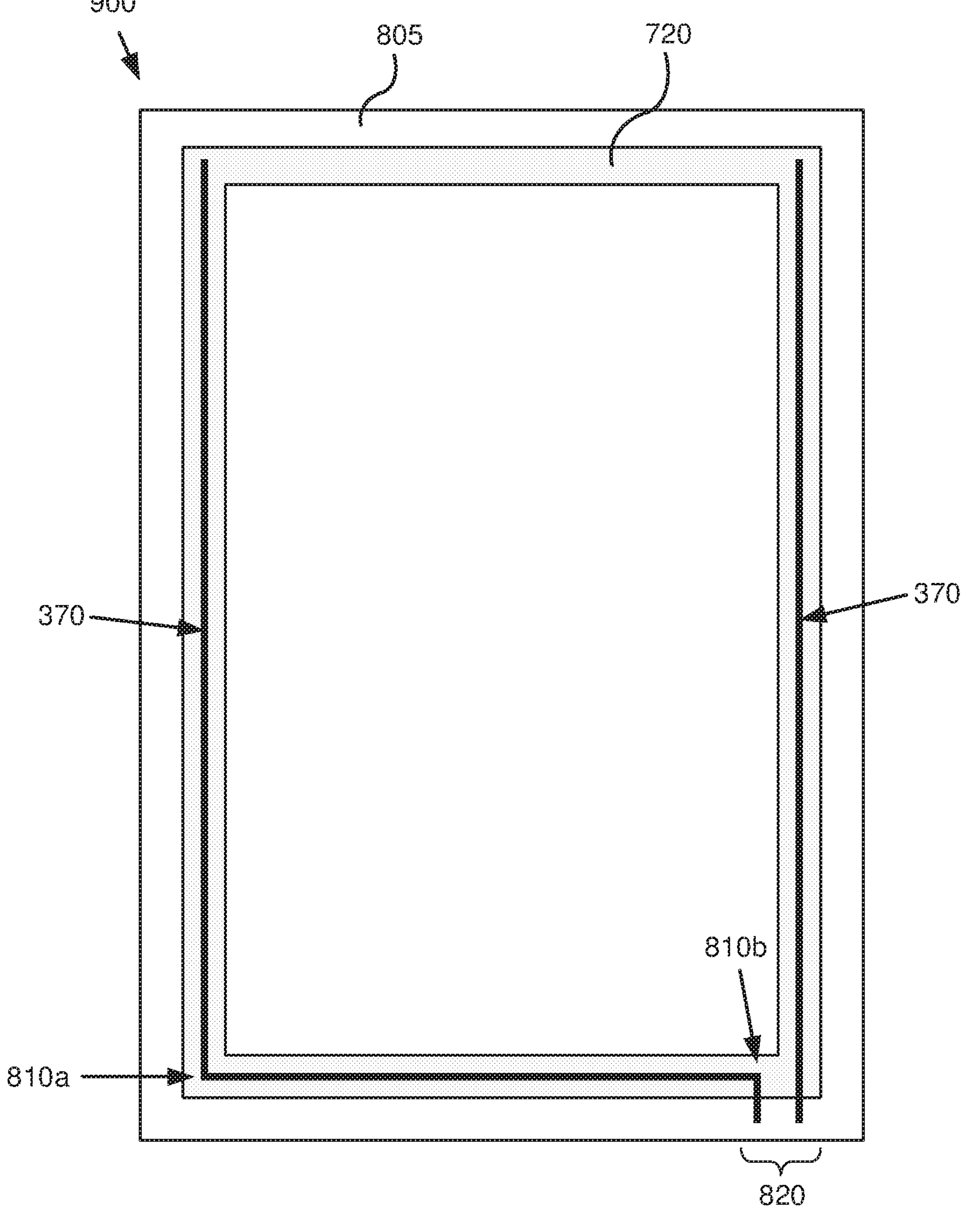
FIG. 9 depicts a plan view of an adhesive bus bar configuration.
Figure 10:
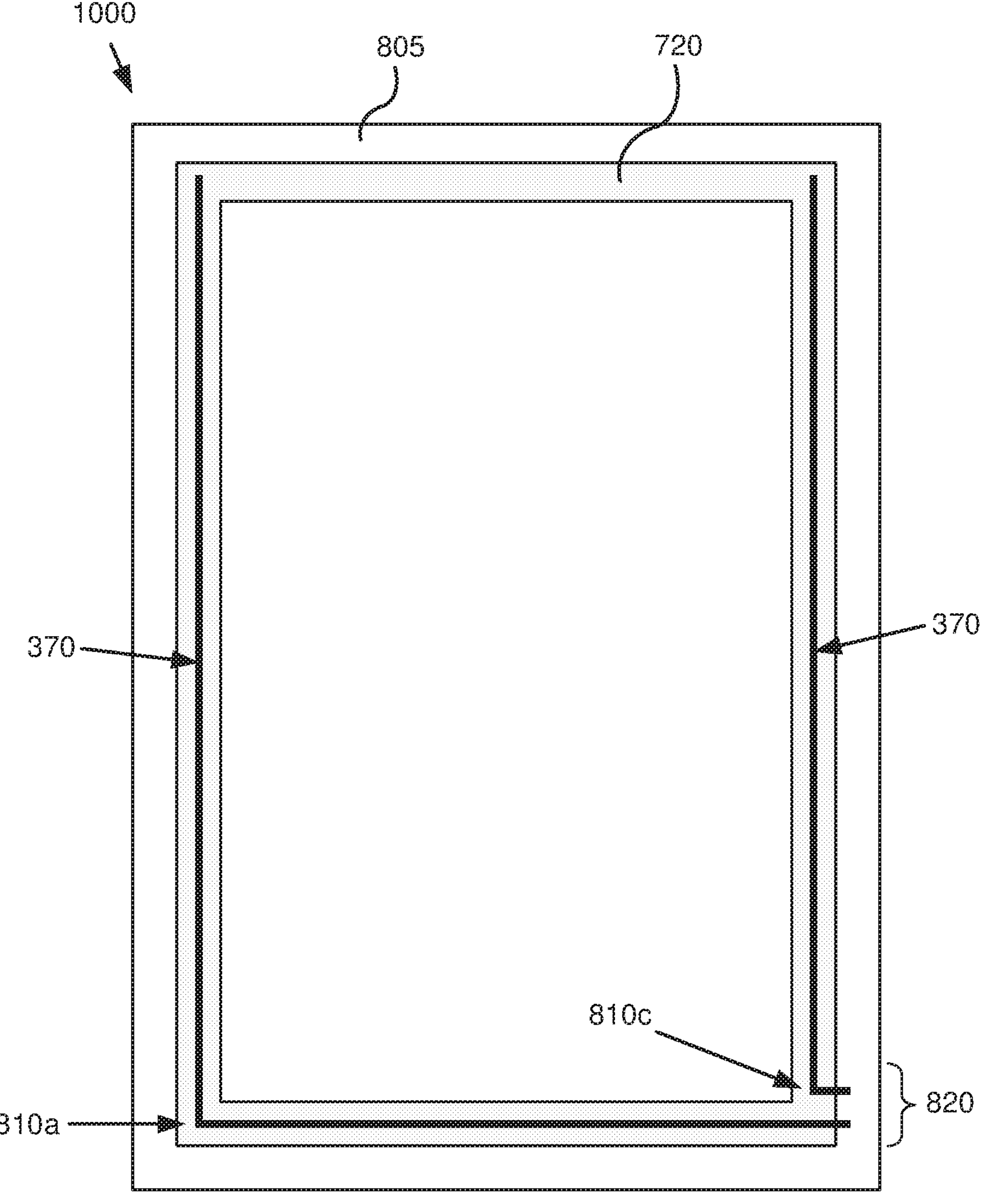
FIG. 10 depicts a plan view of an adhesive bus bar configuration.

Certain embodiments relate to how adhesive bus bars are configured relative to other components of electrochromic insulated glass units. FIG. 8 depicts an adhesive bus bar configuration, 800, for an electrochromic insulated glass unit. A transparent substrate, for example a glass substrate, 805, has a spacer, 720, and adhesive bus bars, 370. In this example, the spacer and substrate are rectangular. In FIGS. 8-10, the bus bars and spacer are depicted with contrast so as to distinguish the components for discussion purposes, though as described herein, one embodiment is to camouflage or otherwise color match the bus bar and spacer and/or primary seal adhesive. Adhesive bus bars 370 are along their length arranged under the spacer. In this example, the bus bar on the right follows the length of the spacer and is registered with the spacer. A small portion of the right bus bar emanates from the spacer to make electrical connection with a wire or other connection, for example a wire solder joint, a flexible circuit solder joint and the like, at an area 820. Area 820 is in the secondary sealing area of the insulated glass unit. In this description, an "area" may be a portion of the secondary sealing area, on one of two substrates of an insulated glass unit, where two adhesive bus bars end proximate each other, for lead attach. That is, when two bus bars are described as terminating at the same area, then it applies that the area is a common area where the ends of the respective bus bars are proximate each other (while in some embodiments "area" is used in the context of where a bus bar terminates in the secondary seal area, where each bus bar terminates in a separate area, thus not necessarily proximate each other, and in those embodiments each area is distinctly specified, for example, a first area, a second area, etc.). In one embodiment, where bus bars terminate proximate each other, the area is between about 1 square inch and about 10 square inches, in another embodiment between about 1 square inch and about 7 square inches, in another embodiment between about 2 square inches and about 5 square inches, in another embodiment between about 2 square inches and about 4 square inches, in another embodiment between about 2 square inches and about 3 square inches. The bus bar on the left side of the figure also emanates from under the spacer at the bottom of the figure, but does not end there. Rather, the bus bar makes a turn at a vertex or corner, 810, and traverses the width of the glass in the secondary seal area and ends proximate the other bus bar at area 820. This configuration has the advantage that minimal bus bar area is used to emanate from under the spacer, only at two places, one for each bus bar; and, the ends of the bus bars end at a common area, which makes attachment, for example soldering, of leads more facile.

Certain electrochromic insulated glass units or electrochromic IGUs include a transparent substrate with an electrochromic device coating thereon, a spacer sandwiched between the transparent substrate and another substrate, a first bus bar, and a second bus bar. The first bus bar includes a first leg and a second leg. The first leg includes a first portion between the transparent substrate and the spacer that spans along substantially the entire length of a first side of the spacer. The first leg also includes a second portion that emanates from between the transparent substrate and the spacer to extend to a vertex of the first bus bar that lies outside the spacer's outer perimeter at a second side of the spacer. The second leg extends from the vertex and ends at an area on and proximate a corner of the transparent substrate. The second bus bar includes a first portion that is between the transparent substrate and the spacer and that spans substantially the entire length of a third side. The third side is opposite the first side of the spacer. The second bus bar also includes a second portion that emanates from between the transparent substrate and the spacer and that terminates at the area on and proximate the corner of the transparent substrate. The transparent substrate and the spacer are rectangular. In one embodiment, the electrochromic device coating (e.g., an all solid state and inorganic electrochromic device coating) is a monolithic device whose perimeter edges lie between the spacer and the transparent substrate. In one embodiment, the area is between about 1 square inch and about 10 square inches, in another embodiment, the area is between about 2 square inches and about 5 square inches, and in another embodiment, the area is between about 2 square inches and about 3 square inches.

In some of these embodiments with electrochromic IGUs, the first and second bus bars are adhesive bus bars. In one embodiment, each adhesive bus bar includes an electrically conductive adhesive with a metal foil backing. In another embodiment, the vertex is fabricated by adhering two adhesive bus bar portion ends with or without pressure and/or heat. For example, the two adhesive bus bar portion ends may be soldered together, e.g., using laser, ultrasonic or conventional heating to make the joint. In one embodiment, the vertex is fabricated by at least one of bending, folding, soldering, welding and brazing.

Figure 20A:
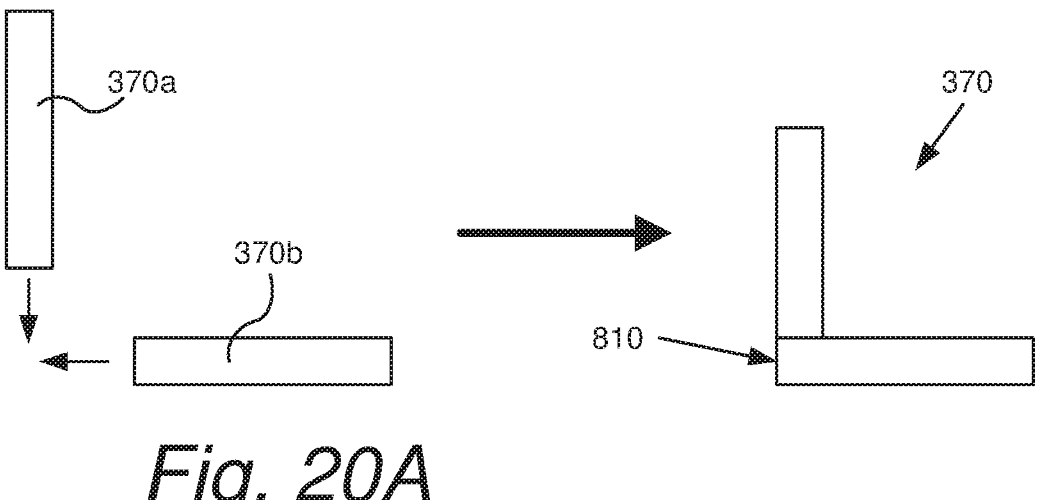
FIG. 20A depicts aspects of vertices of adhesive bus bars.
Figure 20B:
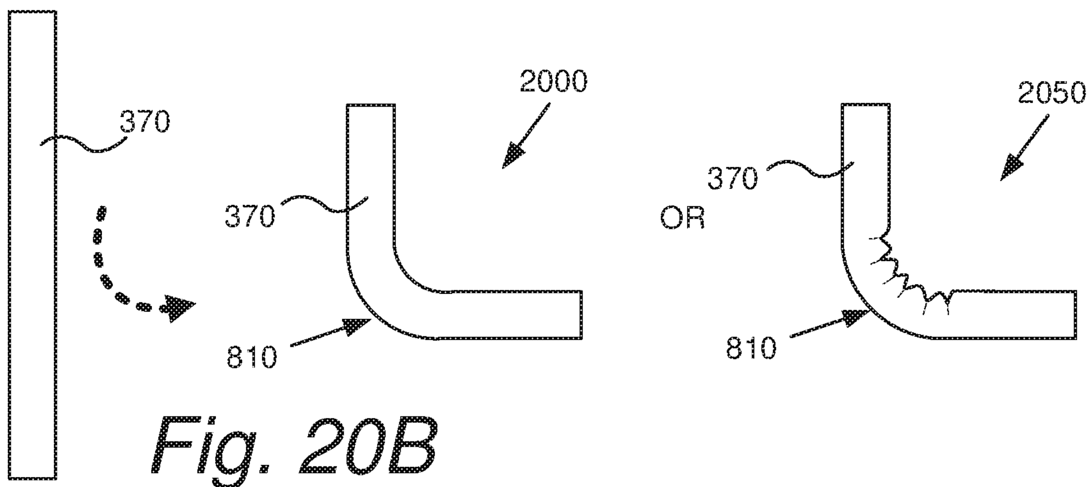
FIG. 20B depicts aspects of vertices of adhesive bus bars.
Figure 20C:
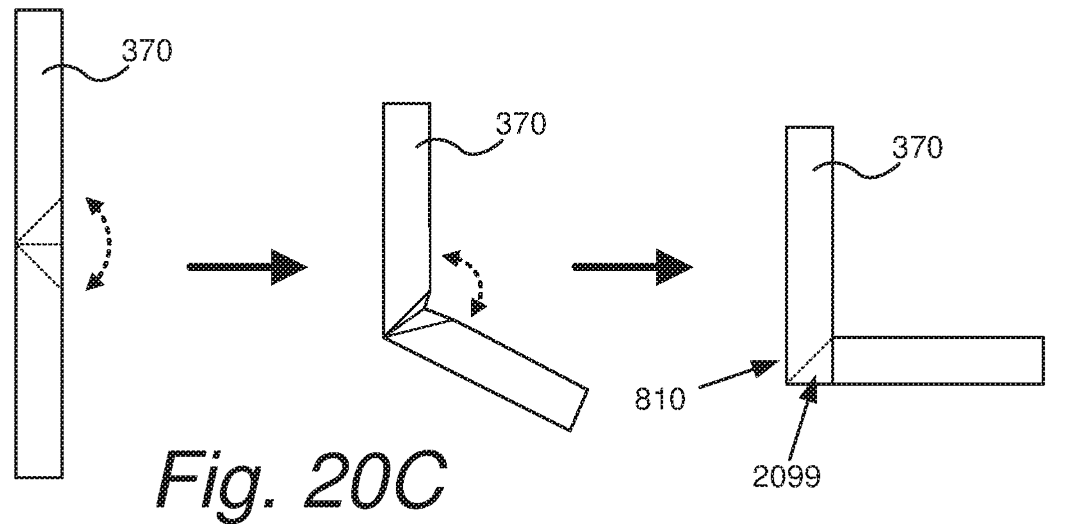
FIG. 20C depicts aspects of vertices of adhesive bus bars.

Referring to FIGS. 20A-C, a vertex or corner can be fabricated in a number of ways, illustrated by non-limiting examples here. It is noted that in this application, the terms "arm" and "leg" are used for portions of a bus bar that extend to or from a vertex. This is simply a convention, for example when describing a particular bus bar having a first leg and and second leg, etc.; where there is another bus bar in relation to the same electrochromic window, the second bus bar's analogous features may be called "arms" rather than legs simply to avoid confusion. Referring to FIG. 20A, an adhesive bus bar vertex, 810, is made by overlapping ends of two adhesive bus bar portions, 370*a* and 370*b,* to form adhesive bus bar 370. At the vertex 810, the ECA may be the only means of attachment force. Heat and/or pressure, as described herein, may be used to adhere the two adhesive bus bar portions at the vertex. In one embodiment, the vertex is soldered, for example using laser, ultrasonic or conventional heating to make the joint. In one embodiment, the adhesive bus bar portions are tin plated copper to facilitate the soldering bond. In another embodiment, the vertex is spot welded or braised.

In other embodiments, an adhesive bus bar vertex is fabricated using a single adhesive bus bar, rather than two portions. Non-limiting examples of these embodiments are described in FIGS. 20B and 20C. Referring to FIG. 20B, a linear strip of adhesive bus bar, 370, is made by bending the adhesive bus bar along an axis perpendicular to the face of the bus bar (for example, parallel with the glass upon which and while it is being adhered), as indicated by the curved dotted arrow, to form vertex 810 as indicated by reference number 2000. In such a fabrication method, the adhesive backing is stretched on the outer radius of the vertex and compressed on the inner radius of the vertex. In another embodiment, referring to 2050, a linear strip of adhesive bus bar, 370, is made by bending the adhesive bus bar along an axis perpendicular to the face of the bus bar (for example, parallel with the glass upon which and while it is being adhered), as indicated by the curved dotted arrow, along with forming the inner radius (making folds) to facilitate forming vertex 810. In another embodiment, not depicted, rather than forming, notches are cut along one side of the strip to facilitate bending to form the vertex.

Referring to FIG. 20C, a linear strip of adhesive bus bar, 370, is made by folding the adhesive bus bar in order to form the vertex. For example, as indicated by the three dotted fold lines, the linear strip is folded out of the plane of the backing on one side along the middle of the three dotted lines, as indicated by the dotted double headed arrow. In this example, the vertex is a 90 degree angle, so the flap formed by the folding is flatted to form vertex 810 as indicated by reference number 2099. The flap may be held down to the backing by an ECA, with or without pressure and/or heat, or soldering, or welding as described herein. The vertices as described in FIGS. 20B-C have the advantage of using a continuous strip of adhesive bus bar and thus ensure good electrical connection.

In one embodiment, vertex 810 is made by bending the adhesive bus bar along an axis perpendicular to the face of the bus bar parallel with the glass. In other words, at the end of a first leg (or arm) of the bus bar, the bus bar is curved or folded to make a turn, for example a 90 degree turn, in order to extend further in a direction orthogonal to the first leg of the bar, the extension being a second leg of the bus bar. Thus a vertex can be a sharp well-defined angle, a curve or the like. Generally speaking, a vertex is a point or portion of a bus bar where the bus bar changes direction along a surface upon which it is mounted. In another embodiment, vertex 810 is made by soldering two sections of adhesive bus bar at the vertex. As described, adhesive bus bars may be tin plated to aid in soldering, as well as making them corrosion resistant. In one embodiment, at least that portion of an adhesive bus bar that is outside the primary seal is tin plated. In this example, one bus bar has one vertex and the other bus bar has none. In another embodiment, vertex 810 is made by overlapping portions of adhesive bus bars, as the ECA provides sufficient electrical connectivity and adhesion between overlapping bus bar portions. Pressure and/or heat may be applied to vertex 810 as described herein. Different adhesive bus bar compositions can be used for the portions, for example the portion along the width in the secondary seal may be tin plated copper, while the portions substantially under the spacer may be copper.

In embodiments described herein, any portion, leg, arm, vertex of an adhesive bus bar that is between the spacer and the glass can be used to power an electrochromic device.

That is, embodiments include configurations where the electrochromic device's entire perimeter edge is between the spacer and the transparent substrate. Depending on how the electrochromic device is patterned and fabricated, only one leg of an adhesive bus bar can reside on a transparent conductive layer of the electrochromic device, or for example two legs, including the vertex between them, can also reside on the transparent conductive layer and power the electrochromic device; or for example, all three legs (and two vertices) can be configured, at least in part, on the transparent conductor layer, and power the electrochromic device. For example, in the embodiment illustrated in FIG. 8, those portions of the adhesive bus bars between the spacer and the substrate are used to power an electrochromic device where the entire perimeter edge of the device is also between the spacer and the substrate.

FIG. 9 depicts an adhesive bus bar configuration, 900, for an electrochromic insulated glass unit. A glass substrate, 805, has a spacer, 720, and adhesive bus bars, 370. Adhesive bus bars 370 are along their length arranged under the spacer. In this example, one bus bar has two vertices, and the other has none. In this example, the bus bar on the right follows the length of the spacer and is registered with the spacer. A small portion of the right bus bar emanates from the spacer at area 820. The bus bar on the left side of the figure also emanates from under the space, but first makes a turn at 810*a* at the bottom of the figure, still under the spacer, and then makes a second turn at a vertex or corner, 810*b*, then emanates from under the spacer, proximate the other bus bar at area 820. This configuration has the advantage that minimal bus bar area is used to emanate from under the spacer, only at two places, one for each bus bar; and, the ends of the bus bars end at a common area, which makes attachment, for example soldering, of leads more facile. It also has the advantage that the portion of the bus bar on the left that runs along the width of the spacer, unlike in FIG. 8 running along the secondary seal area, continues to run under the spacer. This leaves less bus bar exposed to the secondary seal area. The vertices 810*a* and 801*b* are made the same way as described above; although, in one embodiment different vertices, for example along a single bus bar and/or under the spacer vs in the secondary seal area, may be made using different methods, for example one is soldered the other is overlapping adhesive bus bar portions. In this example, the longest portions of the bus bars are used to power an electrochromic device where the entire perimeter edge of the electrochromic device is also between the spacer and the substrate. Optionally, the second leg of the first bus bar (on the left) is also used to power the electrochromic device.

Of note are configurations where two bus bars are in close proximity and each powering the electrochromic device. Care must be taken to avoid hot spots forming during powering of the device. Avoidance of hot spots is described in U.S. patent application Ser. No. 13/452,032 (now U.S. Pat. No. 10,429,712), filed on Apr. 20, 2010 and titled "ANGLED BUS BAR," which is hereby incorporated by reference in its entirety. For example, area 820 shows the ends of the first and second bus bars in relatively close proximity; this is only for illustration purposes. If for example both the first and second leg of the bus bar in FIG. 9 are used to power the device, that is, they are both on the transparent conductive layer of the device, it can be the case that area 820 is larger, that is, the ends for lead attach are further from each other than implied by the figure. Thus embodiments where two bus bar ends terminate in "an area" using the metrics described herein, for example, where the area is between about 1 square inches and about 10 square inches; the distance between the leads ends will vary, but in such embodiments will fall within the described area. For example, the area of 10 square inches may be ½ inch wide and 20 inches long, and the lead ends on opposite ends of the area. In other embodiments, the lead ends are relatively close, for example where the area is 1 square inch having dimensions ½ inch wide and 2 inches long, or in another example where the area is 1 square inch having dimensions ¾ inch wide and 1⅓ inches long.

Certain electrochromic insulated glass units or electrochromic IGUs include a transparent substrate with an electrochromic device coating thereon, a spacer sandwiched between the transparent substrate and another substrate, a first bus bar, and a second bus bar. The first bus bar includes a first leg, a second leg, and a third leg. The first leg is between the transparent substrate and the spacer. The first leg spans along substantially the entire length of a first side of the spacer and extends to a first vertex between the transparent substrate and the spacer. The second leg extends from the first vertex between the transparent substrate and the spacer and extends along a second side of the spacer and to a second vertex between the transparent substrate and the spacer. The third leg of the first bus bar extends from the second vertex. This third leg includes a first portion emanating from between the transparent substrate and the spacer on the second side and outside of the spacer's outer perimeter and extends to an area proximate a corner of the transparent substrate. The second bus bar includes a first portion that is between the transparent substrate and the spacer and spans along substantially the entire length of a third side of the spacer, opposite the first side. The second bus bar also includes a second portion that emanates from between the transparent substrate and the spacer and terminates at the area proximate the corner of the transparent substrate. The transparent substrate and the spacer are rectangular. In one embodiment, the electrochromic device coating (e.g., an all solid state and inorganic electrochromic device coating) is a monolithic device whose perimeter edges lie between the spacer and the transparent substrate. In one embodiment, the area is between about 1 square inch and about 10 square inches, in another embodiment, the area is between about 2 square inches and about 5 square inches, and in another embodiment, the area is between about 2 square inches and about 3 square inches. In some of these embodiments with electrochromic IGUs, the first and second bus bars are adhesive bus bars. In one embodiment, each adhesive bus bar includes an electrically conductive adhesive with a metal foil backing. In another embodiment, at least one of the first and second vertexes are fabricated by adhering two adhesive bus bar portion ends with or without pressure and/or heat. For example, the two adhesive bus bar portion ends may be soldered together. In one embodiment, at least one of the first and second vertexes are fabricated by at least one bending, folding, soldering, welding and brazing.

FIG. 10 depicts an adhesive bus bar configuration, 1000, for an electrochromic insulated glass unit. A glass substrate, 805, has a spacer, 720, and adhesive bus bars, 370. Adhesive bus bars 370 are along their length arranged under the spacer. In this example, each of two bus bars has a single vertex. In this example, the bus bar on the right follows the length of the spacer and is registered with the spacer, but includes a vertex, 810*c*. A small portion of the right bus bar emanates from the spacer at area 820. The bus bar on the left side of the figure also emanates from under the space, but first makes a turn at 810*a* at the bottom of the figure, still under the spacer, traverses along the width of the spacer then emanates from under the spacer, proximate the other bus bar at area 820. This configuration has the advantage that minimal bus bar area is used to emanate from under the spacer, only at two places, one for each bus bar; and, the ends of the bus bars end at a common area, which makes attachment, for example soldering, of leads more facile. It also has the advantage that the portion of the bus bar on the left that runs along the width of the spacer, continues to run under the spacer. The vertices 810*a* and 801*c* are made the same way as described above, including differing methods of making vertices in a single insulated glass unit. In this example, the longest portions of the bus bars are used to power an electrochromic device where the entire perimeter edge of the electrochromic device is also between the spacer and the substrate. Optionally, the second leg of the first bus bar (on the left) is also used to power the electrochromic device.

Certain electrochromic insulated glass units or electrochromic IGUs include a transparent substrate with an electrochromic device coating thereon, a spacer sandwiched between the transparent substrate and another substrate, a first bus bar, and a second bus bar. The first bus bar includes a first leg and a second leg. The first leg of the first bus bar is between the transparent substrate and the spacer. This first leg spans along substantially the entire length of a first side of the spacer and extends to a first vertex between the transparent substrate and the spacer. The second leg extends from the first vertex that is between the transparent substrate and the spacer. The second leg extends along a second side of the spacer. The second leg has a portion that emanates from between the transparent substrate and the spacer on a third side of the spacer opposite the first side. This portion of the second leg extends to an area on and proximate a corner of the transparent substrate outside the spacer's outer perimeter. The second bus bar includes a first arm and a second arm. The first arm is between the transparent substrate and the spacer. The first arm spans along substantially the entire length of the third side of the spacer and extends to a first corner between the transparent substrate and the spacer. The second arm extends from the first corner and includes a portion that emanates from between the transparent substrate and the spacer on the third side of the spacer and terminates at the area of the transparent substrate. The transparent substrate and the spacer are rectangular. In one embodiment, the electrochromic device coating (e.g., an all solid state and inorganic electrochromic device coating) is a monolithic device whose perimeter edges lie between the spacer and the transparent substrate. In one embodiment, the area is between about 1 square inch and about 10 square inches, in another embodiment, the area is between about 2 square inches and about 5 square inches, and in another embodiment, the area is between about 2 square inches and about 3 square inches.

In some of these embodiments with electrochromic IGUs, the first and second bus bars are adhesive bus bars. In one embodiment, each adhesive bus bar includes an electrically conductive adhesive with a metal foil backing. In another embodiment, each of the first vertex and the first corner are fabricated by adhering two adhesive bus bar portion ends with or without pressure and/or heat. For example, the first vertex and the first corner can be fabricated by overlapping ends of two adhesive bus bar portions. Heat and/or pressure, as described herein, may be used to adhere the two adhesive bus bar portions. In one embodiment, the two adhesive bus bar portion ends are soldered together, e.g., using laser, ultrasonic or conventional heating to make the joint. In some embodiments, the first vertex and the first corner are fabricated by at least one of bending, folding, soldering, welding and brazing.

Figure 11:
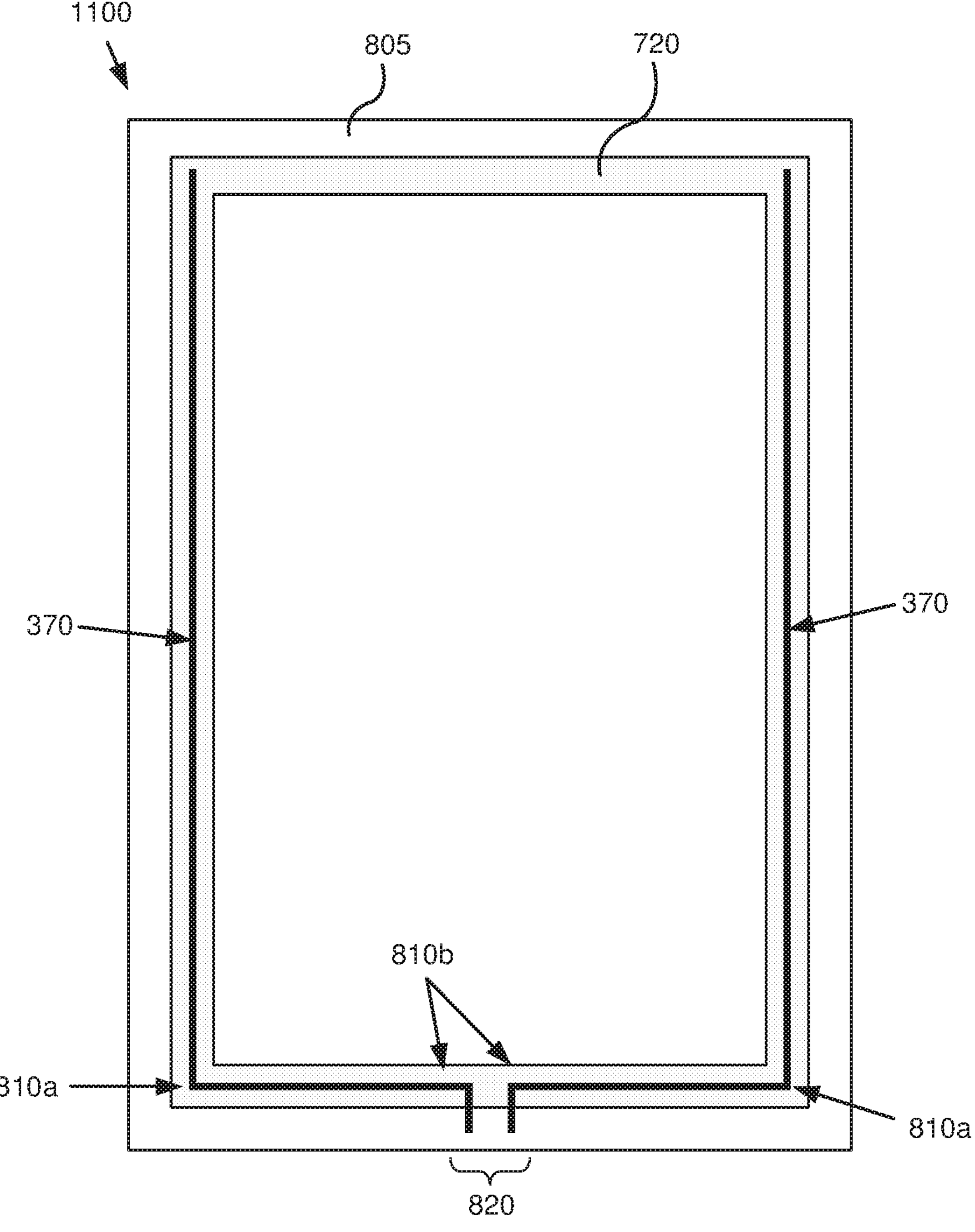
FIG. 11 depicts a plan view of an adhesive bus bar configuration.

FIG. 11 depicts an adhesive bus bar configuration, 1100, for an electrochromic insulated glass unit. A glass substrate, 805, has a spacer, 720, and adhesive bus bars, 370. Adhesive bus bars 370 are along their length arranged under the spacer. In this example, each of two bus bars has two vertices and are symmetrical, in this example mirror images of each other. In this example, each bus bar has a first leg that follows the length of the spacer and is registered with the spacer, but on opposing sides of the spacer. The first leg spans to a first vertex, 810*a*. A second leg spans from the vertex to second vertex, 810*b*. A small portion of each bus bar emanates from the spacer at area 820. This configuration has the advantage that minimal bus bar area is used to emanate from under the spacer, only at two places, one for each bus bar; and, the ends of the bus bars end at a common area, which makes attachment, for example soldering, of leads more facile. In this example, the longest portions of the bus bars are used to power an electrochromic device where the entire perimeter edge of the electrochromic device is also between the spacer and the substrate. Optionally, the second leg of each bus bar is also used to power the electrochromic device.

Certain electrochromic insulated glass units or electrochromic IGUs include a transparent substrate with an electrochromic device coating thereon, a spacer sandwiched between the transparent substrate and another substrate, and a first bus bar and a second bus bar. Each of the bus bars includes a first leg, a second leg, and a third leg. The first leg is between the transparent substrate and the spacer. The first leg of each of the first and second bus bars spans along substantially the entire length of a first side and a second side of the spacer, respectively. The first and second sides of the spacer are opposite and parallel to each other. The first leg extends to a first vertex of the respective bus bar. The first vertex is between the transparent substrate and the spacer. The second leg of each bus bar is between the transparent substrate and the spacer and extends from the first vertex along a third side of the spacer, between the first and second sides, and extends to a second vertex of the respective bus bar. The second vertex is between the transparent substrate and the spacer and also along the third side of the spacer. The third leg of each bus bar extends from the second vertex of the respective bus bar. This third leg has a portion that emanates from between the transparent substrate and the spacer and that extends to an area on the transparent substrate outside the spacer's outer perimeter on the third side of the spacer. The transparent substrate and the spacer are rectangular. In one embodiment, the electrochromic device coating (e.g., an all solid state and inorganic electrochromic device coating) is a monolithic device whose perimeter edges lie between the spacer and the transparent substrate. In one embodiment, the area is between about 1 square inch and about 10 square inches, in another embodiment, the area is between about 2 square inches and about 5 square inches, and in another embodiment, the area is between about 2 square inches and about 3 square inches. In some of these embodiments with electrochromic IGUs, the first and second bus bars are adhesive bus bars. In one embodiment, each adhesive bus bar includes an electrically conductive adhesive with a metal foil backing. In another embodiment, at least one of the first and second vertexes is fabricated by adhering two adhesive bus bar portion ends with or without pressure and/or heat. In another embodiment, at least one of the first and second vertexes is fabricated by at least one bending, folding, soldering, welding and brazing.

Figure 12:
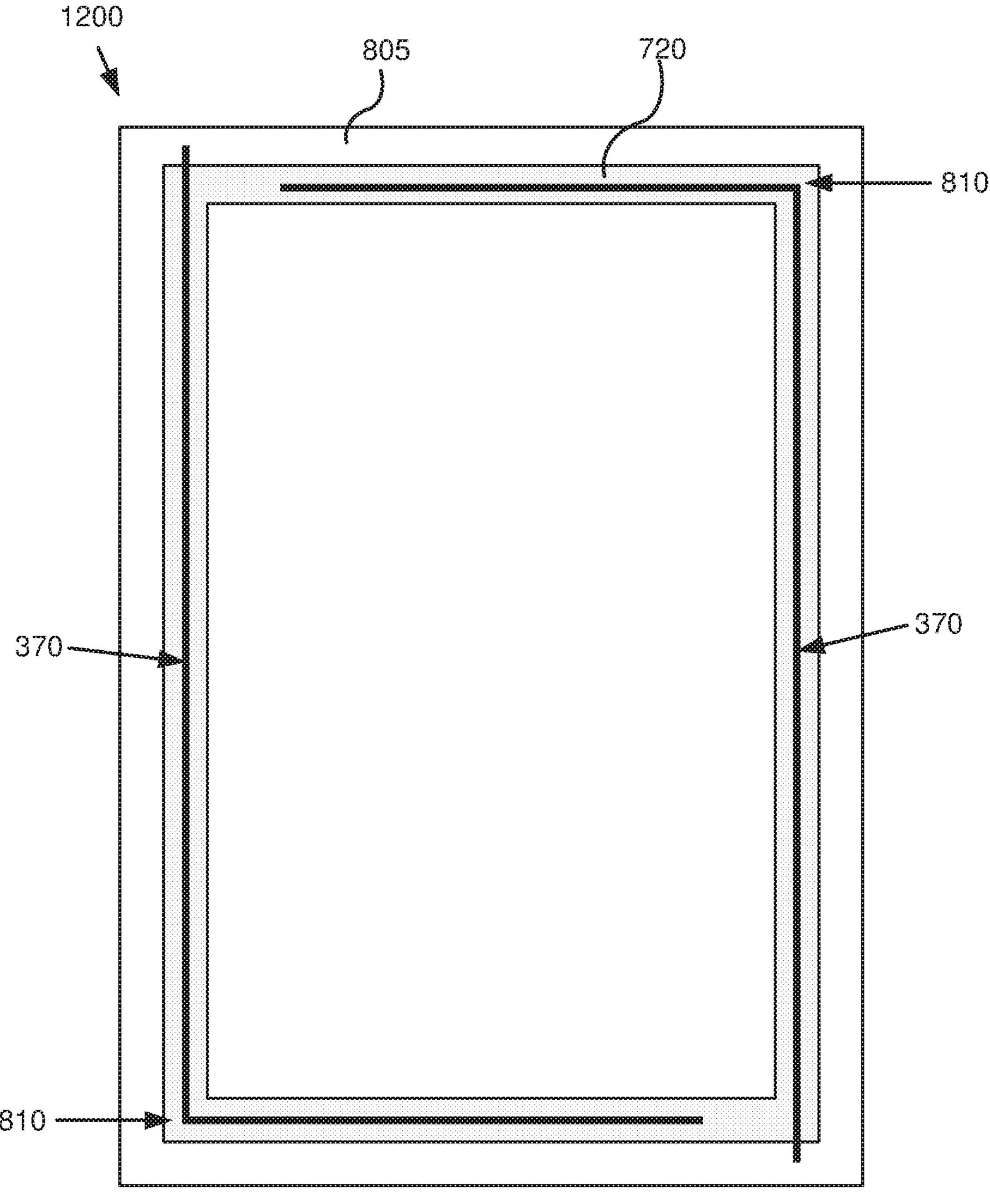
FIG. 12 depicts a plan view of an adhesive bus bar configuration.

FIG. 12 depicts an adhesive bus bar configuration, 1200, for an electrochromic insulated glass unit. A glass substrate, 805, has a spacer, 720, and adhesive bus bars, 370. Adhesive bus bars 370 are along their length arranged under the spacer. In this example, each of two bus bars has only one vertex and are symmetrical. In this example, each bus bar has a first leg that follows the length of the spacer and is registered with the spacer, but on opposing sides of the spacer. The first leg spans to a first vertex, 810. A second leg spans from the vertex to emanate from under the spacer, each at a first and second area, respectively, in the secondary seal area on the transparent substrate (for wire lead attach, for example, by soldering). The first and second areas are diagonally opposed, proximate distinct corners of the transparent substrate. This configuration has the advantage that minimal bus bar area is used to emanate from under the spacer, only at two places, to make electrical connections, for example wire attachment, for example soldering of leads. In this example, the first leg and second legs of the bus bar are used to power an electrochromic device where the entire perimeter edge of the electrochromic device is also between the spacer and the substrate.

Certain electrochromic insulated glass units or electrochromic IGUs include a transparent substrate with an electrochromic device coating thereon, a spacer sandwiched between the transparent substrate and another substrate, and a first bus bar and a second bus bar. Each of the bus bars includes a first leg and a second leg. The first leg is between the transparent substrate and the spacer. The first leg of each of the first and second bus bars spans along substantially the entire length of a first side and a second side of the spacer, respectively. The first and second sides of the spacer are opposite and parallel to each other. The first leg extends to a vertex of the respective bus bar. The vertex is between the transparent substrate and the spacer. The second leg of each bus bar extends from the vertex between the transparent substrate and the spacer and along a third side and a fourth side of the spacer, respectively. The third and fourth sides of the spacer are between the first and second sides of the spacer and opposite and parallel to each other. The second leg of each bus bar includes a portion that emanates from between the transparent substrate and the spacer to outside the spacer's outer perimeter on the third and fourth sides of the spacer, respectively. This portion extends to a first area and a second area of the transparent substrate, respectively, on and proximate a first corner and a second corner of the transparent substrate. The first and second corners are diagonally opposed to each other. The transparent substrate and the spacer are rectangular. In one embodiment, the electrochromic device coating (e.g., an all solid state and inorganic electrochromic device coating) is a monolithic device whose perimeter edges lie between the spacer and the transparent substrate. In one embodiment, at least one of the first and second areas is between about 1 square inch and about 10 square inches, in another embodiment, at least one of the first and second areas is between about 2 square inches and about 5 square inches, and in another embodiment, at least one of the first and second areas is between about 2 square inches and about 3 square inches.

In some of these embodiments with electrochromic IGUs, the first and second bus bars are adhesive bus bars. In one embodiment, each adhesive bus bar includes an electrically conductive adhesive with a metal foil backing. In another embodiment, the vertex is fabricated by adhering two adhesive bus bar portion ends with or without pressure and/or heat. In one embodiment, the vertex is fabricated by at least one of bending, folding, soldering, welding and brazing. For example, the two adhesive bus bar portion ends may be soldered together.

Figure 13:
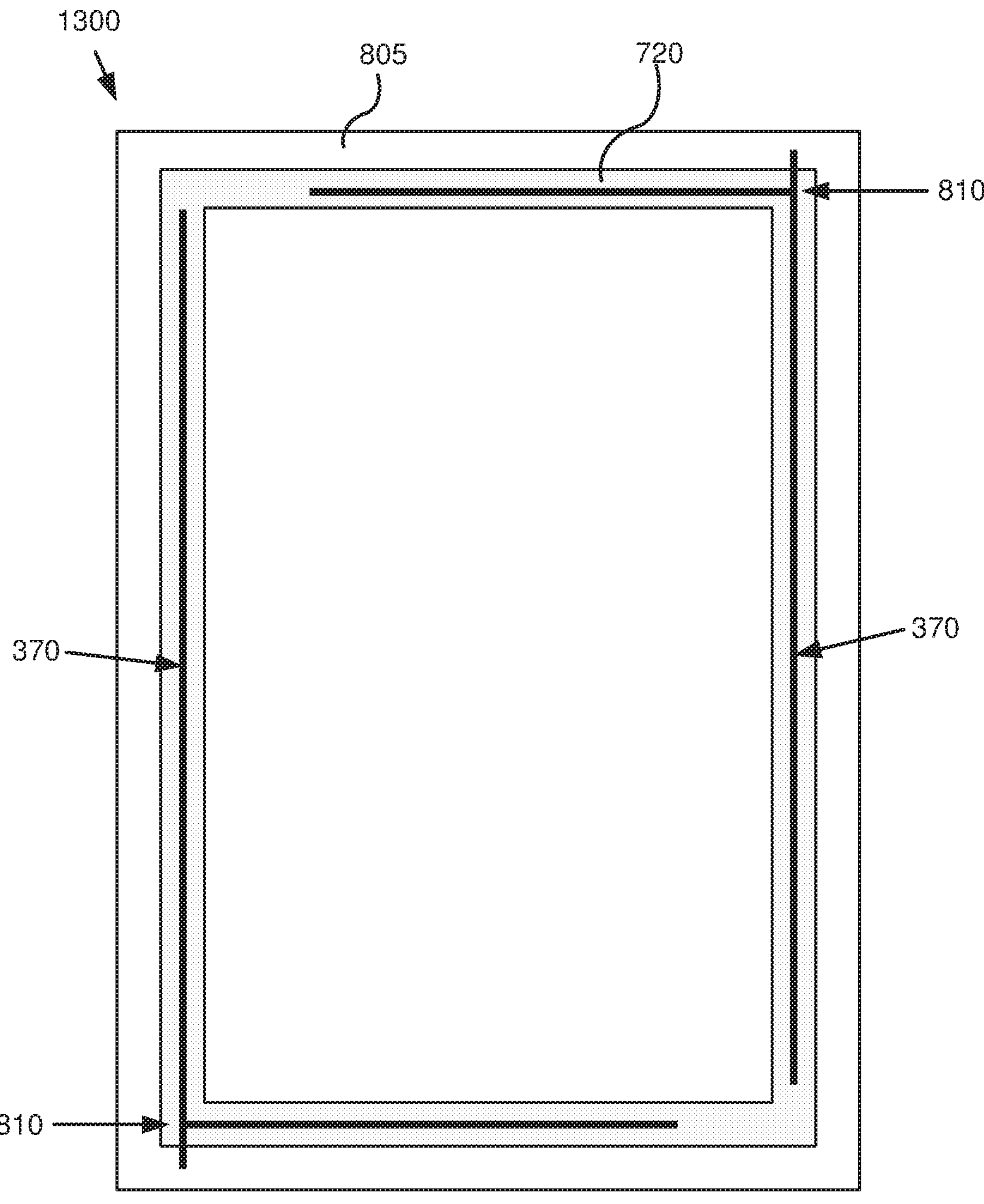
FIG. 13 depicts a plan view of an adhesive bus bar configuration.

FIG. 13 depicts an adhesive bus bar configuration, 1300, for an electrochromic insulated glass unit. A glass substrate, 805, has a spacer, 720, and adhesive bus bars, 370. Adhesive bus bars 370 are along their length arranged under the spacer. In this example, each of two bus bars has only one vertex and are symmetrical. In this example, each bus bar has a first leg that follows the length of the spacer and is registered with the spacer, but on opposing sides of the spacer. The first leg spans to a first vertex, 810, and continues on to emanate from between the spacer and the glass substrate to provide a tab for making an electrical connection such as soldering a wire. A second leg spans from the vertex to along an orthogonal side and does not emanate from under the spacer. Each of the first and second bus bars emanate to a first and a second area, respectively, to make electrical connections. The first and second areas are diagonally opposed, proximate distinct corners of the transparent substrate. This configuration has the advantage that minimal bus bar area is used to emanate from under the spacer, only at two places, to make electrical connections, for example wire attachment, for example soldering of leads. In this example, the first leg and second legs of the bus bar are used to power an electrochromic device where the entire perimeter edge of the electrochromic device is also between the spacer and the substrate.

Certain electrochromic insulated glass units or electrochromic IGUs include a transparent substrate with an electrochromic device coating thereon, a spacer sandwiched between the transparent substrate and another substrate, and a first bus bar, and a second bus bar. Each of the bus bars includes a first leg, a second leg, and a vertex. The first leg spans along substantially the entire length of a first side and a second side of the spacer, respectively. The first and second sides of the spacer are opposite and parallel to each other. The first leg includes a portion emanating from between the transparent substrate and the spacer to outside the spacer's outer perimeter on a third and fourth side of the spacer, respectively. The third and fourth sides are between the first and second sides of the spacer and opposite and parallel to each other. This portion of the first leg extends to a first area and a second area of the transparent substrate, respectively. The first area is proximate a first corner and the second area is proximate a second corner diagonally opposed to the first corner. The second leg of each of the bus bars is between the transparent substrate and the spacer and along the third and fourth sides of the spacer, respectively. The vertex is between the transparent substrate and the spacer. The vertex is formed by an intersection of the first leg and the second leg. The transparent substrate and the spacer are rectangular. In one embodiment, the electrochromic device coating (e.g., an all solid state and inorganic electrochromic device coating) is a monolithic device whose perimeter edges lie between the spacer and the transparent substrate. In some of these embodiments with electrochromic IGUs, the first and second bus bars are adhesive bus bars. In one embodiment, each adhesive bus bar includes an electrically conductive adhesive with a metal foil backing. In another embodiment, the vertex is fabricated by adhering two adhesive bus bar portion ends with or without pressure and/or heat. In one embodiment, the two adhesive bus bar portion ends are fabricated by at least one of soldering, welding and brazing. For example, the vertex may be fabricated by soldering.

Figure 14:
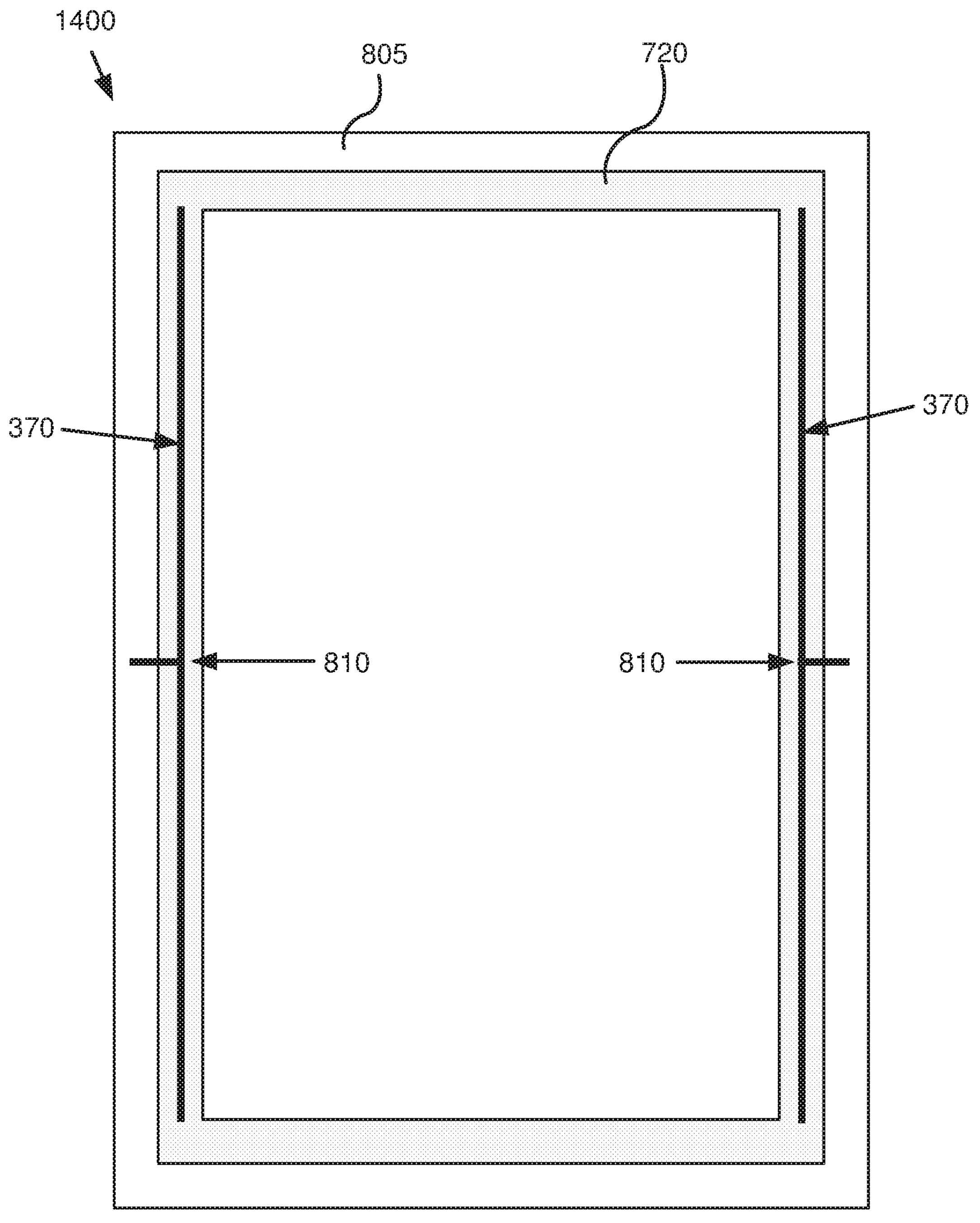
FIG. 14 depicts a plan view of an adhesive bus bar configuration.
Figure 15:
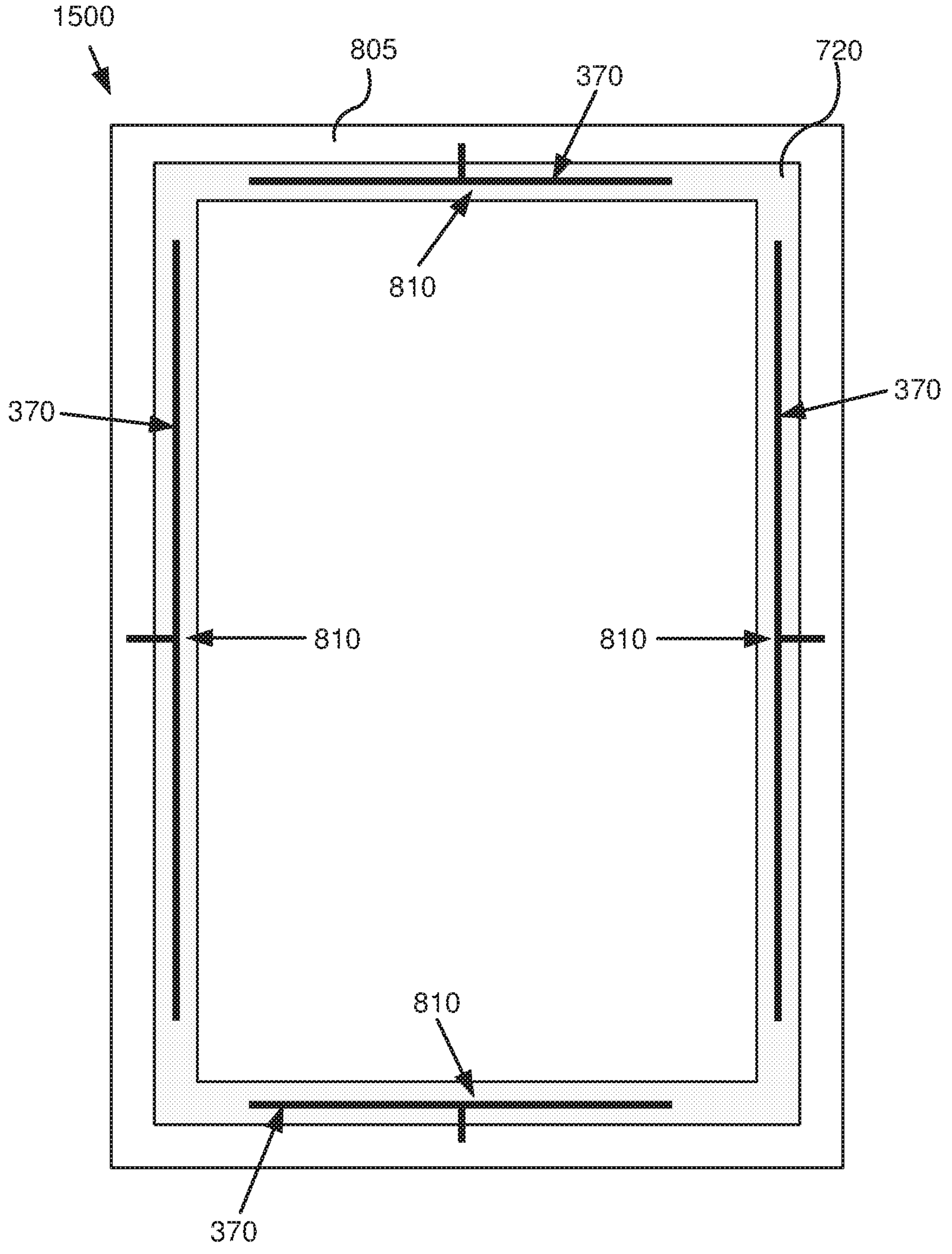
FIG. 15 depicts a plan view of an adhesive bus bar configuration.

FIG. 14 depicts an adhesive bus bar configuration, 1400, for an electrochromic insulated glass unit. A glass substrate, 805, has a spacer, 720, and adhesive bus bars, 370. Adhesive bus bars 370 are along their length arranged under the spacer. In this example, each of two bus bars has only one vertex and are symmetrical. In this example, each bus bar has a first leg that follows the length of the spacer and is registered with the spacer, but on opposing sides of the spacer. The first leg spans to a first vertex, 810, and continues on but does not emanate from under the spacer. Each of the first and second bus bars emanate to a first and a second area, respectively, to make electrical connections. Vertex 810 is formed from the intersection of the first leg with a second leg, which does emanate from between the spacer and the transparent substrate. Each of the second legs ends at a first and a second area. The first and second areas are on opposite sides of and outside the outer perimeter of the spacer. In this example, they are proximate the center of the first leg, but could be anywhere along the first leg, independent of each other (i.e. the two bus bars are not symmetrical). When the vertex is approximately at the center, current distribution is more even. This configuration has the advantage that minimal bus bar area is used to emanate from under the spacer, only at two places, to make electrical connections, for example wire attachment, for example soldering of leads. In this example, the first leg of the bus bars is used to power an electrochromic device where the entire perimeter edge of the electrochromic device is also between the spacer and the substrate. FIG. 15 shows that similar configurations are envisioned, where each of the four sides has such a bus bar. In this example, all four of the bus bars are used to power the electrochromic device. In one embodiment, both of the opposing bus bar pairs are configured on opposing transparent conductive layers of an electrochromic device. In one embodiment, one of the opposing bus bar pairs is configured on one transparent conductive layer of an electrochromic device, and the other of the opposing bus bar pairs is configured on the other transparent conductive layer of the electrochromic device.

Certain electrochromic insulated glass units or electrochromic IGUs include a transparent substrate with an electrochromic device coating thereon, a spacer sandwiched between the transparent substrate and another substrate, a first bus bar, and a second bus bar. Each of the bus bars includes a first leg, a second leg, and a vertex. The first leg is between the transparent substrate and the spacer. The first leg spans along substantially the entire length of a first side and a second side of the spacer, respectively. The first and second sides of the spacer are opposite and parallel to each other. The second leg includes a portion that emanates from between the transparent substrate and the spacer on the first and second sides of the spacer, respectively. The portion extends to a first area and a second area, respectively, of the transparent substrate outside the spacer's outer perimeter. The vertex is between the transparent substrate and the spacer. The vertex is formed by intersection of the first leg and the second leg. The transparent substrate and the spacer are rectangular. In one embodiment, the electrochromic device coating (e.g., an all solid state and inorganic electrochromic device coating) is a monolithic device whose perimeter edges lie between the spacer and the transparent substrate. In some of these embodiments with electrochromic IGUs, the first and second bus bars are adhesive bus bars. In one embodiment, each adhesive bus bar includes an electrically conductive adhesive with a metal foil backing. In another embodiment, the vertex is fabricated by adhering two adhesive bus bar portion ends with or without pressure and/or heat. In one embodiment, the vertex is fabricated by at least one of soldering, welding and brazing. For example, the vertex may be fabricated by soldering. In one embodiment, the vertex is proximate the middle of the first leg.

In one embodiment of the electrochromic IGU, the electrochromic IGU further includes a third and a fourth bus bar, having the same configuration as the first and second bus bars. The first leg of each of the third and fourth bus bars is between the spacer and the transparent substrate on a third side and a fourth side of the spacer, respectively. The third and fourth sides of the spacer are between the first and second sides of the spacer and on opposing sides of the spacer.

Figure 16:
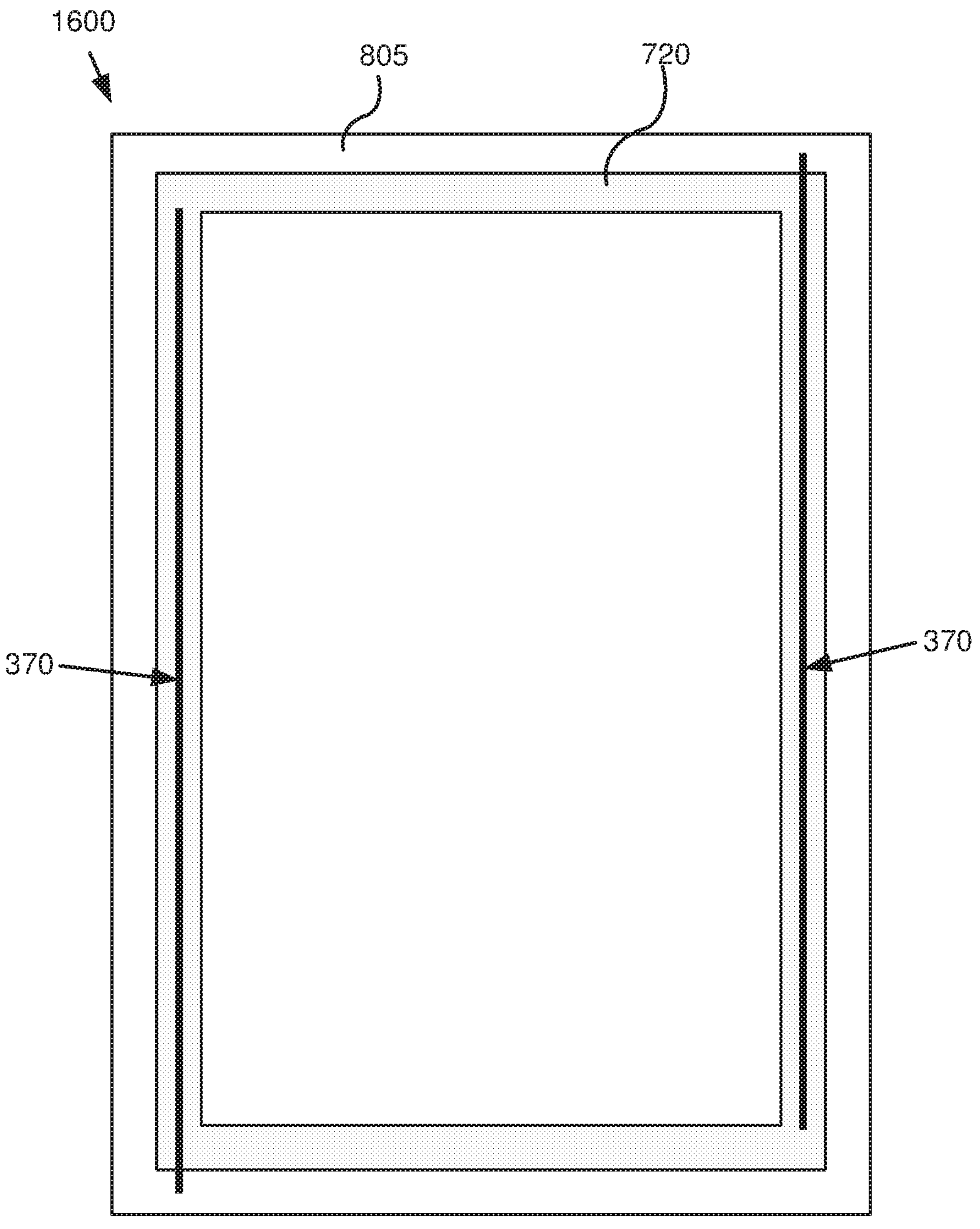
FIG. 16 depicts a plan view of an adhesive bus bar configuration.
Figure 17:
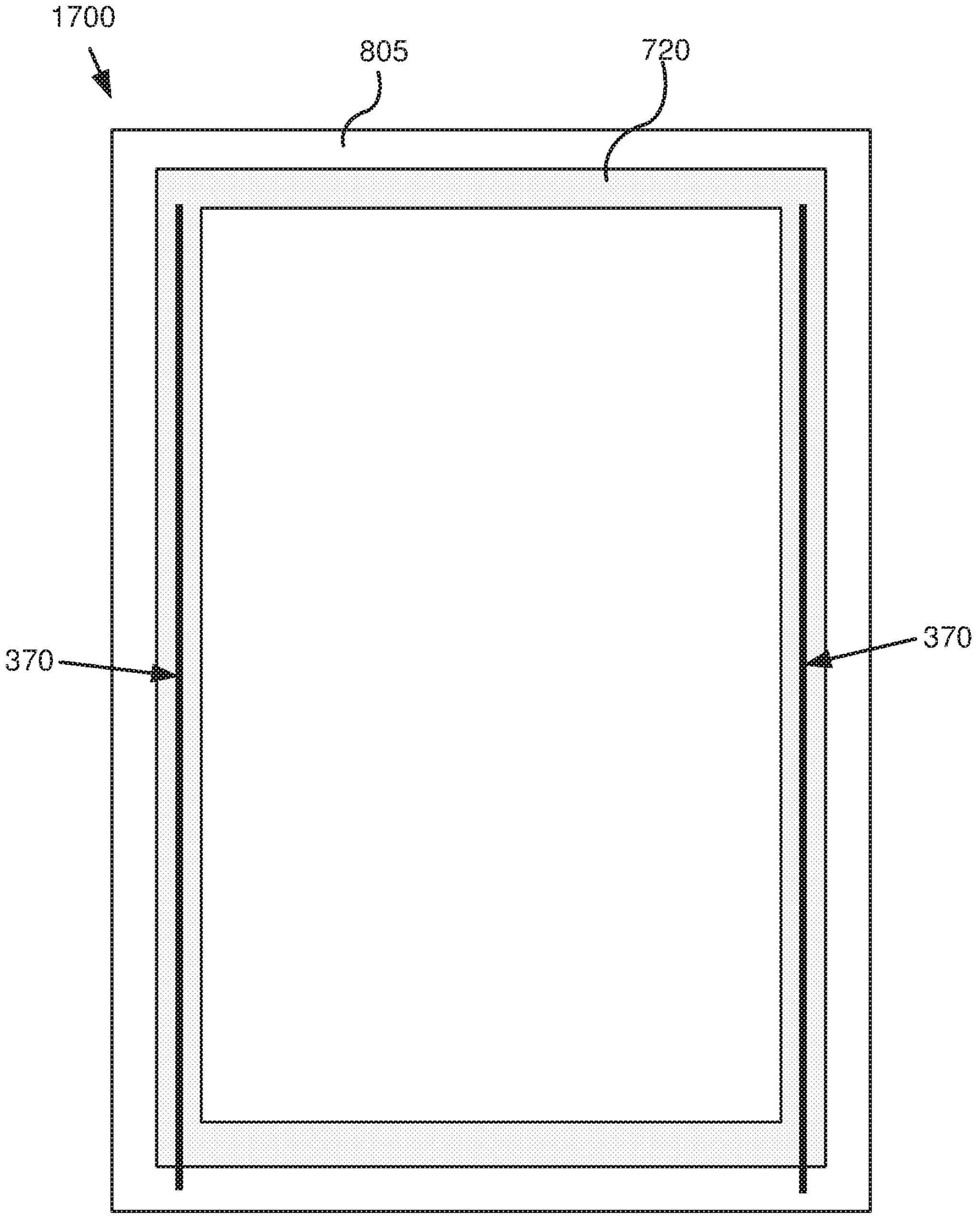
FIG. 17 depicts a plan view of an adhesive bus bar configuration.
Figure 18:
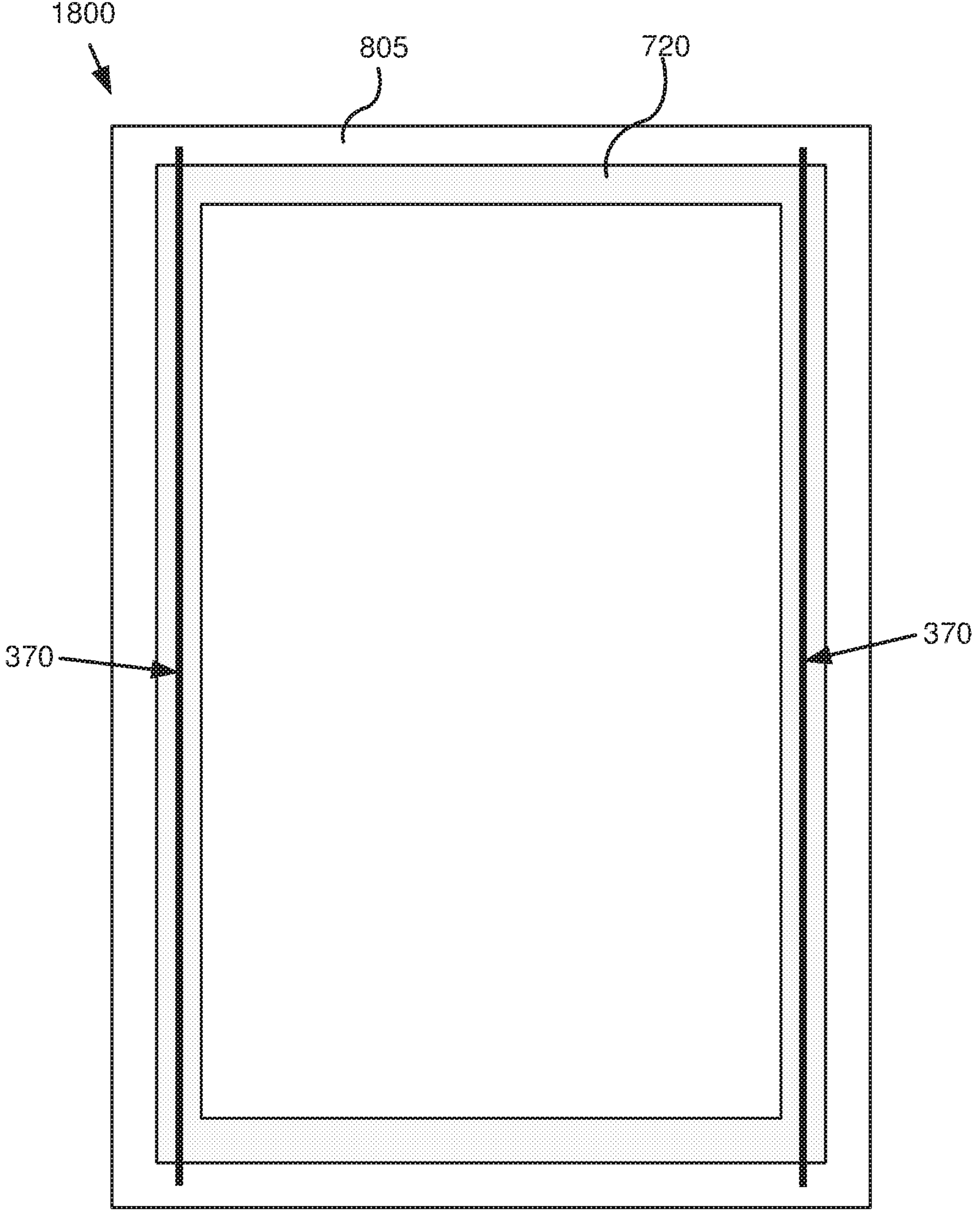
FIG. 18 depicts a plan view of an adhesive bus bar configuration.
Figure 19:
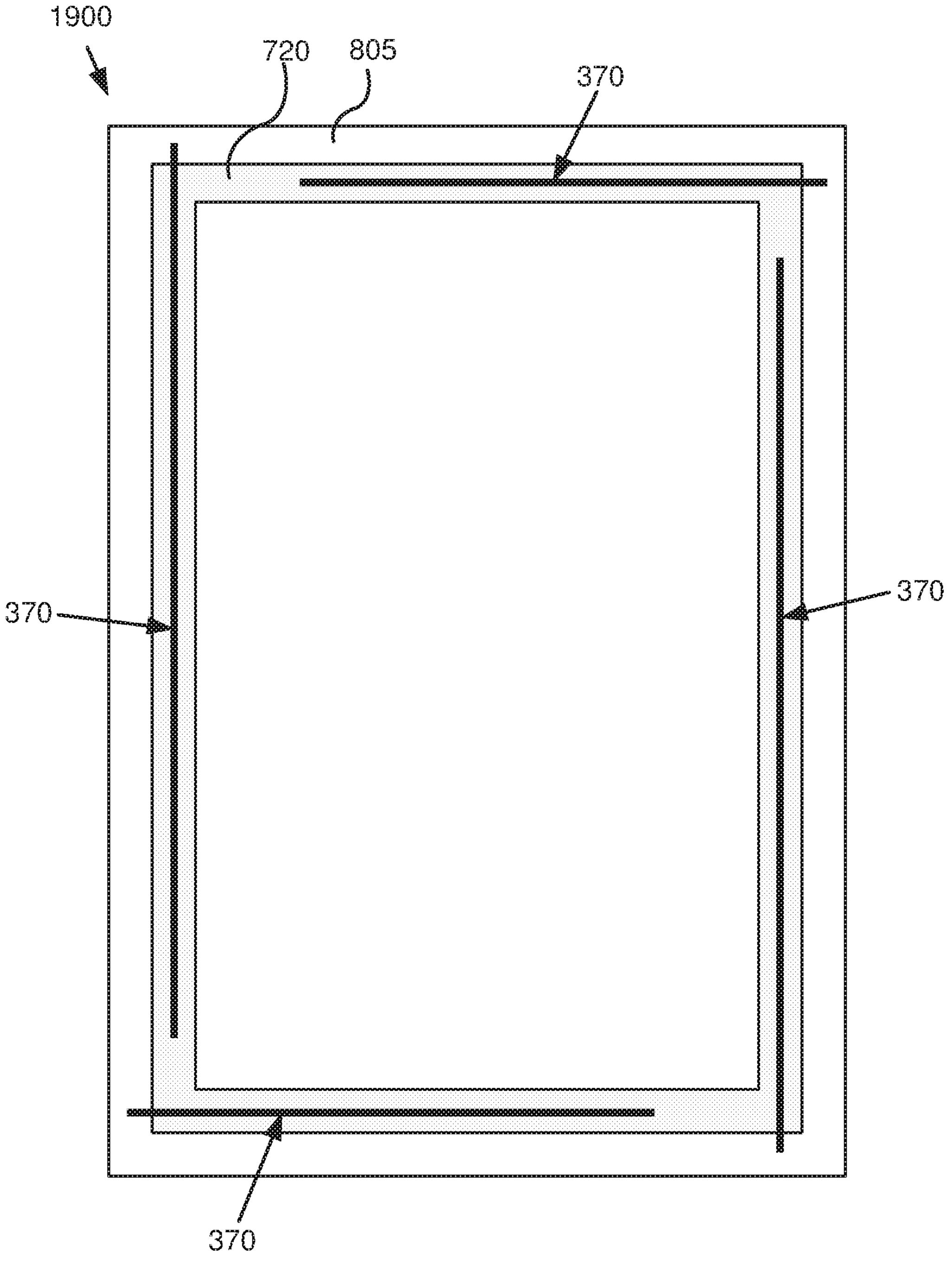
FIG. 19 depicts a plan view of an adhesive bus bar configuration.

FIG. 16 depicts an adhesive bus bar configuration, 1600, for an electrochromic insulated glass unit. A glass substrate, 805, has a spacer, 720, and adhesive bus bars, 370. Adhesive bus bars 370 are along their length arranged under the spacer, and each has an end that emanates from between the spacer and the transparent substrate in order to make electrical connections, for example wire attachment, for example soldering of leads, in this example the bus bar tabs are located on diagonally opposed corners of the transparent substrate. FIG. 17 depicts an adhesive bus bar configuration, 1700, for an electrochromic insulated glass unit. A glass substrate, 805, has a spacer, 720, and adhesive bus bars, 370. Adhesive bus bars 370 are along their length arranged under the spacer, and each has an end that emanates from between the spacer and the transparent substrate in order to make electrical connections, for example wire attachment, for example soldering of leads, in this example the bus bar tabs are located on adjacent corners of the transparent substrate. FIG. 18 depicts an adhesive bus bar configuration, 1800, for an electrochromic insulated glass unit. A glass substrate, 805, has a spacer, 720, and adhesive bus bars, 370. Adhesive bus bars 370 are along their length arranged under the spacer, and each is a linear span having both ends emanating from between the spacer and the transparent substrate in order to make electrical connections, for example wire attachment, for example soldering of leads. This configuration has the advantage of attaching wire leads to both ends of each bus bar for more efficient powering and uniform current flow across the length of the bus bars. FIG. 19 depicts an adhesive bus bar configuration, 1900, for an electrochromic insulated glass unit. A glass substrate, 805, has a spacer, 720, and adhesive bus bars, 370. Adhesive bus bars 370 are along their length arranged under the spacer, and each is a linear span having one end emanating from between the spacer and the transparent substrate in order to make electrical connections, for example wire attachment, for example soldering of leads. This configuration has the advantage of having power supplied to all four sides of the electrochromic device, and like other embodiments utilizing a single linear span for a bus bar, fabrication is simplified.

Certain electrochromic insulated glass units or electrochromic IGUs include a transparent substrate with an electrochromic device coating thereon, a spacer sandwiched between the transparent substrate and another substrate, and a first bus bar, and a second bus bar. Each of the first and second bus bars includes a linear span between the transparent substrate and the spacer along substantially the entire length of a first side and a second side of the spacer, respectively. The first and second sides of the spacer are opposite and parallel to each other. At least one end of the linear span emanates from between the transparent substrate and the spacer. The linear span of the bus bars extends to a first area and a second area, respectively, on the transparent substrate outside the spacer's outer perimeter. The transparent substrate and the spacer are rectangular. In one embodiment, the electrochromic device coating (e.g., an all solid state and inorganic electrochromic device coating) is a monolithic device whose perimeter edges lie between the spacer and the transparent substrate. In some of these embodiments with electrochromic IGUs, the first and second bus bars are adhesive bus bars. In one embodiment, each adhesive bus bar includes an electrically conductive adhesive with a metal foil backing. In one embodiment, the first area and the second area are proximate diagonally opposed corners of the transparent substrate. In another embodiment, the first area and the second area are proximate adjacent corners of the transparent substrate. In another embodiment, both ends of the linear span emanate from between the transparent substrate and the spacer and extend outside the spacer's outer perimeter, terminating at the first area, the second area, a third area and a fourth area, where each of the first, second, third and fourth areas is proximate a distinct corner of the transparent substrate.

In one of these embodiments with an electrochromic IGU, the electrochromic IGU also includes a third bus bar and a fourth bus bar. The third and fourth bus bars have the same configuration as the first and second bus bars. The linear span of each of the third and fourth bus bars is between the spacer and the transparent substrate on a third and a fourth side of the spacer, respectively. The third and fourth sides of the spacer are between the first and second sides of the spacer and on opposing sides of the spacer. Each of the third and fourth bus bar's linear span emanates from between the transparent substrate and the spacer, to a third area and a fourth area, respectively, on the transparent substrate outside the spacer's outer perimeter. Each of the first, second, third and fourth areas is proximate a distinct corner and a distinct side of the transparent substrate.

Figure 21:
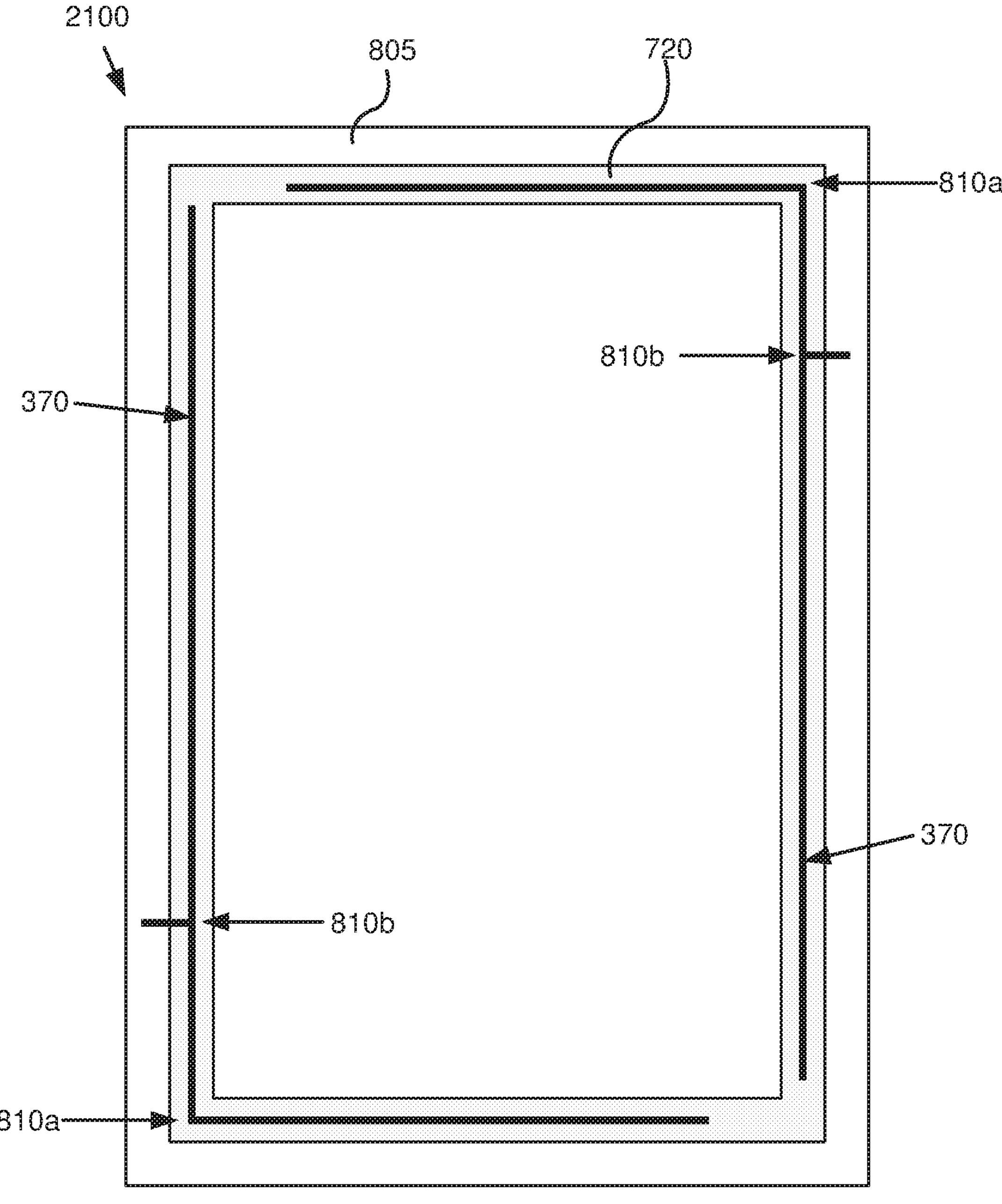
FIG. 21 depicts a plan view of an adhesive bus bar configuration.

FIG. 21 depicts an adhesive bus bar configuration, 2100, for an electrochromic insulated glass unit. A glass substrate, 805, has a spacer, 720, and adhesive bus bars, 370. Adhesive bus bars 370 are along their length arranged under the spacer. In this example, each of two bus bars has two vertices. In this example, each bus bar has a first leg that follows the length of the spacer and is registered with the spacer, but on opposing sides of the spacer. The first leg spans to a first vertex, 810*a,* and continues on a second leg, also between the spacer and the transparent substrate. A third leg is attached to the second leg, and emanates from between the spacer and the glass substrate to provide a tab for making an electrical connection such as soldering a wire. The end of the third leg intersects the second leg at a second vertex, 810*b*. In this embodiment, the location of the second vertex is configured such that there is approximately equal length of bus bar on either side of the vertex. This configuration has the advantage that minimal bus bar area is used to emanate from under the spacer, only at two places, to make electrical connections, for example wire attachment, for example soldering of leads. Also, current distribution is more even with placement of the second vertex. In this example, the first and second leg of the bus bars is used to power an electrochromic device where the entire perimeter edge of the electrochromic device is also between the spacer and the substrate.

Certain electrochromic insulated glass units or electrochromic IGUs include a transparent substrate with an electrochromic device coating thereon, a spacer sandwiched between the transparent substrate and another substrate, and a first bus bar, and a second bus bar. Each of the first and second bus bars includes a first leg, a second leg, and third leg. The first leg is between the transparent substrate and the spacer. The first leg spans along substantially the entire length of a first side and a second side of the spacer, respectively. The first and second sides of the spacer are opposite and parallel to each other. The first leg extends to a first vertex between the transparent substrate and the spacer. The second leg is between the transparent substrate and the spacer. The second leg extends from the first vertex and along a third side and a fourth side of the spacer, respectively. The third and fourth sides of the spacer are between the first and second sides of the spacer, respectively. The third and fourth sides are also opposite and parallel to each other. The third leg emanates from between the transparent substrate and spacer, on the first and second sides of the spacer, respectively. The third leg extends to a first and a second area, respectively, on the transparent substrate outside the spacer's outer perimeter. A second vertex between the transparent substrate and the spacer is formed by an intersection of the third leg with the first leg and the second leg, respectively. The third leg is configured such that there is approximately equal length of bus bar on either side of the second vertex. The transparent substrate and the spacer are rectangular. In one embodiment, the electrochromic device coating (e.g., an all solid state and inorganic electrochromic device coating) is a monolithic device whose perimeter edges lie between the spacer and the transparent substrate.

In some of these embodiments with electrochromic IGUs, the first and second bus bars are adhesive bus bars. In one embodiment, each adhesive bus bar includes an electrically conductive adhesive with a metal foil backing. In one embodiment, the first and second vertexes are fabricated by adhering two adhesive bus bar portion ends with or without pressure and/or heat. In one embodiment, the first and second vertexes are fabricated by at least one bending, folding, soldering, welding and brazing. For example, the two adhesive bus bar portion ends may be soldered together.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. An electrochromic insulated glass unit comprising:

a first transparent substrate;

a second transparent substrate;

a spacer sandwiched between the first and second transparent substrates;

an electrochromic device coating disposed on the first transparent substrate, the electrochromic device coating comprising a first transparent conductive layer, a second transparent conductive layer and an electrochromic device stack disposed between the first and second transparent conductive layers, wherein the electrochromic device stack is disposed on the first transparent conductive layer, and wherein the second transparent conductive layer is disposed on the electrochromic device stack, and wherein the second transparent conductive layer is separated from the second transparent substrate by a space; and a first adhesive bus bar on the first transparent conductive layer, wherein the first adhesive bus bar comprises a first leg comprising (1) a first portion, between the first transparent substrate and the spacer, and (2) a second portion emanating from between the first transparent substrate and the spacer and extending to a secondary seal area.

2. The electrochromic insulated glass unit of claim 1, wherein the first adhesive bus bar comprises an electrically conductive adhesive and an electrically conductive backing.

3. The electrochromic insulated glass unit of claim 2, wherein the electrically conductive backing comprises at least one of a metal, a metallized plastic, a metallized woven fabric, a carbon fiber, an alloy, and a metallized carbon fiber.

4. The electrochromic insulated glass unit of claim 2, wherein the electrically conductive backing comprises a metal foil.

5. The electrochromic insulated glass unit of claim 4, wherein the metal foil comprises at least one of silver, aluminum, titanium, tin, zinc, gold, nickel, copper and alloys thereof.

6. The electrochromic insulated glass unit of claim 5, wherein the metal foil comprises a laminated metal.

7. The electrochromic insulated glass unit of claim 6, wherein the metal foil comprises tin-plated copper.

8. The electrochromic insulated glass unit of claim 4, where the metal foil comprises a doped metal.

9. The electrochromic insulated glass unit of claim 8, wherein the doped metal is silver doped with palladium.

10. The electrochromic insulated glass unit of claim 1, further comprising a second adhesive bus bar on the second transparent conductive layer.

11. The electrochromic insulated glass unit of claim 10, wherein the first and second adhesive bus bars have same composition.

12. The electrochromic insulated glass unit of claim 6, wherein the metal foil is between about 5 μm and about 100 μm thick.

13. The electrochromic insulated glass unit of claim 4, wherein the metal foil is between about 5 μm and about 50 μm thick.

14. The electrochromic insulated glass unit of claim 4, wherein the metal foil is between about 5 μm and about 40 μm thick.

15. The electrochromic insulated glass unit of claim 4, wherein the metal foil is between about 5 μm and about 20 μm thick.

16. The electrochromic insulated glass unit of claim 2, wherein the electrically conductive adhesive comprises an adhesive and a conductive filler.

17. The electrochromic insulated glass unit of claim 16, wherein the conductive filler is selected from the group consisting of silver, gold, nickel, copper, carbon black, carbon fiber, metalized carbon fiber, carbon nanotubes, fullerenes, graphite, metal-coated glass beads, metal-coated glass flakes, metal-coated glass fibers, and meta-coated nickel particles.

18. The electrochromic insulated glass unit of claim 16, wherein the conductive filler comprises metal-coated particles, wherein a metal coating on the metal-coated particles is selected from the group consisting of tin, silver, gold, copper and nickel.

19. The electrochromic insulated glass unit of claim 16, wherein the conductive filler comprises particles having shapes selected from the group consisting of spheres, rods, flakes, and irregular shapes.

20. The electrochromic insulated glass unit of claim 19, wherein the particles comprise a maximum dimension that does not exceed 25 μm or a minimum dimension that is not less than about 0.5 μm.

21. The electrochromic insulated glass unit of claim 2, wherein the first adhesive bus bar comprises same or similar color as the spacer and/or a primary sealant between the spacer and the first transparent substrate.

22. The electrochromic insulated glass unit of claim 21, wherein the electrically conductive backing comprises a color that approximates color of the spacer and/or the primary sealant.

23. The electrochromic insulated glass unit of claim 21, wherein the electrically conductive adhesive comprises a tinting agent so that the electrically conductive adhesive approximates color of the spacer and/or the primary sealant.

24. The electrochromic insulated glass unit of claim 23, wherein the tinting agent comprises at least one of carbon black, graphite, carbon nanotubes and fullerenes.

25. The electrochromic insulated glass unit of claim 1, wherein the first adhesive bus bar comprises:

a first leg between the first transparent substrate and the spacer, the first leg extending to a first vertex between the first transparent substrate and the spacer;

a second leg, extending from the first vertex, between the first transparent substrate and the spacer, extending along a second side of the spacer and to a second vertex between the first transparent substrate and the spacer; and a third leg, extending from the second vertex, and including a first portion emanating from between the first transparent substrate and the spacer on the second side and outside an outer perimeter of the spacer, the first portion extending to an area proximate a corner of the first transparent substrate;

wherein the electrochromic insulated glass unit further comprises a second adhesive bus bar, the second adhesive bus bar comprising:

(a) a portion, between the first transparent substrate and the spacer, opposite a first side, and (b) an other portion emanating from between the first transparent substrate and the spacer and terminating at the area.

26. The electrochromic insulated glass unit of claim 25, wherein the first transparent substrate and the spacer are rectangular.

27. The electrochromic insulated glass unit of claim 25, wherein the electrochromic device coating is a monolithic device whose perimeter edges lie between the spacer and the first transparent substrate.

28. The electrochromic insulated glass unit of claim 27, wherein the electrochromic device coating is all solid state and inorganic.

29. The electrochromic insulated glass unit of claim 25, wherein each adhesive bus bar of the first and second adhesive bus bars comprises an electrically conductive adhesive with a metal foil backing.

30. The electrochromic insulated glass unit of claim 25, wherein at least one of the first and second vertexes are fabricated by adhering two adhesive bus bar portion ends with or without pressure and/or heat.

31. The electrochromic insulated glass unit of claim 30, wherein the two adhesive bus bar portion ends are soldered together.

32. The electrochromic insulated glass unit of claim 25, wherein at least one of the first and second vertexes are fabricated by at least one of bending, folding, soldering, welding and brazing.

33. The electrochromic insulated glass unit of claim 25, wherein the area is between about 1 square inch and about 10 square inches.

34. The electrochromic insulated glass unit of claim 25, wherein the area is between about 2 square inches and about 5 square inches.

35. The electrochromic insulated glass unit of claim 25, wherein the area is between about 2 square inches and about 3 square inches.

36. The electrochromic insulated glass unit of claim 1, wherein the first adhesive bus bar comprises:

(1) a first leg between the first transparent substrate and the spacer, the first leg extending to a first vertex between the first transparent substrate and the spacer, and (2) a second leg, extending from the first vertex, between the first transparent substrate and the spacer, and along a second side of the spacer, the second leg includes a portion emanating from between the first transparent substrate and the spacer on a third side of the spacer opposite a first side and extending to an area on and proximate a corner of the first transparent substrate outside an outer perimeter of the spacer;

wherein the electrochromic insulated glass unit further comprises a second adhesive bus bar, the second adhesive bus bar comprising:

(a) a first arm between the first transparent substrate and the spacer, the first arm extending to a first corner between the first transparent substrate and the spacer, and (b) a second arm, extending from the first corner and includes a portion emanating from between the first transparent substrate and the spacer on the third side of the spacer and terminating at the area.

37. The electrochromic insulated glass unit of claim 36, wherein the first transparent substrate and the spacer are rectangular.

38. The electrochromic insulated glass unit of claim 36, wherein the electrochromic device coating is a monolithic device whose perimeter edges lie between the spacer and the first transparent substrate.

39. The electrochromic insulated glass unit of claim 38, wherein the electrochromic device coating is all solid state and inorganic.

40. The electrochromic insulated glass unit of claim 36, wherein each of the first and second adhesive bus bars comprises an electrically conductive adhesive with a metal foil backing.

41. The electrochromic insulated glass unit of claim 36, wherein each of the first vertex and the first corner are fabricated by adhering two adhesive bus bar portion ends with or without pressure and/or heat.

42. The electrochromic insulated glass unit of claim 41, wherein the two adhesive bus bar portion ends are soldered together.

43. The electrochromic insulated glass unit of claim 36, wherein the first vertex and the first corner are fabricated by at least one of bending, folding, soldering, welding and brazing.

44. The electrochromic insulated glass unit of claim 36, wherein the area is between about 1 square inch and about 10 square inches.

45. The electrochromic insulated glass unit of claim 36, wherein the area is between about 2 square inches and about 5 square inches.

46. The electrochromic insulated glass unit of claim 36, wherein the area is between about 2 square inches and about 3 square inches.

* * * * *